(12) United States Patent  
Claesson et al.

(10) Patent No.: US 8,606,396 B2  
(45) Date of Patent: Dec. 10, 2013

(54) CONTROLLER AND METHOD OF CONTROLLING AN INTEGRATED SYSTEM FOR DISPENSING AND BLENDING/MIXING BEVERAGE INGREDIENTS

(75) Inventors: Jan Claesson, Land O'Lakes, FL (US); William E. Smith, Land O'Lakes, FL (US); Roberto Nevarez, Hudson, FL (US)

(73) Assignee: Enodis Corporation, New Port Richey, FL (US)

( * ) Notice: Subject to any disclaimer, the term of this patent is extended or adjusted under 35 U.S.C. 154(b) by 995 days.

(21) Appl. No.: 12/633,793

(22) Filed: Dec. 8, 2009

(65) Prior Publication Data

US 2010/0318225 A1 Dec. 16, 2010

Related U.S. Application Data

(60) Provisional application No. 61/120,772, filed on Dec. 8, 2008.

(51) Int. Cl.
*G06F 17/00* (2006.01)
*B67D 1/00* (2006.01)

(52) U.S. Cl.
USPC ......... 700/239; 700/241; 700/283; 222/145.6

(58) Field of Classification Search
USPC ......... 700/265, 281, 282, 283, 285, 231, 232, 700/233, 239, 241; 222/1, 129, 129.1, 222/144.5, 145.6, 146.6, 148; 137/12.5; 99/275, 280, 285
See application file for complete search history.

(56) References Cited

U.S. PATENT DOCUMENTS

| | | | |
|---|---|---|---|
| 2,008,106 A | 7/1935 | Lawrence | 366/197 |
| 2,653,733 A | 9/1953 | Rudd et al. | 222/145 |
| 2,855,007 A | 10/1958 | Erickson et al. | 99/275 |
| 3,101,872 A | 8/1963 | Dickinson | 222/197 |
| 3,154,123 A | 10/1964 | Tomlinson | 241/101.6 |
| 3,156,103 A | 11/1964 | Ross | 62/331 |
| 3,295,997 A | 1/1967 | Tomlinson et al. | 241/34 |
| 3,505,075 A | 4/1970 | Black | |

(Continued)

FOREIGN PATENT DOCUMENTS

| | | |
|---|---|---|
| EP | 0176259 B1 | 1/1990 |
| EP | 1690481 | 8/2006 |

(Continued)

OTHER PUBLICATIONS

International Preliminary Report on Patentability issued Dec. 15, 2011 in the related PCT/US2010/054317.

(Continued)

*Primary Examiner* — Charles Kasenge
(74) *Attorney, Agent, or Firm* — Ohlandt, Greeley, Ruggiero & Perle, LLP

(57) ABSTRACT

A controller and method of controlling an integrated beverage blending system comprising: a controller for menu selection; an ice portion control module; an ingredient module; a dispensing apparatus in communication with the ice portion control module and the ingredient module, wherein the ice and the ingredient are dispensed into a beverage container via the dispensing apparatus; and at least one blender/mixer/cleaner module which blends and/or mixes the ice and the ingredient in the beverage container, thereby producing the beverage; wherein, upon removal of the beverage container from the blender/mixer/cleaner module, the blender/mixer/cleaner module initiates a cleaning mode.

50 Claims, 51 Drawing Sheets

(56) References Cited

U.S. PATENT DOCUMENTS

| | | | |
|---|---|---|---|
| 3,592,367 A | 7/1971 | Landis et al. | |
| 3,615,673 A | 10/1971 | Black et al. | 99/79 |
| 3,630,045 A | 12/1971 | Lunde | 62/320 |
| 3,704,599 A | 12/1972 | Darby et al. | 62/354 |
| 3,987,211 A | 10/1976 | Dunn et al. | 426/551 |
| 4,083,462 A | 4/1978 | Teske et al. | 214/17 D |
| 4,276,750 A | 7/1981 | Kawasumi | 62/137 |
| 4,392,588 A | 7/1983 | Scalera | 222/129.4 |
| 4,531,380 A | 7/1985 | Hagen | 62/320 |
| 4,590,975 A * | 5/1986 | Credle, Jr. | 141/1 |
| 4,610,145 A | 9/1986 | Arzberger et al. | 62/127 |
| 4,638,875 A | 1/1987 | Murray | 177/1 |
| 4,653,281 A | 3/1987 | Van der Veer | 62/71 |
| 4,681,030 A | 7/1987 | Herbert | 99/484 |
| 4,708,487 A | 11/1987 | Marshall | 366/206 |
| 4,745,773 A | 5/1988 | Ando | 62/320 |
| 4,790,240 A | 12/1988 | Henn et al. | 99/282 |
| 4,883,100 A * | 11/1989 | Stembridge et al. | 141/1 |
| 4,901,539 A * | 2/1990 | Garber et al. | 62/306 |
| 4,932,223 A | 6/1990 | Paul et al. | 62/354 |
| 4,941,593 A | 7/1990 | Hicks et al. | 222/148 |
| 4,944,335 A * | 7/1990 | Stembridge et al. | 141/95 |
| 4,944,336 A * | 7/1990 | Stembridge et al. | 141/95 |
| 4,961,447 A * | 10/1990 | Credle et al. | 141/1 |
| 4,961,456 A * | 10/1990 | Stembridge et al. | 141/1 |
| 4,962,866 A | 10/1990 | Phillips | 221/8 |
| 4,967,808 A * | 11/1990 | Credle et al. | 141/9 |
| 4,971,120 A * | 11/1990 | Credle et al. | 141/174 |
| 5,036,892 A * | 8/1991 | Stembridge et al. | 141/1 |
| 5,058,773 A * | 10/1991 | Brill et al. | 222/129.4 |
| 5,067,819 A | 11/1991 | Heinhold et al. | 366/138 |
| 5,068,116 A | 11/1991 | Gibney et al. | 426/231 |
| 5,074,341 A * | 12/1991 | Credle et al. | 141/1 |
| 5,104,007 A | 4/1992 | Utter | 222/146.6 |
| 5,192,131 A | 3/1993 | Hatfield | 366/308 |
| 5,208,050 A | 5/1993 | Ney | 425/202 |
| 5,230,448 A * | 7/1993 | Strohmeyer et al. | 222/643 |
| 5,280,845 A | 1/1994 | Leight | 221/2 |
| 5,299,716 A * | 4/1994 | Hawkins et al. | 222/146.6 |
| 5,323,691 A | 6/1994 | Reese et al. | 99/275 |
| 5,350,082 A * | 9/1994 | Kiriakides et al. | 221/1 |
| 5,439,289 A | 8/1995 | Neilson | 366/207 |
| 5,492,250 A * | 2/1996 | Sardynski | 222/129.1 |
| 5,549,219 A * | 8/1996 | Lancaster | 222/1 |
| 5,619,901 A | 4/1997 | Reese et al. | 99/275 |
| 5,683,011 A | 11/1997 | Miliani | 222/56 |
| 5,690,253 A | 11/1997 | LaFleur | 222/102 |
| 5,698,247 A | 12/1997 | Hall | 426/66 |
| 5,778,761 A | 7/1998 | Miller | 99/275 |
| 5,797,519 A | 8/1998 | Schroeder et al. | 222/129.1 |
| 5,803,377 A | 9/1998 | Farrell | 241/36 |
| 5,833,362 A | 11/1998 | Shepard | 366/111 |
| 5,839,291 A * | 11/1998 | Chang | 62/126 |
| 5,863,118 A | 1/1999 | Ackels et al. | 366/129 |
| 5,890,626 A * | 4/1999 | Wolski et al. | 222/129.1 |
| 5,910,164 A | 6/1999 | Snelling et al. | 62/344 |
| 5,911,749 A | 6/1999 | Sugie | 62/354 |
| 5,934,516 A | 8/1999 | Strycharskie et al. | 222/158 |
| 5,960,701 A | 10/1999 | Reese et al. | 99/275 |
| 5,967,367 A * | 10/1999 | Orsborn | 222/129.1 |
| 6,053,359 A * | 4/2000 | Goulet et al. | 221/221 |
| 6,068,875 A | 5/2000 | Miller et al. | 426/565 |
| 6,102,246 A * | 8/2000 | Goulet et al. | 221/11 |
| 6,170,707 B1 * | 1/2001 | Wolski et al. | 222/129.1 |
| 6,196,712 B1 | 3/2001 | Elm | 366/197 |
| 6,202,894 B1 * | 3/2001 | Struminski et al. | 222/145.6 |
| 6,269,973 B1 * | 8/2001 | Bennett et al. | 222/1 |
| 6,283,627 B1 | 9/2001 | Fromm | 366/260 |
| 6,293,691 B1 | 9/2001 | Rebordosa et al. | 366/129 |
| 6,338,569 B1 | 1/2002 | McGill | 366/144 |
| 6,490,872 B1 | 12/2002 | Beck et al. | 62/303 |
| 6,607,096 B2 | 8/2003 | Glass et al. | 222/100 |
| 6,609,821 B2 | 8/2003 | Wulf et al. | |
| 6,616,323 B2 | 9/2003 | McGill | 366/201 |
| 6,684,646 B2 | 2/2004 | Voute et al. | 62/66 |
| 6,688,134 B2 * | 2/2004 | Barton et al. | 222/129.1 |
| 6,705,356 B2 * | 3/2004 | Barton et al. | 141/2 |
| 6,722,675 B2 | 4/2004 | Bidwell | 280/89 |
| 6,730,348 B2 | 5/2004 | Miller et al. | 426/565 |
| 6,772,675 B2 | 8/2004 | Ervin | 99/275 |
| 6,889,603 B2 | 5/2005 | Carhuff et al. | |
| 6,945,157 B2 | 9/2005 | Brown et al. | 99/275 |
| D526,170 S | 8/2006 | Gugni | D7/706 |
| 7,175,046 B2 | 2/2007 | Yao | 221/265 |
| 7,207,506 B1 | 4/2007 | Dickson, Jr. et al. | 241/21 |
| 7,237,691 B2 | 7/2007 | Danby et al. | 222/103 |
| 7,237,692 B2 | 7/2007 | Bodum | |
| 7,278,275 B2 | 10/2007 | Voglewede et al. | 62/320 |
| D555,678 S | 11/2007 | Broersen et al. | D15/89 |
| 7,325,485 B2 | 2/2008 | Carhuff et al. | |
| 7,383,966 B2 | 6/2008 | Ziesel | 222/100 |
| 7,445,133 B2 * | 11/2008 | Ludovissie et al. | 222/145.5 |
| 7,475,795 B2 | 1/2009 | Faller et al. | 222/95 |
| 7,543,346 B2 | 6/2009 | Roh et al. | |
| 7,614,524 B2 | 11/2009 | Girard et al. | 222/129.4 |
| 7,748,571 B2 | 7/2010 | Goff et al. | 222/146.6 |
| 7,762,181 B2 * | 7/2010 | Boland et al. | 99/322 |
| 7,802,444 B2 * | 9/2010 | Landers et al. | 62/320 |
| 7,889,182 B2 * | 2/2011 | Romanyszyn et al. | 222/129.1 |
| 7,942,094 B2 * | 5/2011 | Kounlavong et al. | 222/135 |
| 2002/0194999 A1 | 12/2002 | Ervin | |
| 2003/0089423 A1 * | 5/2003 | Barton et al. | 141/198 |
| 2003/0142581 A1 * | 7/2003 | Barton et al. | 366/142 |
| 2003/0155031 A1 * | 8/2003 | Barton et al. | 141/2 |
| 2004/0118872 A1 * | 6/2004 | Romanyszyn et al. | 222/129.1 |
| 2005/0115989 A1 * | 6/2005 | Ludovissie et al. | 222/145.5 |
| 2005/0183426 A1 | 8/2005 | Learned | 426/565 |
| 2005/0242120 A1 | 11/2005 | Sato et al. | 99/290 |
| 2007/0084888 A1 | 4/2007 | Santos et al. | 222/631 |
| 2007/0095859 A1 | 5/2007 | Maser et al. | 222/148 |
| 2007/0205220 A1 | 9/2007 | Rudick et al. | 222/129.4 |
| 2007/0205221 A1 | 9/2007 | Carpenter et al. | 222/129.4 |
| 2007/0289991 A1 | 12/2007 | Jensen | 222/1 |
| 2008/0066483 A1 * | 3/2008 | Klier et al. | 62/342 |
| 2008/0089983 A1 | 4/2008 | Coste | 426/106 |
| 2008/0093382 A1 | 4/2008 | Sher et al. | 222/129.1 |
| 2008/0279040 A1 | 11/2008 | Nielson | 366/138 |
| 2009/0161482 A1 * | 6/2009 | Sandford | 366/192 |
| 2009/0186141 A1 * | 7/2009 | Almblad et al. | 426/590 |
| 2010/0139493 A1 | 6/2010 | Nevarez et al. | 99/275 |
| 2010/0145522 A1 | 6/2010 | Claesson et al. | 700/265 |
| 2010/0318225 A1 | 12/2010 | Claesson et al. | 700/265 |
| 2010/0323071 A1 | 12/2010 | Nevarez et al. | 426/231 |

FOREIGN PATENT DOCUMENTS

| | | |
|---|---|---|
| EP | 1 772 081 A1 | 4/2007 |
| JP | 2004326246 A | 11/2004 |
| WO | 02/082959 A2 | 10/2002 |
| WO | 2008/105107 A1 | 9/2008 |

OTHER PUBLICATIONS

International Preliminary Report on Patentability issued Oct. 26, 2011 in the related PCT/US2009/067229.
*International Search Report* mailed Mar. 2, 2009 in the corresponding PCT/US2009/000247.
*Extended European Search Report* mailed Dec. 21, 2010 in the corresponding PCT/US2009/000247.
International Search Report from the corresponding International Application No. PCT/US2009/067227 dated Feb. 17, 2010.
Patent Examination Report No. 1 dated Sep. 21, 2012 for corresponding Australian Patent Application No. 2009333465.
English translation of First Office Action dated Aug. 27, 2012 for corresponding Chinese Patent Application No. 200980137971.8.
Extended European Search Report dated Jul. 23, 2012 for corresponding European Patent Application No. 09836740.2.
Extended European Search Report dated Jul. 23, 2012 for corresponding European Patent Application No. 09836743.6.
International Search Report issued Dec. 21, 2010 in the related International Application No. PCT/US2010/054317.

(56) References Cited

OTHER PUBLICATIONS

Extended European Search Report dated Sep. 3, 2012 for European application No. 09832454.4.
Extended European Search Report dated Sep. 3, 2012 for European application No. 09836742.8.
Extended European Search Report dated Sep. 3, 2012 for European application No. 09836741.0.
Chinese Office Action dated Sep. 27, 2012 for Chinese application No. 2009-80137700.2.
Russian Patent Office action dated Jan. 25, 2013 from corresponding Russian Patent Application No. 2011128012108(041554), pp. 7.
Australian Examination Report dated Jan. 11, 2013 for Australian patent No. 2009324698.
Russian Patent Office action dated Feb. 4, 2013 from corresponding Russian Patent Application No. 2011128014/20(041556), pp. 10.
Australian Patent Office action dated Feb. 11, 2013 from corresponding Australian Patent Application No. 2009333466, pp. 5.
First Office Action dated Jan. 31, 2013 for corresponding Chinese patent application No. 200980138020.2 with English translation, pp. 17.
First Office Action dated Dec. 17, 2012 for corresponding Chinese patent application No. 200980137873.4 with English translation, pp. 18.
Chinese Office Action dated Oct. 23, 2012 for Chinese application No. 200980137874.9.
Chinese Office Action dated Oct. 22, 2012 for Chinese application No. 200980137980.7.
Russian Office Action dated Sep. 21, 2012 for Russian application No. 2011127987.
Canadian Patent Office action dated Jun. 10, 2013 from corresponding Canadian Patent Application No. 2,746,226 pp. 3.
English Translation of Russian Patent Office action dated Apr. 26, 2013 from corresponding Russian Patent Application No. 2011127986/12(041528), pp. 3.
Canadian Patent Office action dated Apr. 22, 2013 from corresponding Canadian Patent Application No. 2,746,224, pp. 3.

\* cited by examiner

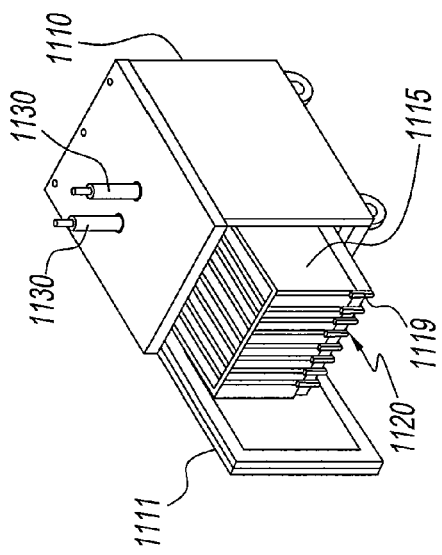
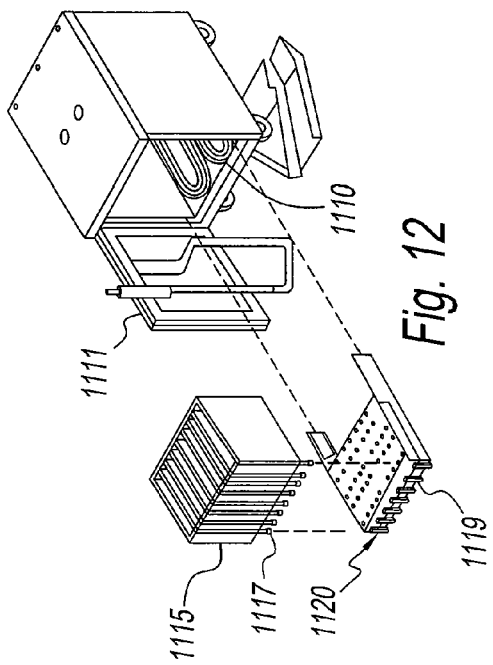
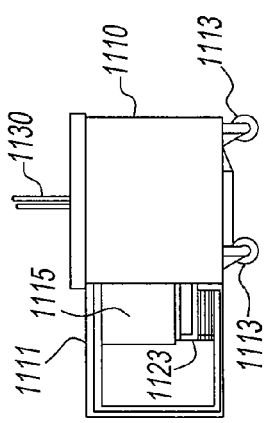
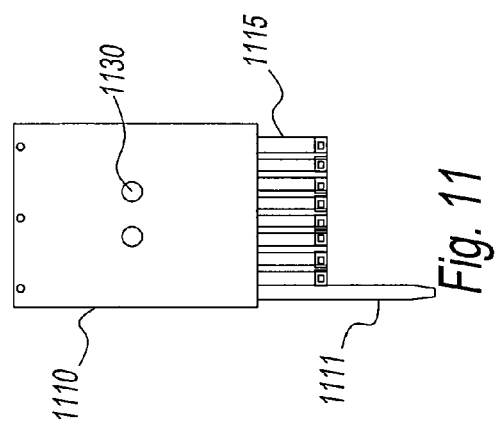
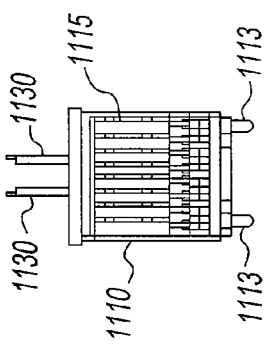

Product Mode

| | Idle - | | |
|---|---|---|---|
| Display/Function | 1. Computer displays "Select Up to 3 Flavors"<br>2. Computer displays up to 7 flavors (configurable) selections located in line with selection soft key and a "Water Only" and "ICE Only" selection located above the right most bottom soft keys respectively. | | |
| Button | Press 1-3 flavors OR Ice Only soft keys not cannot select both Ice Only and flavors | Press X to go to system setup | Pression more than 3 flavors |
| Display/Function | Display highlights the flavors selected | Display un-highlight selections | Display reverse videos the first 3 and does not change unless the same item is selected in which case will toggle to un-select. |
| Botton | Press X to clear selections | Press check to select | Display does not change (stay in Idle) |
| Dixplay/Function | 1. Computer displays "Additives and Cup Size"<br>2. Computer displays "Flavor: sel1, and sel3" below where sel1 - sel3 are the flavors previously selected.<br>3. Computer displays three additives available for selection below the top soft keys including Yogurt on the right top key. Note Computer displays additives crossed out if currently unavailable.<br>4. Computer displays four cup size selections "Small" above the bottom left key, "Medium" above the center bottom key, "Large" and "XLarge" above the bottom right most keys respectively. | — | — |

*Fig. 40*

| | | Product Mode | |
|---|---|---|---|
| Button | Press X to go to previous Display | 1. Place cup under dispenser<br>2. If additive desired 1st select up to three additives<br>3. Press soft key under Small, Medium, Large, or XLarge - this starts the dispensing! | Check is disabled |
| Display/Function | — | Computer starts dispensing product and Computer displays "Dispensing" with display of cup size, flavors, and additives selected for duraiton of dispense cycle. | — |
| Botton | — | X goes back to Idle and stop dispensing | — |
| Dixplay/Function | — | 1. Computer displays "Select Mixer" and "left" under the left most top soft key and "Right" under the right most top soft key for a two dispenser unit.<br>2. Computer will display "LEFTL" and "RIGHTL" and "RIGHTR" under the two right most soft keys if this system is configured with four dispenser modules.<br>3. If any of the mixers are busy or not functional the computer will display the appropriate left or right text crossed out. | — |
| Botton | Press X to go back to Idle,<br>Check is disabled | 1. Press Soft key above available mixer (not crossed out), then computer goes back to idle display.<br>2. Open blender door.<br>3. Place cup and close door<br>4. Computer starts blending with door closure.<br>5. Blending completes (no beep?) then user removes cup and door should close to allow cleaning cycle. | — |

Fig. 41

System Setup Mode

From Idle Press X

| | | | | | |
|---|---|---|---|---|---|
| Botton | | | | | |
| Display/Function | Computer displays "System Setup" with "DISP. Setup", "LOAD Fluids", and "Service" displayed under the the top left, center and right soft keys. | | | | |
| Botton | | | | Press X to go back to Idle Mode | Check disabled ? |
| Display/Function | Press appropriate soft key (DISP Setup, LOAD Fluids, or Service) Note other soft keys are disabled | | | — | — |
| Botton | | | | | |
| Display/Function | If DISP Setup was selected then the Computer displays "Brightness" on the left and "Contrast" on the right with + and - symbols on each side above and below the associated soft keys. | If LOAD Fluids was selected then the Computer displays "Load Fluids" with "Slot 1", "Slot 2", "Slot 3", "Slot 4", and "Slot 5" across the top of the display respectively and "Slot 6" and "Slot 7" across the bottom left of the display respectively. | If Service was selected then the Computer displays "Status", "Calibrate", "Maint". | | |
| Botton | Press X or Check to go back to Setup screen | Press appropriate soft keys to modify brightness and Contrast | Press one of the slot slections | Press X or Check to go back to Setup screen | |
| Display/Function | — | | 1. Computer displays "Assign Fluid Slot X" on the left side of the display where x is the slot number selected previously. 2. Computer displays list of up to 255? Fluid selections with current fluid highlighted with up down arrows under the top and bottom right most soft keys respectively. | — | |
| Botton | | Press X or Check to go back to service screen? | | If Status pressed | If Calibrate is pressed | If Maint. Pressed |
| Display/Function | | | | Computer displays? 1. Temp sensor Values. 2. Error log. 3. # of cycles of each product. 4. | Fluid calibration needed? | 1. Cleaning? 2. Dispensing cleaning fluid? 3. Cycle through modes for service testing? |

Fig. 42a

| Botton | | | | System Setup Mode | | |
|---|---|---|---|---|---|---|
| | — | — | Scroll through product using soft keys and select highlighted fluid by pressing check, Soft keys disabled? Goes back to Load Fluids screen? Primes pump? | — | Press X to go back to Load Fluids screen | — |

| Botton | Language Botton |
|---|---|
| | Press language key at any time |
| Display/Function | Current display changes to a new language each time the button is pressed. When starting English the display changes to the languages and order below:<br>1. Spanish, 2. French, 4. Canadian, 5. German, 6. Swedish, 7. Portuguese, 8. Italian, 9. Chinese, 10. Japanese, 11. back to English |

*Fig. 42b*

CONTROLLER AND METHOD OF CONTROLLING AN INTEGRATED SYSTEM FOR DISPENSING AND BLENDING/MIXING BEVERAGE INGREDIENTS

CROSS-REFERENCED APPLICATION

This application claims priority to U.S. Provisional Application No. 61/120,772, filed on Dec. 8, 2008, which is incorporated herein by reference in its entirety.

BACKGROUND OF THE INVENTION

1. Field of the Invention

The present disclosure relates generally to an integrated method and system for dispensing and blending/mixing beverage flavor/ingredients, thereby producing a beverage, e.g., a smoothie. More particularly, the present disclosure relates to a controller and method for controlling an integrated assembly that includes a flavor/ingredient dispensing module, an ice making and portion control module, and a blender/mixer/cleaner module which is capable of dispensing all primary flavor/ingredients and, optionally, portioning and dispensing onboard manufactured ice into a single serving cup; blending and/or mixing such flavor/ingredients and ice to form a preselected beverage; and cleaning the blender shaft, blade and mixing compartment post mixing to avoid flavor contamination and to satisfy health and sanitary regulations.

2. Description of Related Art

Multiple steps are involved in creating a beverage or drink, for example, a smoothie drink, from beginning to end, and potential issues can occur at all stages. Smoothie making requires the use of blender pots to create the drink, meaning that the operator is required to purchase, maintain, and then store small wares (blender pots). Limitations of current technology also require the labor intensive transportation of ice to the smoothie machine from a separate icemaking machine in order to maintain a level of usable ice in the smoothie machine. This ice transfer is an issue for many reasons. First, labor is required to transport the ice typically from a back storage room to the point of sale (POS) counter area of a restaurant, where the smoothie machines are typically located. This ice transfer can create a safety hazard for employees who could slip and fall on wet floors or injure themselves by improperly carrying a heavy bucket. It can also increase the likelihood of ice contamination through mishandling.

Once the ice is stocked, the employee must manually add an estimated amount to the blender pot. Since the amount of ice is not measured, but rather "guesstimated" by each employee, this ingredient is not precise and, therefore, makes it difficult to create the same franchised drink time after time.

After the ice is manually added, the juice and any additional fruit or flavor "mix-in" is added by the operator as well. Finally, a size of cup is chosen, and the drink is poured. This last step presents the largest chance for waste. Since the employee must portion the ingredients by hand, any overspill of the drink is left in the blender pot. At each step during this manual process, portion control is compromised, and money is potentially wasted on excess ingredients.

Once the order is complete and the customer has his or her drink, there is one last step to finalize the process—the method of manually cleaning the blender pot after each use to prevent the transfer of flavors and germs. Often, to save time, the blender pots are rinsed in a sink, which can compromise sanitation. While this might seem insignificant, flavor contamination can be a serious threat if customers have food allergies. Another drawback to the washing process is that it involves a substantial amount of time and labor on the part of the operator.

Each step in this process to create a smoothie takes time, typically four to five minutes, and that time could be better spent serving customers or taking more food and beverage orders, directly contributing to the bottom line.

Although premium beverages such as smoothies are growing in popularity, most quick-service restaurants (QSRs) are unable to offer customers these options due to the time limitations of the quick-serve world. Those QSR owners that do opt to serve smoothies are confronted with a common set of challenges—mainly how to sell the same franchised drink time after time with existing labor and equipment limitations.

Accordingly, it has been determined by the present disclosure, there is a need for an assembly that dispenses and mixes beverage flavors/ingredients with ice in one integrated system, and thereafter self cleans for immediate reuse without subsequent flavor contamination. It has been further determined by the present disclosure, there is a need for an assembly for dispensing ice that uniformly dispenses ice. It has been further determined by the present disclosure, there is an additional need for an assembly for mixing a beverage which is capable of automatically rinsing/cleaning/sanitizing the blender housing, blender shaft and blender blade.

SUMMARY

In an embodiment of the controller of the present disclosure, the controller controls an integrated beverage system that comprises a dispensing module that dispenses one or more ingredients into a container and a blending/mixing module that blends and/or mixes the ingredients in the container. The controller comprises a controller apparatus that controls the dispensing module and the blending/mixing module to prepare a first beverage and a second beverage concurrently.

In another embodiment of the controller of the present disclosure, the controller apparatus controls the dispensing module to dispense a first set of one or more ingredients for the first beverage into a first container and then controls the blending/mixing module to blend and/or mix the first set of ingredients in the first container and simultaneously controls the dispensing module to start dispensing a second set of one or more ingredients for the second beverage into a second container.

In another embodiment of the controller of the present disclosure, the first and second containers are beverage cups.

In another embodiment of the controller of the present disclosure, the controller apparatus controls the dispensing module and the blending/mixing module based on beverage requests received from a user operated entry device.

In another embodiment of the controller of the present disclosure, the controller apparatus controls the dispensing module to dispense ice and fluid simultaneously or in a layered manner with a layer of ice first and then a layer of fluid and optionally by another layer of ice and/or fluid.

In another embodiment of the controller of the present disclosure, the one or more of ingredients are selected from the group consisting of: ice, water, flavor and additive.

In another embodiment of the controller of the present disclosure, the controller apparatus monitors conditions of the integrated beverage system via connections to one or more sensors of the integrated beverage system.

In another embodiment of the controller of the present disclosure, the integrated beverage system further comprises an ice maker. At least one of the ingredients is ice. The controller apparatus controls the dispensing module to deliver the ice to at least of the first and second containers.

In another embodiment of the controller of the present disclosure, the dispensing module comprises a plurality of storage containers. A plurality of the ingredients is stored in separate ones of the storage containers. The controller apparatus controls the dispensing module to deliver at least one of the plurality of ingredients from a corresponding storage container to the first or second container.

In another embodiment of the controller of the present disclosure, the storage containers are flexible bags.

In another embodiment of the controller of the present disclosure, the dispensing module further comprises a single dispensing nozzle for the storage containers. The controller apparatus controls the dispensing module to deliver the selected ingredients from the separate storage containers via separate delivery paths to the nozzle for dispensing to the first or second container.

In another embodiment of the controller of the present disclosure, the controller apparatus comprises a plurality of micro-controllers that control the dispensing module and the blending/mixing module to prepare the first and second beverages based on a first and a second recipe script, respectively.

In another embodiment of the controller of the present disclosure, the script of the first and second recipe scripts comprises a beverage container size, a user selected beverage, and a first ingredient. At least one of the micro-controllers, based on the beverage container size, the first ingredient and the user selected beverage type, controls the dispenser module to portion the first ingredient.

In another embodiment of the controller of the present disclosure, the micro-controllers comprise: a first micro-controller that responds to user data entered via a user entry device to provide the first and second recipe scripts; a second micro-controller that uses the first and second recipe scripts to control the dispensing module in the dispensing of a first set of the ingredients into a first container and a second set of the ingredients into a second container, respectively; and a third micro-controller that uses the first and second recipe scripts to blend and/or mix the first and second sets of ingredients in the first and second containers to produce the first and second beverages, respectively.

In another embodiment of the controller of the present disclosure, the blending/mixing module comprises a spindle assembly that is rotatable and that is movable vertically into and out of the beverage container. The third micro-controller uses the first or second script to drive a first motor that rotates the spindle assembly and a second motor that moves the spindle assembly vertically.

In another embodiment of the controller of the present disclosure, one of the ingredients is ice. The third micro-controller uses the first or second script to rotate the spindle assembly in a first manner chop an ice particle size from coarse to fine and/or in a second manner leaves the ice in a coarse particle size.

In another embodiment of the controller of the present disclosure, the first or second script includes a size of the beverage container, a speed and dwell time for each of a plurality of blending levels in the beverage container. The third micro-controller uses the first or second script to control to move the spindle assembly vertically to each of the levels and to rotate the spindle assembly at each level with the speed and for the dwell time for that level according to the first or second script.

In another embodiment of the controller of the present disclosure, the blending/mixing module further comprises a door and a position sensor, wherein the position sensor is selected from the group consisting of: spindle assembly home, door open, and spindle assembly home and door open.

In another embodiment of the controller of the present disclosure, the blending/mixing module further comprises a cleaning assembly. The third micro-controller using the first or second script operates the cleaning assembly to inject a cleaning fluid into a beverage container volume after the beverage has been removed therefrom with the first or second beverage.

In another embodiment of the controller of the present disclosure, the cleaning assembly comprises a spray device located to inject the cleaning fluid, a cleaning fluid valve and an air valve in communication with a delivery conduit to the spray device. The third micro-controller uses the script to operate the cleaning fluid valve to provide the cleaning fluid to the spray device via a conduit and the air valve to inject air into the conduit to increase a velocity of flow of the cleaning fluid in the beverage container volume.

In another embodiment of the controller of the present disclosure, the cleaning assembly comprises a spindle assembly. The third micro-controller responds to the first or second script to lower the spindle assembly into the volume to enhance a coverage of the cleaning fluid within the volume.

In another embodiment of the controller of the present disclosure, the cleaning fluid is selected from the group consisting of: water and sanitizing fluid.

In another embodiment of the controller of the present disclosure, the blending/mixing module is a first blending/mixing module. The integrated beverage system further comprises a second blending/mixing module. The controller apparatus executes a program to concurrently prepare the first and second beverages by controlling the first and second blending/mixing modules to time share the dispensing module.

In another embodiment of the controller of the present disclosure, the integrated beverage system further comprises an interactive display. The program causes the controller apparatus to present a series of interactive screens on the display, to respond to user entries via the interactive screens to define first and second sets of ingredients for the first and second beverages, to provide a first script and a second script for the first and second beverages, respectively, and to use the first and second scripts to control the dispensing module to dispense the first and second sets of ingredients into a first container and a second container, respectively, on a time shared basis.

In an embodiment of the method of the present disclosure, the method controls am integrated beverage system that comprises a dispensing module that dispenses one or more ingredients into a beverage container and a blending/mixing module that blends and/or mixes the ingredients in the beverage container. The method controls the dispensing module and the blending/mixing module to prepare first and second beverages concurrently.

In another embodiment of the method of the present disclosure, the method further comprises: controlling the dispensing module to dispense a first set of one or more ingredients for the first beverage into a first container; controlling the blending/mixing module to blend and/or mix the first set of ingredients in the first container; and simultaneously controlling the dispensing module to start dispensing a second set of one or more ingredients for the second beverage into a second container while the first set of ingredients is blending in the blending/mixing module.

In another embodiment of the method of the present disclosure, the first and second containers are beverage cups.

In another embodiment of the method of the present disclosure, the dispensing module and the blending/mixing module are controlled based on beverage requests received from a user operated entry device.

In another embodiment of the method of the present disclosure, the dispensing module is controlled to dispense ice and fluid simultaneously or in a layered manner with a layer of ice first and then a layer of fluid and optionally by another layer of ice and/or fluid.

In another embodiment of the method of the present disclosure, the one or more of ingredients are selected from the group consisting of: ice, water, flavor and additive.

In another embodiment of the method of the present disclosure, the controller apparatus monitors conditions of the integrated beverage system via connections to one or more sensors of the integrated beverage system.

In another embodiment of the method of the present disclosure, the integrated beverage system further comprises an ice maker. At least one of the ingredients is ice. The dispensing module is controlled to deliver the ice to at least of the first and second containers.

In another embodiment of the method of the present disclosure, the dispensing module comprises a plurality of storage containers. A plurality of the ingredients is stored in separate ones of the storage containers. The dispensing module is controlled to deliver at least one of the plurality of ingredients from a corresponding storage container to the first or second container.

In another embodiment of the method of the present disclosure, the storage containers are flexible bags.

In another embodiment of the method of the present disclosure, the dispensing module further comprises a single dispensing nozzle for the storage containers. The method further controls the dispensing module to deliver the selected ingredients from the separate storage containers via separate delivery paths to the nozzle for dispensing to the first or second container.

In another embodiment of the method of the present disclosure, the controller apparatus comprises a plurality of micro-controllers. The method further controls the dispensing module and the blending/mixing module to prepare the first and second beverages based on a first and a second recipe script, respectively.

In another embodiment of the method of the present disclosure, the script of the first and second recipe scripts comprises a beverage container size, a user selected beverage, and a first ingredient. At least one of the micro-controllers, based on the beverage container size, the first ingredient and the user selected beverage type, controls the dispenser module to portion the first ingredient.

In another embodiment of the method of the present disclosure, the micro-controllers comprise a first micro-controller, a second micro-controller and a third micro-controller. The method further comprises: using the first micro-controller that responds to user data entered via a user entry device to provide the first and second recipe scripts; using the second micro-controller that uses the first and second recipe scripts to control the dispensing module in the dispensing of a first set of the ingredients into a first container and a second set of the ingredients into a second container, respectively; and using a third micro-controller that uses the first and second recipe scripts to blend and/or mix the first and second sets of ingredients in the first and second containers to produce the first and second beverages, respectively.

In another embodiment of the method of the present disclosure, the blending/mixing module comprises a spindle assembly that is rotatable and that is movable vertically into and out of the beverage container. The method further comprises using the third micro-controller with the first or second script to drive a first motor that rotates the spindle assembly and a second motor that moves the spindle assembly vertically.

In another embodiment of the method of the present disclosure, one of the ingredients is ice. The method further comprises using the third micro-controller with the first or second script to rotate the spindle assembly in a first manner chop an ice particle size from coarse to fine and/or in a second manner leaves the ice in a coarse particle size.

In another embodiment of the method of the present disclosure, the first or second script includes a size of the beverage container, a speed and dwell time for each of a plurality of blending levels in the beverage container. The method further comprises using third micro-controller with the first or second script to control to move the spindle assembly vertically to each of the levels and to rotate the spindle assembly at each level with the speed and for the dwell time for that level according to the first or second script.

In another embodiment of the method of the present disclosure, the blending/mixing module further comprises a door and a position sensor. The position sensor is selected from the group consisting of: spindle assembly home, door open, and spindle assembly home and door open.

In another embodiment of the method of the present disclosure, the blending/mixing module further comprises a cleaning assembly. The method further comprises using the third micro-controller with the first or second script to operate the cleaning assembly to inject a cleaning fluid into a beverage container volume after the beverage has been removed therefrom with the first or second beverage.

In another embodiment of the method of the present disclosure, the cleaning assembly comprises a spray device located to inject the cleaning fluid, a cleaning fluid valve and an air valve in communication with a delivery conduit to the spray device. The method further comprises using the third micro-controller with the first or second script to operate the cleaning fluid valve to provide the cleaning fluid to the spray device via a conduit and the air valve to inject air into the conduit to increase a velocity of flow of the cleaning fluid in the beverage container volume.

In another embodiment of the method of the present disclosure, the cleaning assembly comprises a spindle assembly. The method further comprises using the third micro-controller to respond to the first or second script to lower the spindle assembly into the volume to enhance a coverage of the cleaning fluid within the volume.

In another embodiment of the method of the present disclosure, the cleaning fluid is selected from the group consisting of: water and sanitizing fluid.

In another embodiment of the method of the present disclosure, the blending/mixing module is a first blending/mixing module. The integrated beverage system further comprises a second blending/mixing module. The method further comprises using a controller apparatus to execute a program to concurrently prepare the first and second beverages by controlling the first and second blending/mixing modules to time share the dispensing module.

In another embodiment of the method of the present disclosure, the integrated beverage system further comprises an interactive display. The program causes the controller apparatus to present a series of interactive screens on the display, to respond to user entries via the interactive screens to define first and second sets of ingredients for the first and second beverages, to provide a first script and a second script for the first and second beverages, respectively, and to use the first and second scripts to control the dispensing module to dispense the first and second sets of ingredients into a first container and a second container, respectively, on a time shared basis.

In an embodiment of the memory media of the present disclosure. The memory media contains a program for controlling an integrated beverage system that comprises a dispensing module that dispenses one or more selected ingredients into a container and a blending/mixing module that blends and/or mixes the ingredients in the container. The memory media comprises executing with a computer apparatus instructions of the program to control the dispensing module and the blending/mixing module to prepare first and second beverages concurrently.

In another embodiment of the memory media of the present disclosure, the memory media further comprises: executing with the computer apparatus instructions of the program for controlling the dispensing module to dispense a first set of one or more ingredients for the first beverage into a first container; executing with the computer apparatus instructions of the program for controlling the blending/mixing module to blend and/or mix the first set of ingredients in the first container; and executing with the computer apparatus instructions of the program for simultaneously controlling the dispensing module to start dispensing a second set of one or more ingredients for the second beverage into a second container while the first set of ingredients is blending in the blending/mixing module.

In another embodiment of the memory media of the present disclosure, the first and second containers are beverage cups. The dispensing module and the blending/mixing module are controlled based on beverage requests received from a user operated entry device.

In another embodiment of the memory media of the present disclosure, the memory media further comprises executing with the computer apparatus instructions of the program for controlling the dispensing module to dispense ice and fluid simultaneously or in a layered manner with a layer of ice first and then a layer of fluid and optionally by another layer of ice and/or fluid.

In another embodiment of the memory media of the present disclosure, the one or more of ingredients are selected from the group consisting of: ice, water, flavor and additive.

In another embodiment of the memory media of the present disclosure, the controller apparatus monitors conditions of the integrated beverage system via connections to one or more sensors of the integrated beverage system.

In another embodiment of the memory media of the present disclosure, the integrated beverage system further comprises an ice maker. At least one of the ingredients is ice. The dispensing module is controlled to deliver the ice to at least of the first and second containers.

In another embodiment of the memory media of the present disclosure, the dispensing module comprises a plurality of storage containers. A plurality of the ingredients is stored in separate ones of the storage containers. The memory media further comprises executing with the computer apparatus instructions of the program for controlling the dispensing module to deliver at least one of the plurality of ingredients from a corresponding storage container to the first or second container.

In another embodiment of the memory media of the present disclosure, the storage containers are flexible bags.

In another embodiment of the memory media of the present disclosure, the dispensing module further comprises a single dispensing nozzle for the storage containers. The memory media further comprises executing with the computer apparatus instructions of the program for controlling the dispensing module to deliver the selected ingredients from the separate storage containers via separate delivery paths to the nozzle for dispensing to the first or second container.

In another embodiment of the memory media of the present disclosure, the controller apparatus comprises a plurality of micro-controllers. The memory media further comprises controlling the dispensing module and the blending/mixing module to prepare the first and second beverages based on a first and a second recipe script, respectively.

In another embodiment of the memory media of the present disclosure, the script of the first and second recipe scripts comprises a beverage container size, a user selected beverage, and a first ingredient. At least one of the micro-controllers, based on the beverage container size, the first ingredient and the user selected beverage type, controls the dispenser module to portion the first ingredient.

In another embodiment of the memory media of the present disclosure, the micro-controllers comprise a first micro-controller, a second micro-controller and a third micro-controller. The memory media further comprises: executing with the computer apparatus instructions of the program for using the first micro-controller that responds to user data entered via a user entry device to provide the first and second recipe scripts; executing with the computer apparatus instructions of the program for using the second micro-controller that uses the first and second recipe scripts to control the dispensing module in the dispensing of a first set of the ingredients into a first container and a second set of the ingredients into a second container, respectively; and executing with the computer apparatus instructions of the program for using a third micro-controller that uses the first and second recipe scripts to blend and/or mix the first and second sets of ingredients in the first and second containers to produce the first and second beverages, respectively.

In another embodiment of the memory media of the present disclosure, the blending/mixing module comprises a spindle assembly that is rotatable and that is movable vertically into and out of the beverage container. The memory media further comprises executing with the computer apparatus instructions of the program for using the third micro-controller with the first or second script to drive a first motor that rotates the spindle assembly and a second motor that moves the spindle assembly vertically.

In another embodiment of the memory media of the present disclosure, one of the ingredients is ice. The memory media further comprises executing with the computer apparatus instructions of the program for using the third micro-controller with the first or second script to rotate the spindle assembly in a first manner chop an ice particle size from coarse to fine and/or in a second manner leaves the ice in a coarse particle size.

In another embodiment of the memory media of the present disclosure, the first or second script includes a size of the beverage container, a speed and dwell time for each of a plurality of blending levels in the beverage container. The memory media further comprises using the third micro-controller with the first or second script to control to move the spindle assembly vertically to each of the levels and to rotate the spindle assembly at each level with the speed and for the dwell time for that level according to the first or second script.

In another embodiment of the memory media of the present disclosure, the blending/mixing module further comprises a door and a position sensor. The position sensor is selected from the group consisting of: spindle assembly home, door open, and spindle assembly home and door open.

In another embodiment of the memory media of the present disclosure, the blending/mixing module further comprises a cleaning assembly. The memory media further comprising executing with the computer apparatus instructions of the program for using the third micro-controller with the first or second script to operate the cleaning assembly to inject a cleaning fluid into a beverage container volume after the beverage has been removed therefrom with the first or second beverage.

In another embodiment of the memory media of the present disclosure, the cleaning assembly comprises a spray device located to inject the cleaning fluid, a cleaning fluid valve and an air valve in communication with a delivery conduit to the spray device. The memory media further comprises executing with the computer apparatus instructions of the program for using the third micro-controller with the first or second script to operate the cleaning fluid valve to provide the cleaning fluid to the spray device via a conduit and the air valve to inject air into the conduit to increase a velocity of flow of the cleaning fluid in the beverage container volume.

In another embodiment of the memory media of the present disclosure, the cleaning assembly comprises a spindle assembly. The memory media further comprises executing with the computer apparatus instructions of the program for using the third micro-controller in response to the first or second script to lower the spindle assembly into the volume to enhance a coverage of the cleaning fluid within the volume.

In another embodiment of the memory media of the present disclosure, the cleaning fluid is selected from the group consisting of: water and sanitizing fluid.

In another embodiment of the memory media of the present disclosure, the blending/mixing module is a first blending/mixing module. The integrated beverage system further comprises a second blending/mixing module. The memory media further comprises executing with the computer apparatus instructions of the program for concurrently preparing the first and second beverages by controlling the first and second blending/mixing modules to time share the dispensing module.

In another embodiment of the memory media of the present disclosure, the integrated beverage system further comprises an interactive display. The memory media further comprises executing with the computer apparatus instructions of the program to present a series of interactive screens on the display, to respond to user entries via the interactive screens to define first and second sets of ingredients for the first and second beverages, to provide a first script and a second script for the first and second beverages, respectively, and to use the first and second scripts to control the dispensing module to dispense the first and second sets of ingredients into a first container and a second container, respectively, on a time shared basis.

BRIEF DESCRIPTION OF THE DRAWINGS

FIG. 8 is a front perspective view of an ingredient dispensing module according to the present disclosure;

FIG. 9 is a side view of the ingredient dispensing module of FIG. 8;

FIG. 10 is a front view of the ingredient dispensing module of FIG. 8;

FIG. 11 is a top view of the ingredient dispensing module of FIG. 8;

FIG. 12 is an exploded view of the ingredient dispensing module of FIG. 13;

FIG. 40 is a listing of controller steps for selecting ingredients/flavors, additives and serving cup size according to the present disclosure;

FIG. 41 is a listing of controller steps for dispensing ingredients into a pre-selected serving cup size, selecting which blending/mixer module is to be activated and activating the selected blender according to the present disclosure;

FIGS. 42a and b are a listing of controller steps and displays for a system setup mode according to the present disclosure;

DETAILED DESCRIPTION OF THE INVENTION

Figure 1:
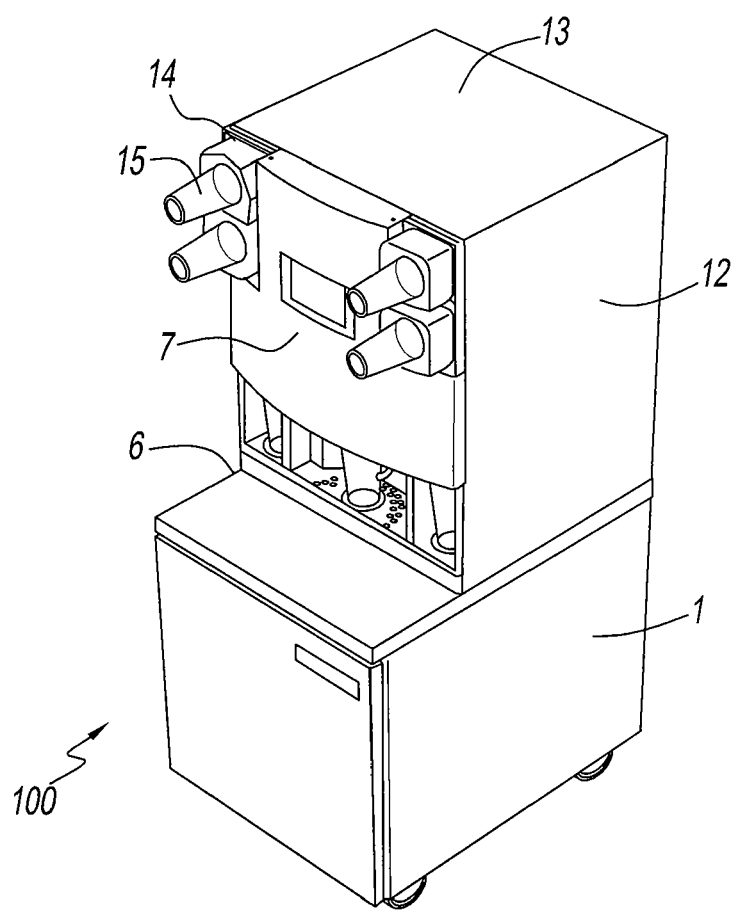
FIG. 1 is a front perspective view of an exemplary embodiment of a system that dispenses and mixes beverages according to the present disclosure.
Figure 4:
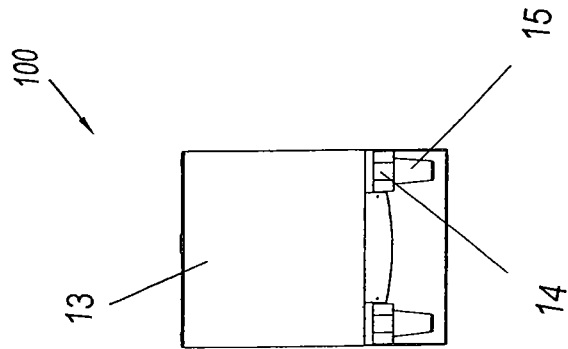
FIG. 4 is a top view of the assembly that dispenses and mixes beverages of FIG. 1.
Figure 3:
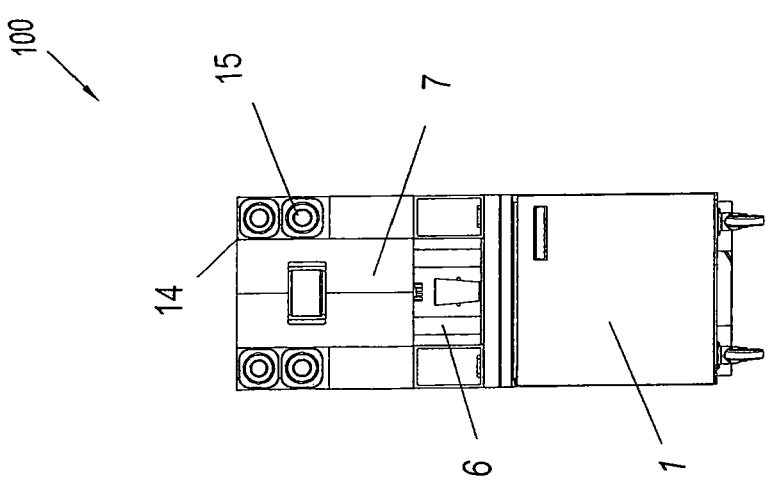
FIG. 3 is a front view of the assembly that dispenses and mixes beverages of FIG. 1.
Figure 2:
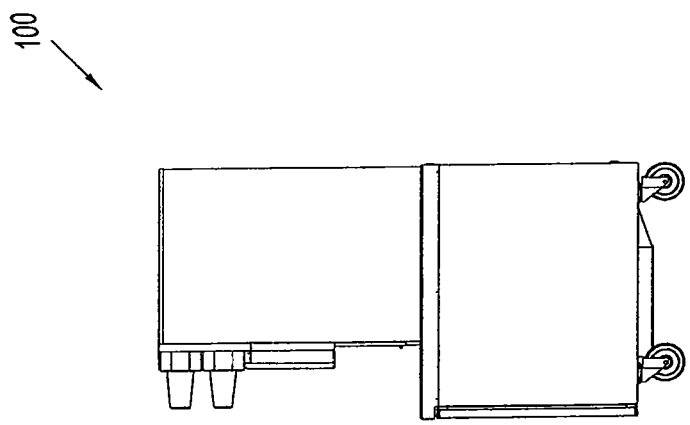
FIG. 2 is a side view of the assembly that dispenses and mixes beverages of FIG. 1.
Figure 5:
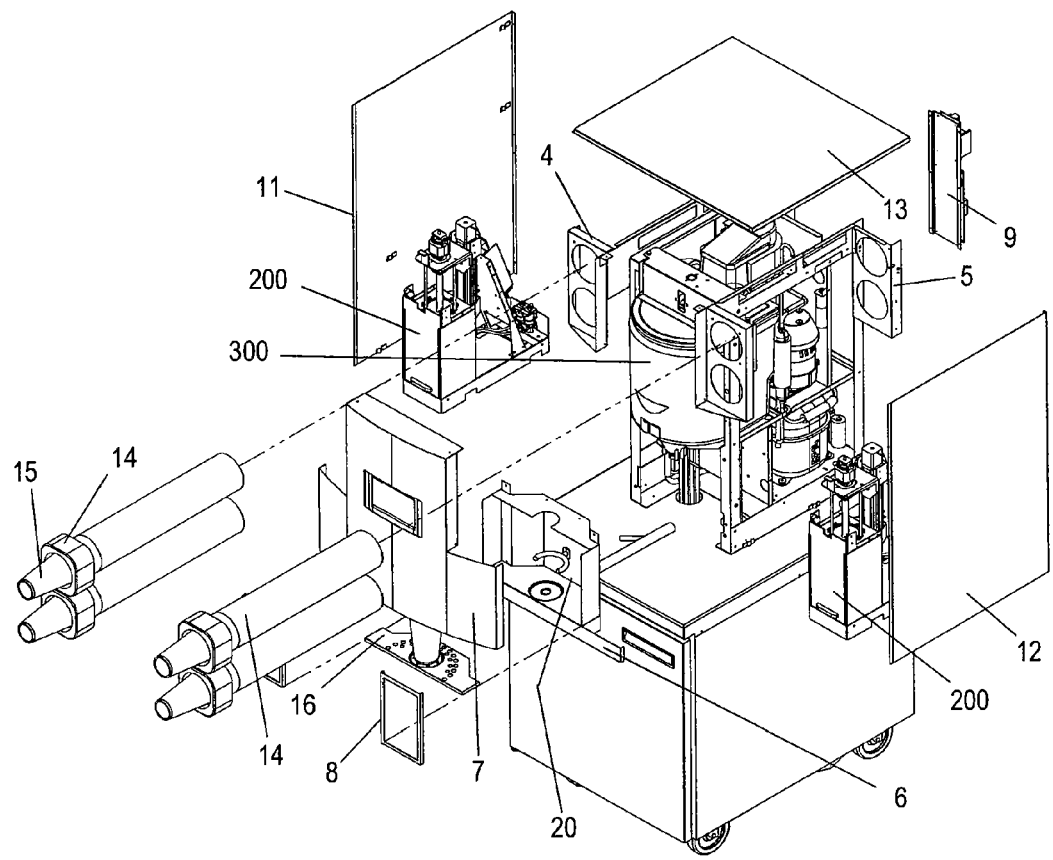
FIG. 5 is an exploded view of the assembly that dispenses and mixes beverages of FIG. 1.

Referring to the drawings and in particular to FIGS. 1-5, an exemplary embodiment of an assembly that dispenses and mixes beverages ("assembly"), according to the present disclosure is generally referred to by reference numeral 100. Assembly 100 makes ice, dispenses flavors/ingredients and ice into a serving cup 15, and then blends or mixes to form a beverage. One such beverage, for example, is a smoothie that preferably includes a flavor ingredient and ice mixed together. Assembly 100 has an onboard ice maker, ice storage and portion control module 300, a flavor/ingredient dispensing module 1100, and a blender/mixer/cleaning module 303. Assembly 100 shows ice maker, ice storage and portion control module 300, flavor/ingredient dispensing module 1100, and blender/mixer/cleaning module 303 as one integrated assembly. It is contemplated by the present disclosure that one or more of ice maker, ice storage and portion control module 300, flavor/ingredient dispensing module 1100, and blender/mixer/cleaning module 303 may be separate from assembly 100, however, it is preferable that they are all integrated into a single assembly 100. That is, vertical placement of ice maker, ice storage and portion control module 300, flavor/ingredient dispensing module 1100, and blender/mixer/cleaning module 303 reduces a size of assembly 100 and its associated flooring footprint in comparison to three separate and distinct machines.

Assembly 100 has a housing that includes a lower wall 6, an upper wall 7, side walls 11 and 12, and a top wall 13. Lower wall 6 has a container holder portion 20. The housing connects cup supports 4 and 5 that secure cup holders 14 to assembly 100. Cup holders 14 removably hold cups 15 therein. Cup 15 may be disposable or reusable single serving cups. If cup 15 is disposable, such as, for example, paper or plastic cups, the beverage dispensed and mixed within cup 15 may be served directly to a customer eliminating the step of pouring the beverage into a serving cup and eliminating labor needed to wash an additional container. Cup 15 may be any size, such as, for example, about 8 ounces to about 32 ounces.

Figure 6:
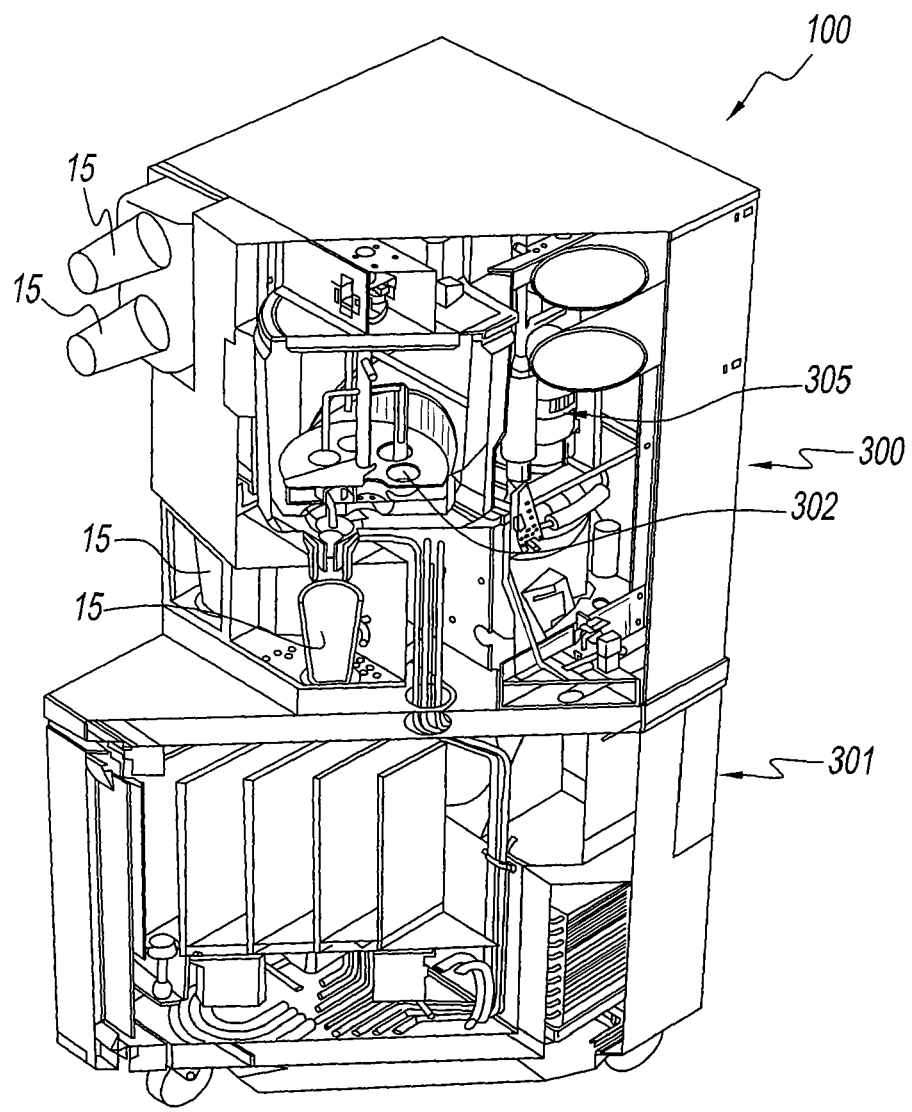
FIG. 6 is a top front left-side perspective view of the system of the present disclosure wherein the front left-side portion has been cut away to depict each of the ice making and portioning module, and dispensing module.
Figure 7:
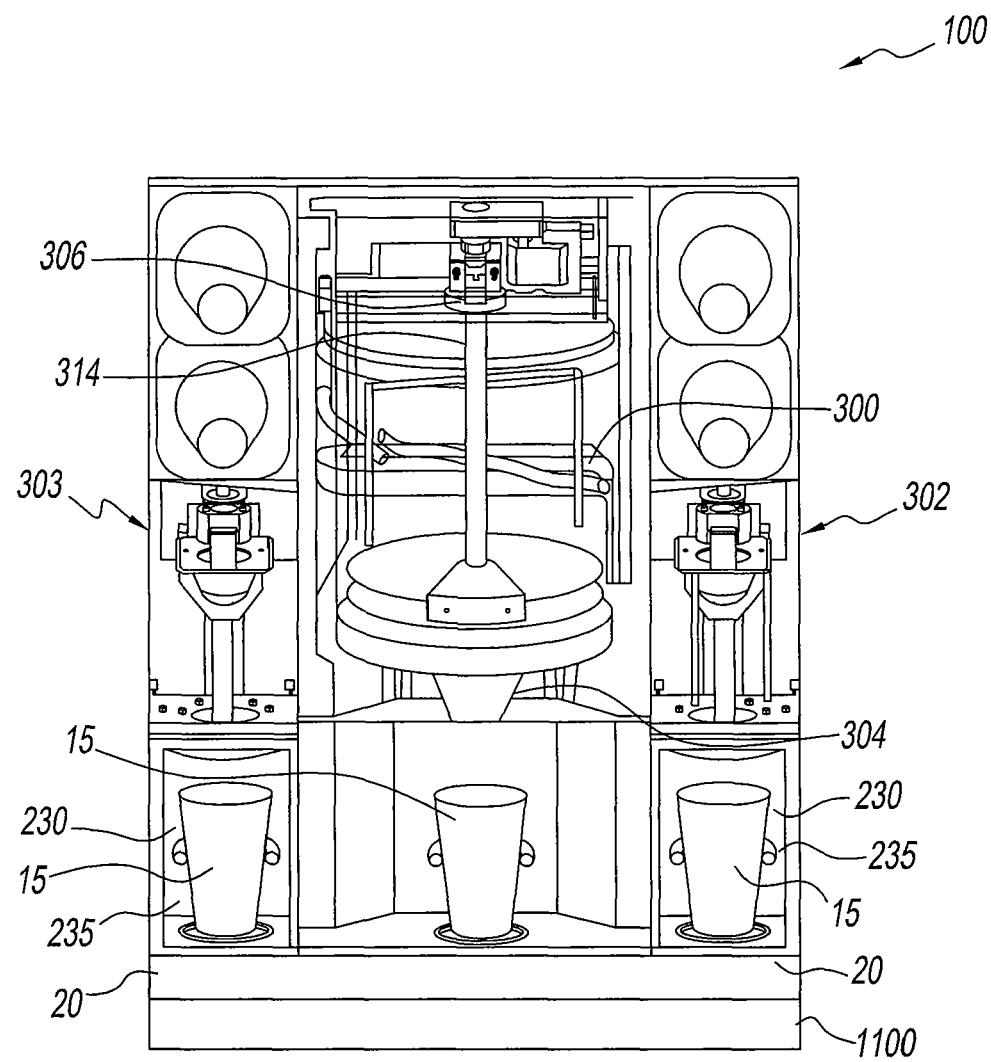
FIG. 7 is a partial front cross-sectional view of the integrated ice maker bin and portion control assembly, dispensing nozzle and pair of oppositely disposed mixer/cleaning modules according to the present disclosure.

FIGS. 6 and 7 provide an overview of the integrated assembly 100 according to the present disclosure, wherein assembly 100 comprises: flavor/ingredient dispensing module 301, ice maker, ice storage and portion control module 300 and a pair of blender/mixer/cleaning modules 303 disposed on opposite sides of dispensing nozzle 304. Ice maker, ice storage and portion control module 300 includes an ice maker 305. Ice maker 305 may be any ice maker, and, preferably an ice maker that forms flakes of ice. For example, ice maker 305 may include an ice making head of cylindrical configuration in which a water container that is filled with water from a water source has at least one refrigerated wall forming a freezing chamber cooled by a flow of refrigerant gas, and a motor driven scraper which continuously breaks up ice forming on the refrigerated surface into ice flakes. The refrigerant gas may be cooled by a refrigeration cycle, such as, for example, a vapor compression cycle that includes a compressor, condenser, expansion valve, and evaporator. One or more of the compressor, condenser, expansion valve, and evaporator may be integral with assembly 100 or remote from the rest of assembly 100. For example, compressors may create undesirable noise and may be remotely located from the rest of assembly 100. Ice maker 305 may include an axially-extending auger or auger assembly that is rotatably disposed within the freezing chamber and generally includes a central body portion with one or more generally spirally-extending flight portions thereon disposed in the space between the central body portion and the refrigerated wall in order to rotatably scrape ice particles from the cylindrical freezing chamber. A drive means assembly rotatably drives the auger such that when make-up water is introduced into the freezing chamber through a suitable water inlet and frozen therein, the rotating auger forcibly urges quantities of ice particles through the freezing chamber to be discharged through an ice outlet end.

Nugget ice may be made from the flakes by passing the flakes of ice through an extruder head where a nugget shape is formed. Nugget ice is different from cube style ice in that the nugget is not homogenous but is multiple flakes of ice compressed into a nugget. Nugget ice is softer ice (easier to chew) that requires less power to mix into a beverage. Ice maker, ice storage and portion control module 300 is shown as mounted as an integral part of assembly 100 but can be located remotely and ice mechanically transported to assembly 100. The nuggets of ice are pushed through the extruder head and this force can be used to transport the ice to assembly 100, which may allow for larger ice output. Ice maker 305 reduces an overall sound level and allows for operation near a front counter or drive-through window without impacting communications. The use of nugget ice also allows the operator to use a single serving cup for dispensing, blending and serving the consumer because the stress of blending cubed ice is reduced.

Referring to FIGS. 8-17, flavor/ingredient dispensing module 1100 is shown. Referring to FIG. 12, flavor/ingredient dispensing module 1100 has a refrigerated housing 1110. Refrigerated housing 1110 includes a refrigeration cycle, such as, for example, a vapor compression cycle that includes a compressor, condenser, expansion valve, and evaporator. One or more of the compressor, condenser, expansion valve, and evaporator may be integral with flavor/ingredient dispensing module 1100 or remote from the rest of flavor/ingredient dispensing module 1100. For example, compressors may create undesirable noise and may be remotely located from the rest of assembly 100.

Figure 13:
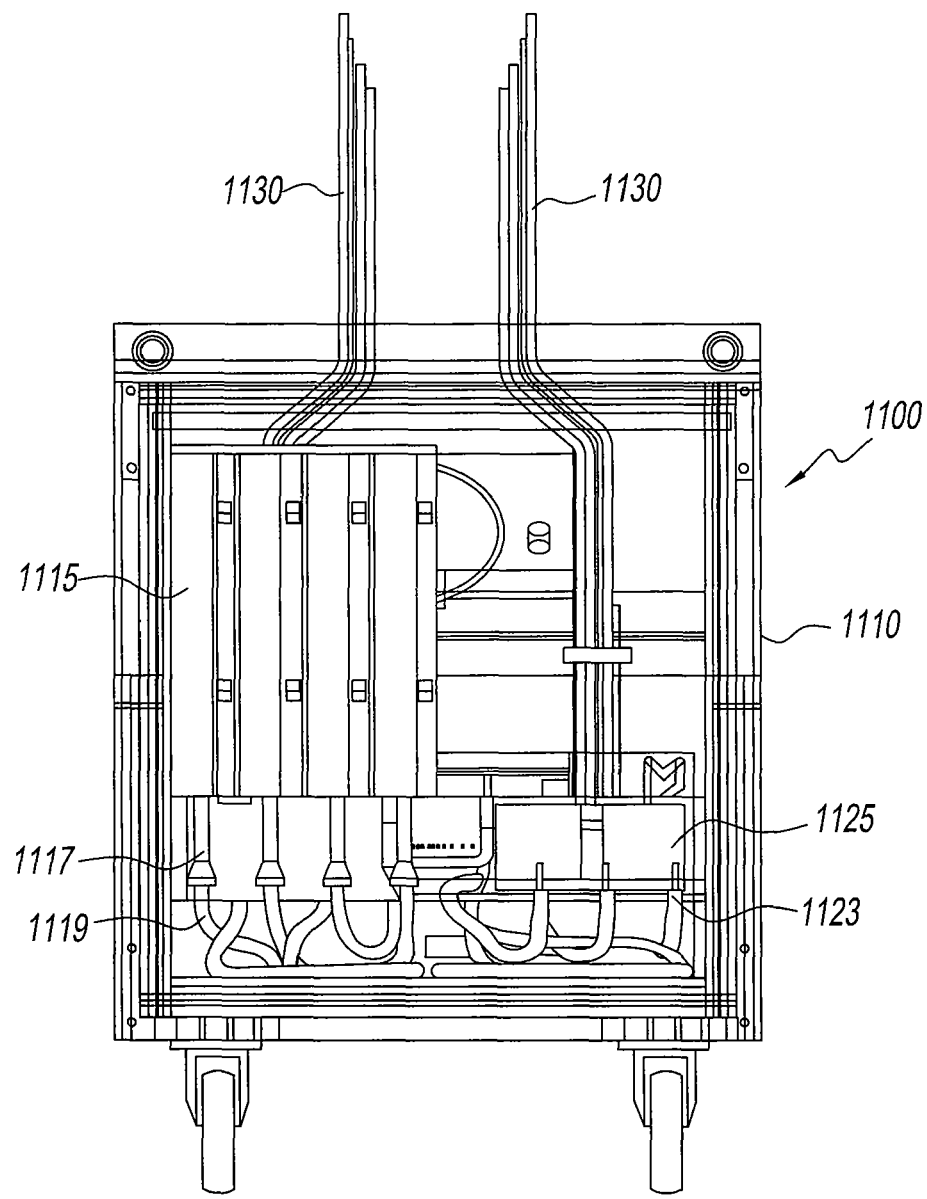
FIG. 13 is a front perspective view of an ingredient dispensing module according to the present disclosure.
Figure 13A:
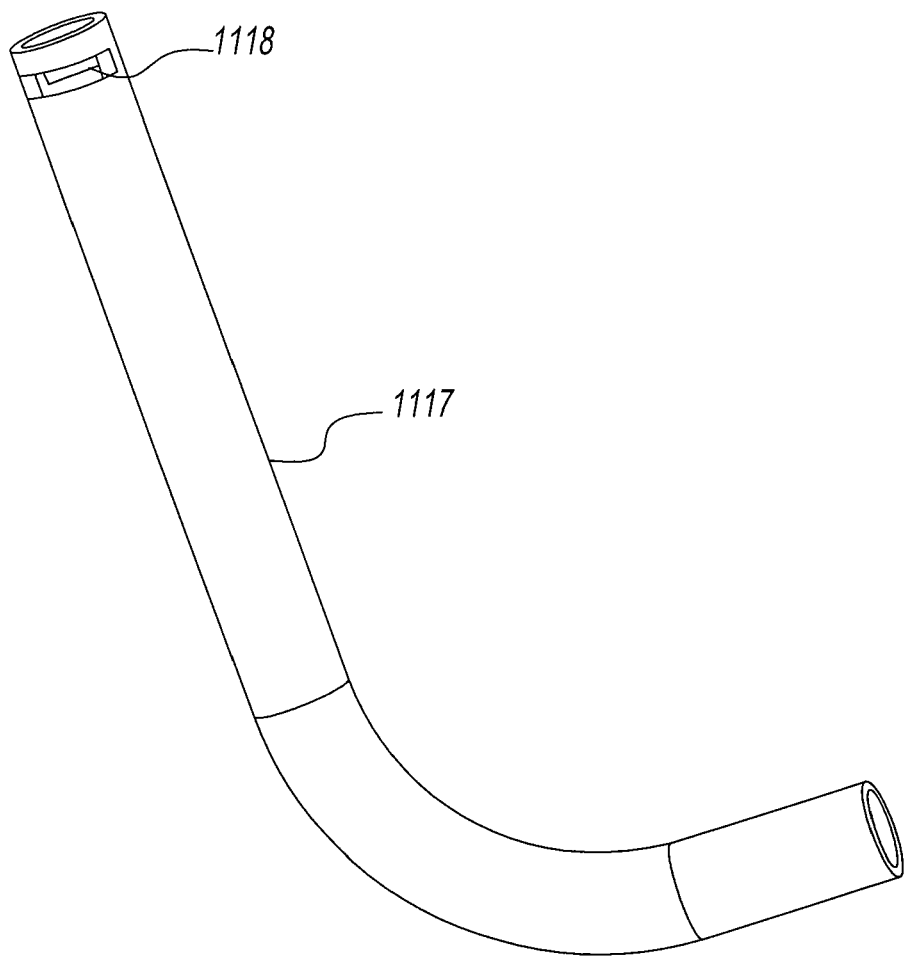
FIG. 13a is a connection apparatus for use with the ingredient dispensing module of FIG. 13.

Refrigerated housing 1110 cools one or more holders or cassettes 1115. Holders 1115 each hold a flexible container via a hanging rod 1117 (see FIG. 17, such as, for example, a bag, that contains an ingredient for the beverage. The bag may be a 2.5 gallon bag. The ingredient may be a flavored liquid or mix. The ingredient is cooled while stored in holders 1115 by refrigerated housing 1110 having a door 1111 and wheels 1113. Each of holder has a connection aperture 1117 with a gap 1118 (see FIG. 13a) for allowing substantially all of the flavor/ingredient disposed in container 1115 to be removed without concern regarding the collapsing of the bag (not shown). Connection aperture 1117 of each of holders 1115 is connected to a conduit 1119 that passes through a base 1120. As shown in FIG. 13, conduit 1119 may connect to a pump rack 1123. Pump rack 1123 has one or more pumps 1125 that selectively move a portion of the ingredient from the bag/container in holders 1115 through connection aperture 1117, to conduit 1119, to a line conduit 1130, and to dispenser nozzle 304 to dispense the ingredient out of assembly 100, for example, to cup 15. The ice and the ingredient are dispensed into cup 15 but are segregated from each other until dispensed into cup 15 to prevent contamination. There is an ingredient dispense tube for each ingredient in each of holders 1115 and one ice nozzle in nozzle 304. See FIGS. 15 and 16 for a view of nozzle 304 formed by injection molding of a plastic material to provide an ice chute conduit 1126 centrally disposed within nozzle 304 and a plurality of flavor/ingredient dispensing apparatus 1127

Figure 14:
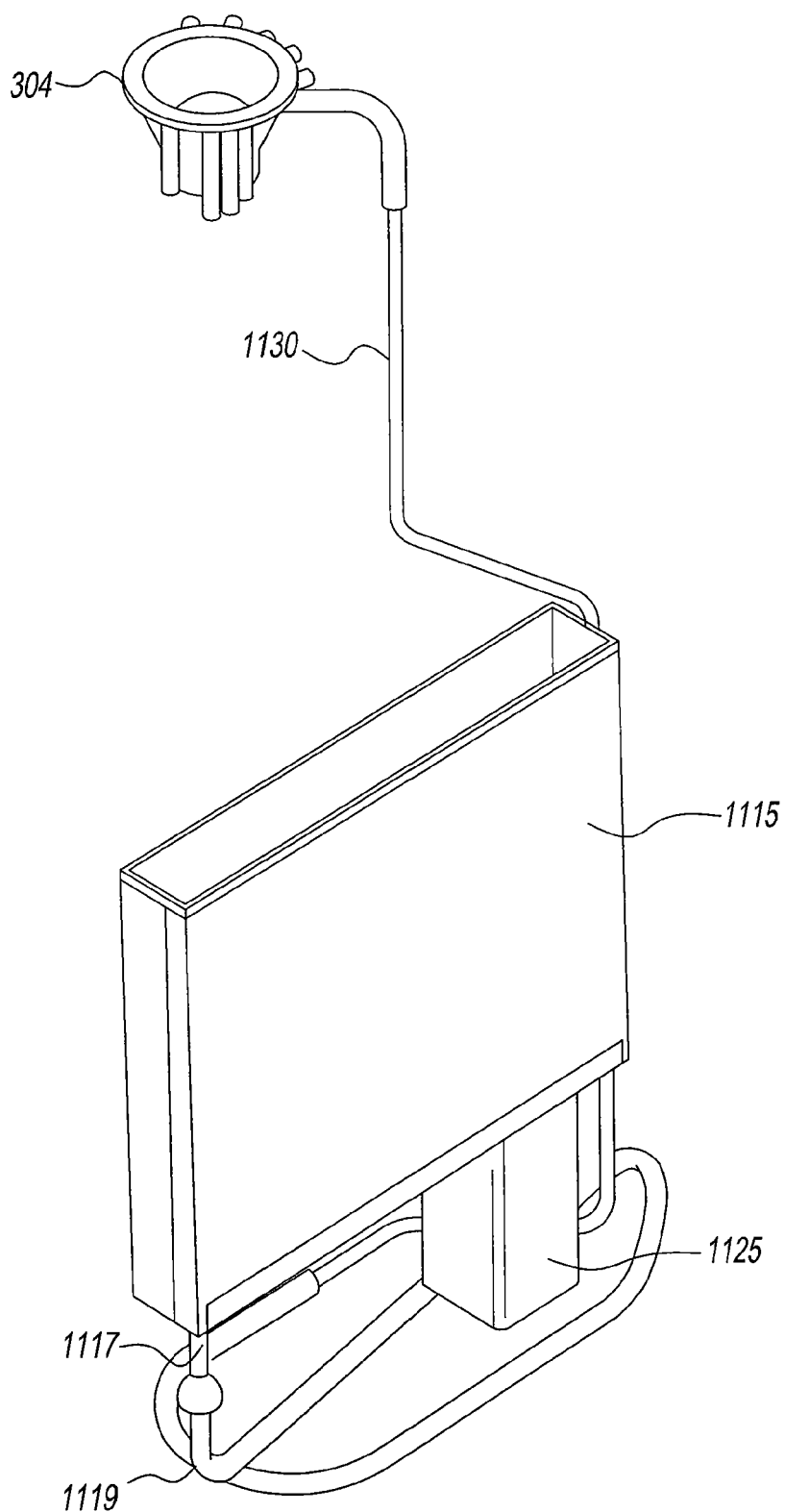
FIG. 14 is a front perspective view of an flavor/ingredient dispensing module according to the present disclosure.
Figure 15:
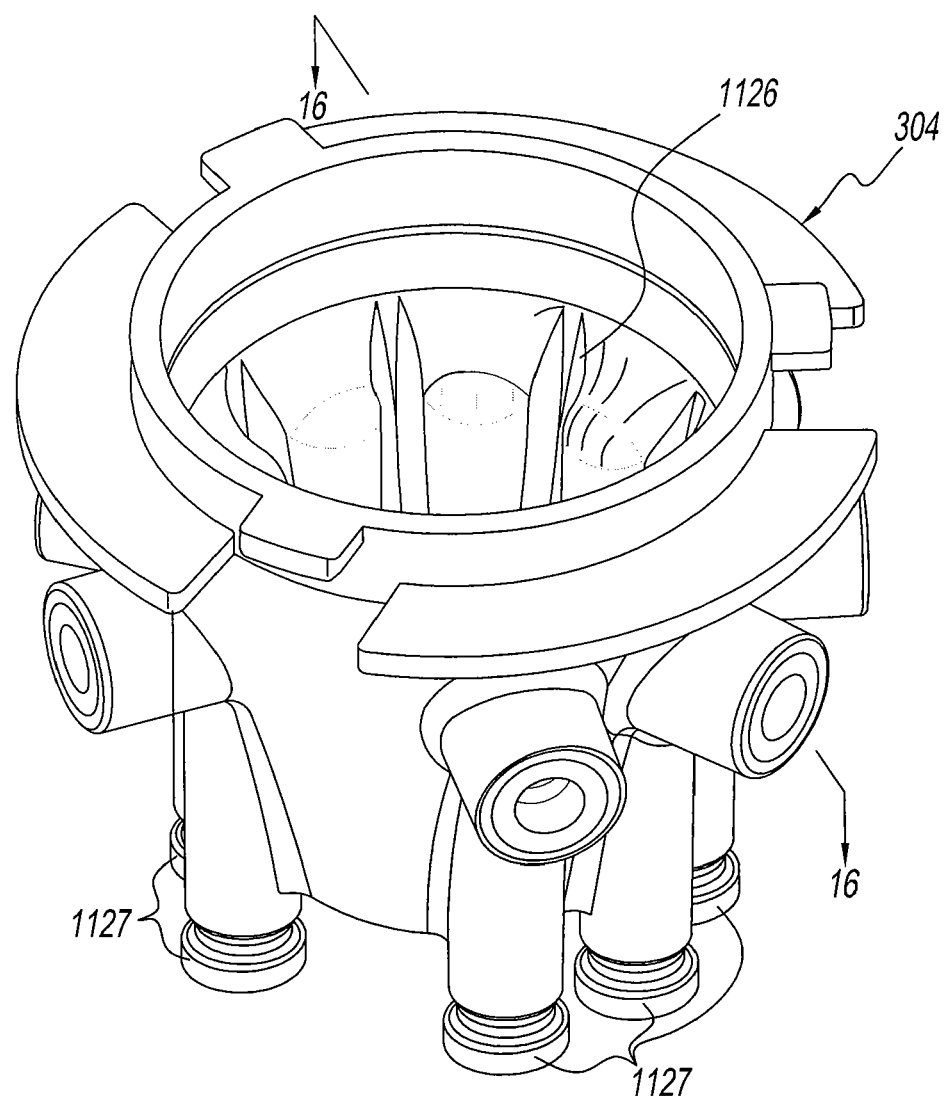
FIG. 15 is a top front side perspective view of a ice chute and ingredient dispensing nozzle according to the present disclosure.
Figure 16:
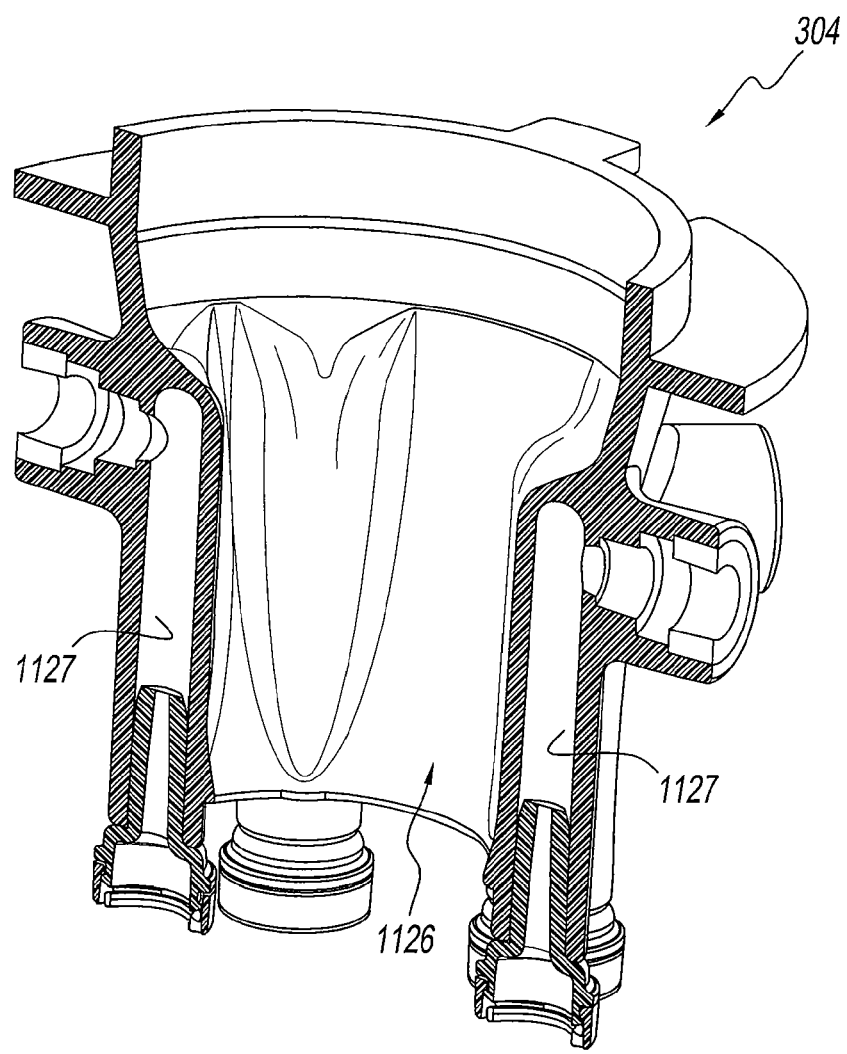
FIG. 16 is a cross-sectional view of the nozzle of FIG. 15 along line 16-16.
Figure 17:
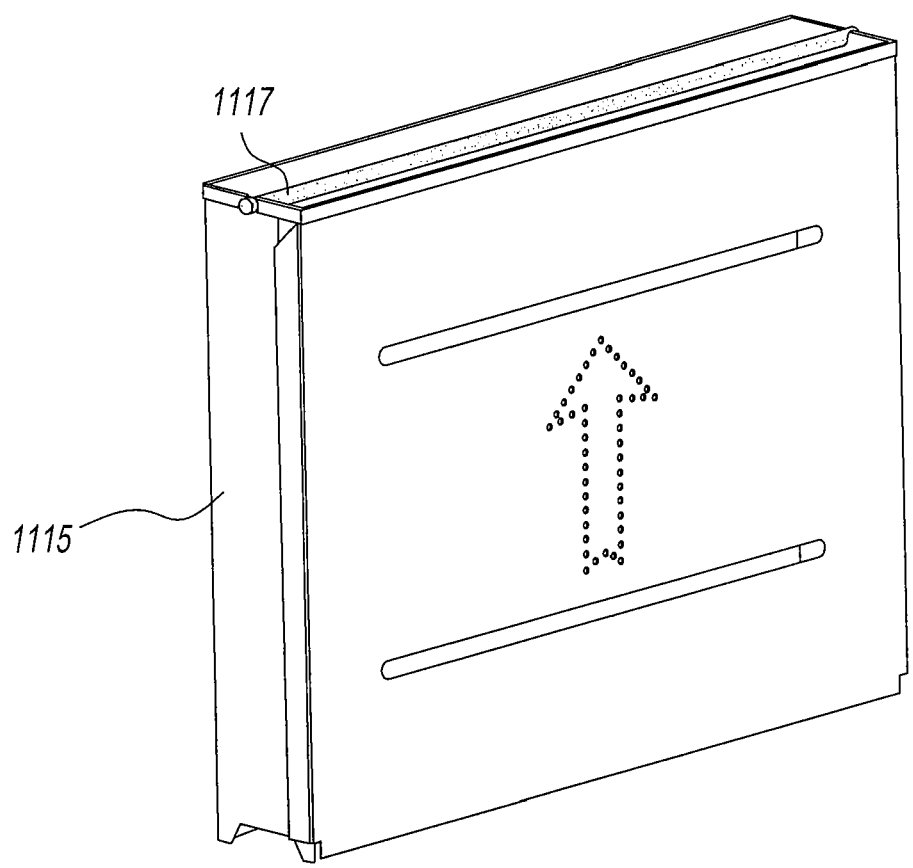
FIG. 17 is a top front right side perspective view of a ingredient dispensing cassette with a support bar according to the present disclosure.
Figure 18:
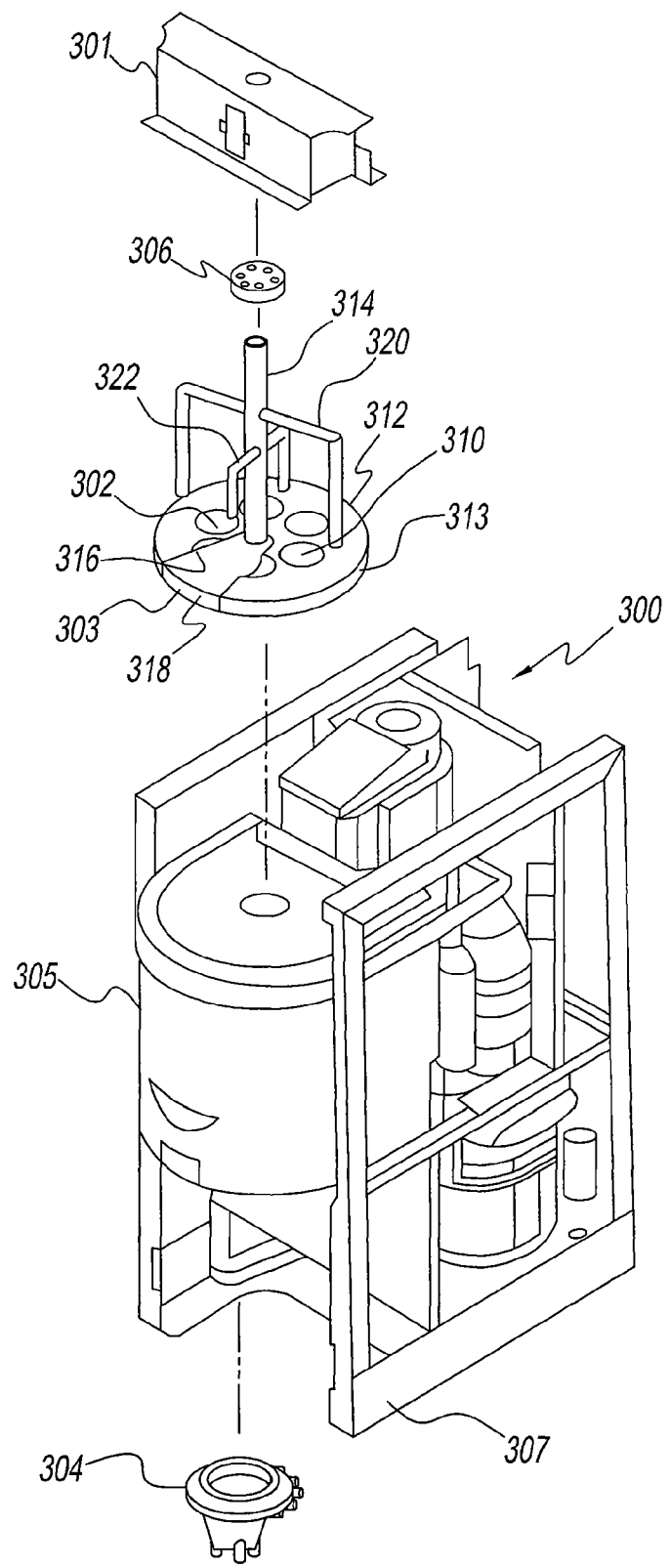
FIG. 18 is a top front right side perspective view of an ice dispensing module according to the present disclosure, wherein the ice portion control assembly has been removed therefrom and shown in an exploded view.
Figure 19:
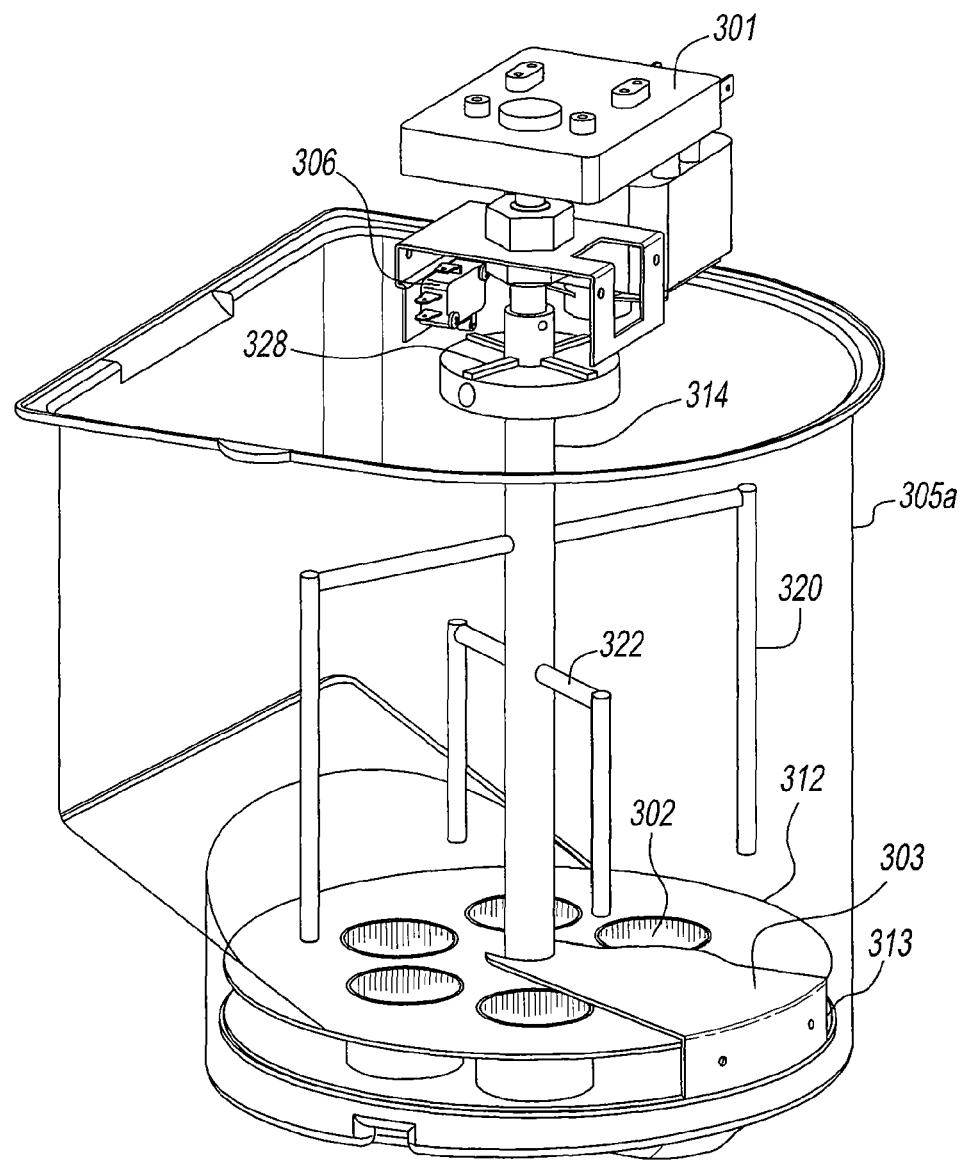
FIG. 19 is top left side perspective view of an ice bin, rake and portion control assembly according to the present disclosure.
Figure 20:
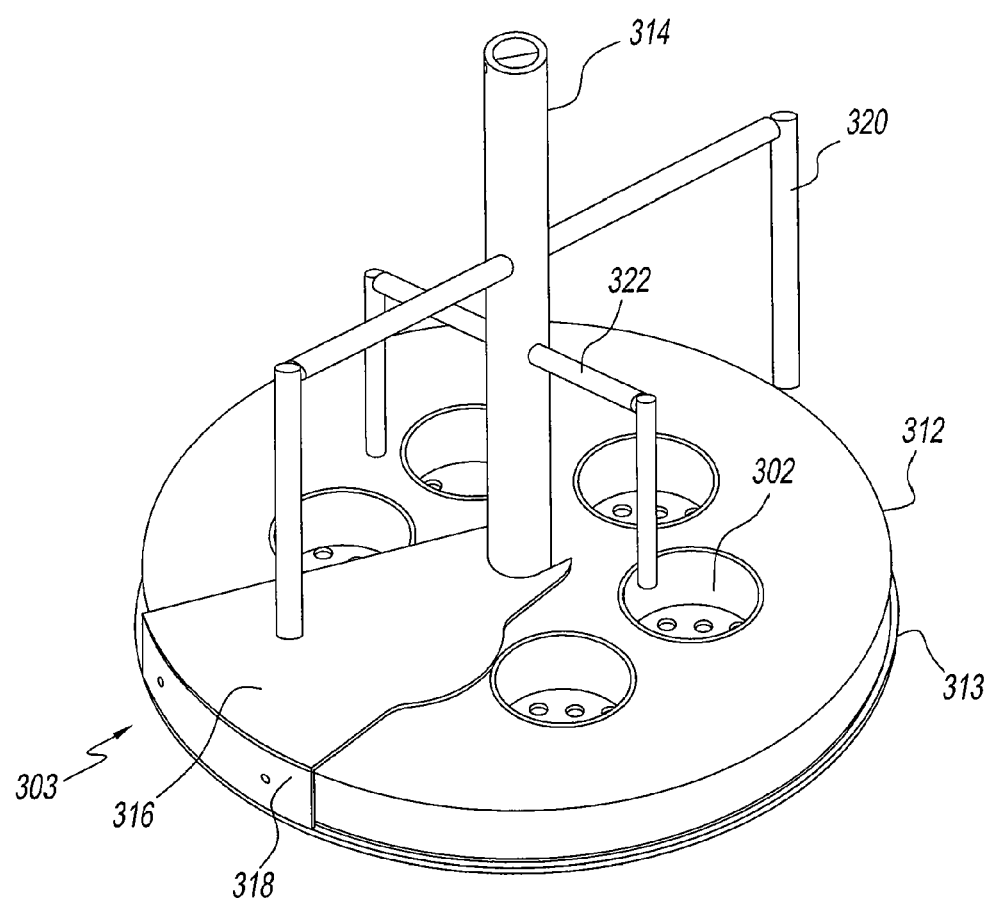
FIG. 20 is a top front perspective view of the rake and portion control assembly of FIG. 19.
Figure 21:
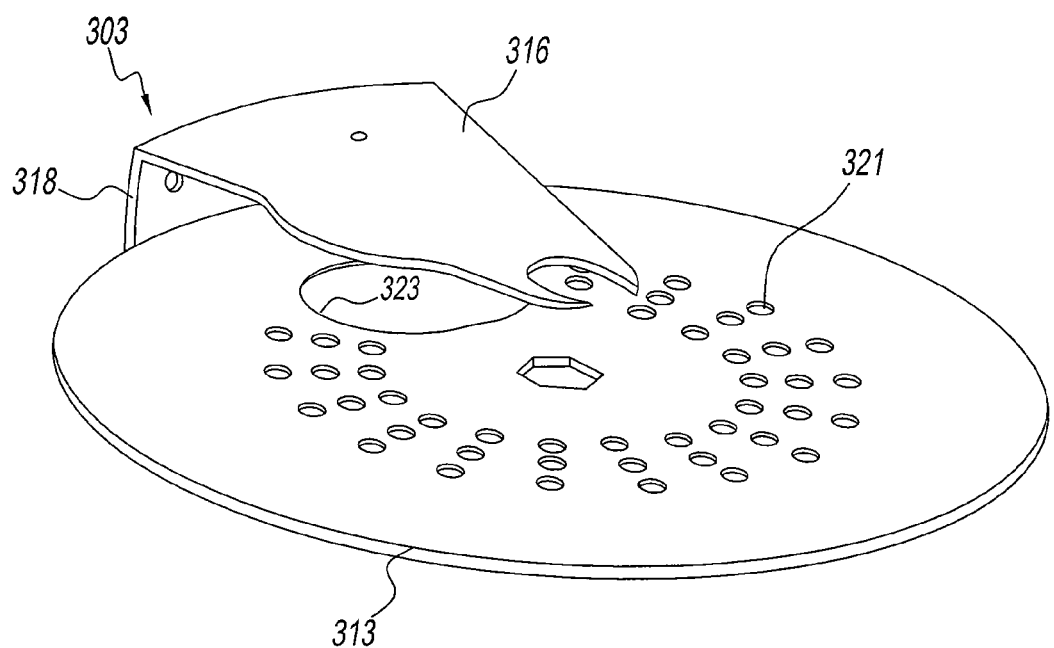
FIG. 21 is a top front perspective view of an ice leveler and bottom plate components of the portion control assembly of FIG. 20.
Figure 22:
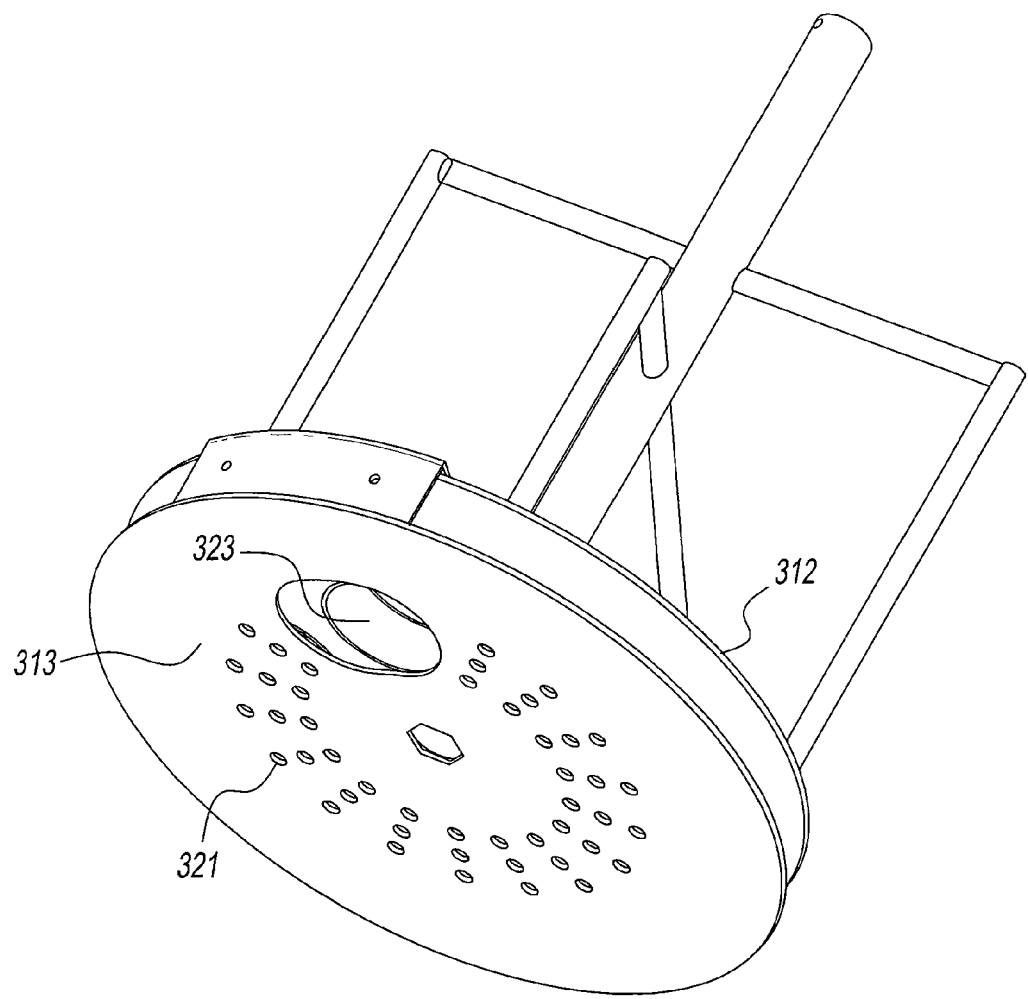
FIG. 22 is a bottom front perspective view of the rake and portion control assembly of FIG. 19.
Figure 23:
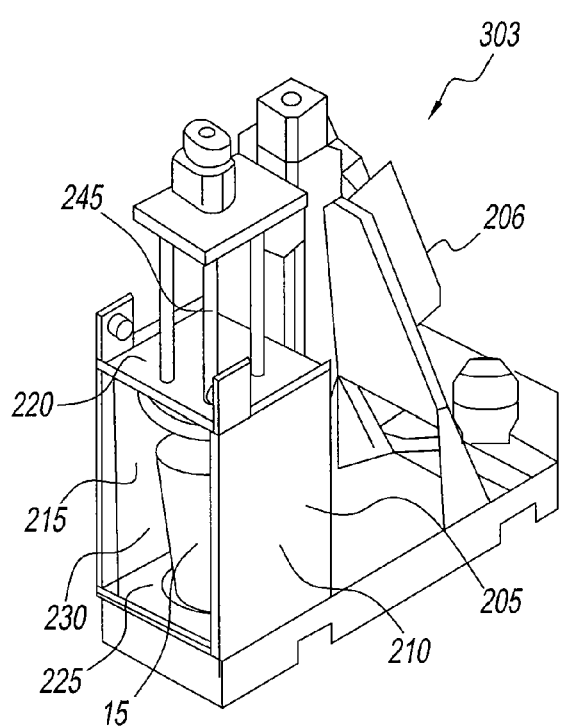
FIG. 23 is a top front right side perspective view of a blender/mixer/cleaning module according to the present disclosure.
Figure 25:
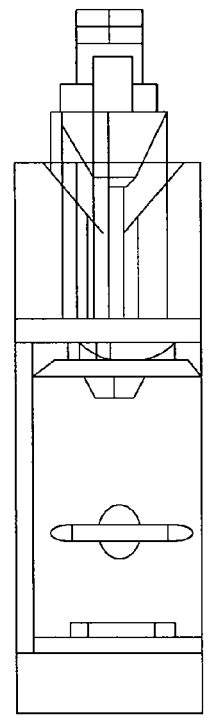
FIG. 25 is a front view of the blender/mixer/cleaning module of FIG. 23.
Figure 24:
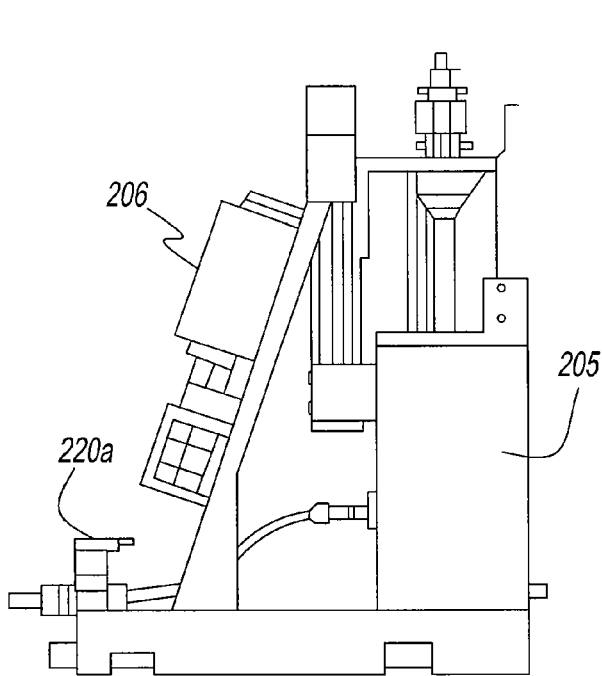
FIG. 24 is a side view of the blender/mixer/cleaning module of FIG. 23.
Figure 26:
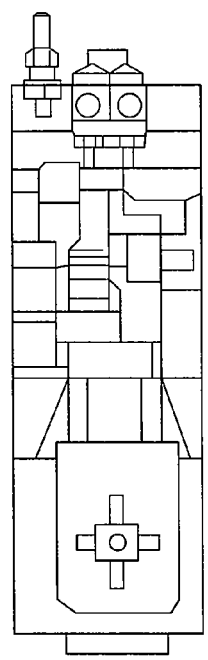
FIG. 26 is a top view of the blender/mixer/cleaning module of FIG. 23.

As shown in FIG. 14, conduit 1119 may connect to a pump 1125. Pump 1125 selectively moves a portion of the ingredient from the container in holders 1115 through connection aperture 1117, to conduit 1119, to a line conduit 1130, and to dispenser nozzle 304 to dispense the ingredient out of assembly 100, for example, to cup 15. Pump 1125 may be an air powered pump that may include a diaphragm.

A portion of the ingredient, such as, for example, a fruit base, may be controlled by time. A controller maintains accuracy by determining an amount of the fruit base that has been delivered from the container in holder 1115. As a fluid level decreases within the container within holder 1115, the controller allocates a longer delivery time to compensate for a decrease in head pressure within the container within holder 1115. Pump 1125 may be positive displacement and a controller controls the pumps on a time basis. The time can be adjusted to control portion accuracy. Assembly 100 may only dispense ice from ice maker, ice storage and portion control module 300 into cup 15 and not an ingredient from flavor/ingredient dispensing module 1100.

As shown in FIGS. 18-22, ice maker, ice storage and portion control module 300 has one or more portion cups 302 that are fillable with ice. Portion cups 302 are formed by apertures 310 through a top plate 312. Plate 312 may have a circular shape. Each of apertures 310 has a sidewall that extends from top plate 312. Top plate 312 is positioned on a bottom plate 313 so that the sidewall of each aperture 310 abuts bottom plate 313 forming an interior volume for each of portion cups 302. Portion cups 302 have a predetermined size to hold a predetermined volume of ice. Portion cups 302 may be any size, such as, for example, about 1 ounce. Bottom plate 313 has a dispensing aperture 323 that is aligned with a nozzle 304. As shown in FIG. 7, dispenser nozzle 304 extends through a top side of container holder portion 20.

Top plate 312 is connected to a drive assembly 301 by a connector bar 314 to rotate portion cups 302. Drive assembly 301 may be, for example, a gear drive motor. Portion cups 302 that are filled with ice rotate with connector bar 314 on bottom plate 313 while bottom plate 313 remains stationary. Each of portion cups 302 remains filled with ice on bottom plate 313 until the portion cup passes over the dispenser aperture in bottom plate 313. The ice in the portion cup passes through the dispenser aperture in bottom plate 313 to dispenser nozzle 304 that dispenses the ice out of assembly 100, for example, into cup 15. Water is removed from cups 302 via perforated holes 321 disposed in bottom plate 313.

Connector bar 314 connects to drive assembly 301 through a sensor 306. Connector bar 314 may include a cam or one or more protrusions 328 that fit within sensor 306 to form a cam follower and micro-switch for counting the number of portion cups 302 which dispense ice via dispensing aperture 323. Connector bar 314 may be connected to stirrer bars 320 and 322. Bars 320 and 322 are ice agitators that rotate through the ice in a storage bin 305a shown in FIG. 6 of ice dispenser 305. Their purpose is to keep the nugget ice from clumping together which would prevent the ice from filling into the ice cups.

The ice from ice dispenser 305 fills cups 302. Ice dispensing assembly 300 controls an amount of ice dispensed out of assembly 100 by controlling an amount of portion cups 302 that pass over a dispenser nozzle 304. Portion cups 302, for example, are round and hold a predetermined amount of ice. The number of portion cups 304 that pass over dispenser nozzle 304 determine the size of the drink being prepared. Portion cups 302 hold the predetermined amount of ice in the interior volume and as the size of the volume of ice increases or decreases a number of portion cups 302 that pass over dispenser nozzle 304 increases or decreases based on the predetermined amount of ice needed for each beverage. The cam follower and micro-switch are used to count a number of portion cups 302 that pass over dispenser nozzle 304. Counting a number of portion cups 302 that pass over dispenser nozzle 304 prevents positioning one of portion cups 302 partially over dispenser nozzle 304. A weight of the ice in storage bin 305a of ice dispenser 305 causes the ice cups to fill. As the assembly rotates the ice is leveled by a wedge 303 to provide accurate portioning. Portion control wedge 303 closes off a top of portion cups 302 as they pass towards a dispense chute above dispenser nozzle 304 after being filled with ice, thereby ensuring that a consistent portion of ice is present in each cup 302 before is releases its content into dispense chute 1126 disposed within nozzle 304. Wedge 303 may be a sheet metal wedge with a top portion 316, a side portion 318, and a bottom portion (not shown) that surround top plate 312 and bottom plate 313.

FIGS. 23-35 depict a, blender/mixer/cleaning module 303 of assembly 100. It is contemplated that assembly 100 may include, for example, from one blender/mixer/cleaning module up to six or more blender/mixer/cleaning modules. More than one blender/mixer/cleaning module 303 allows for creation of a second beverage while mixing a first beverage, contributing to higher beverage output by assembly 100.

Figure 27:
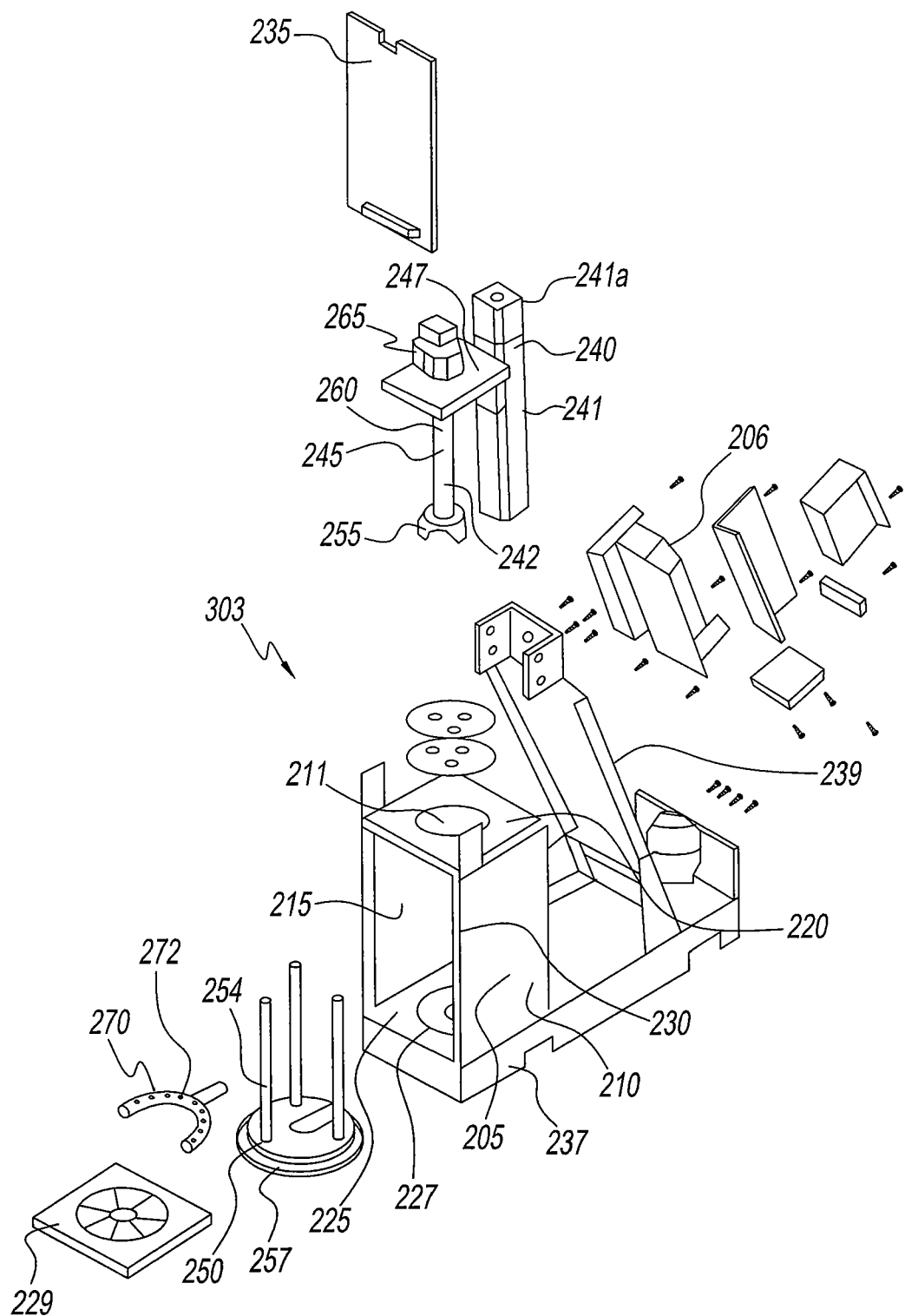
FIG. 27 is an exploded view of the blender/mixer/cleaning module of FIG. 23.
Figure 28:
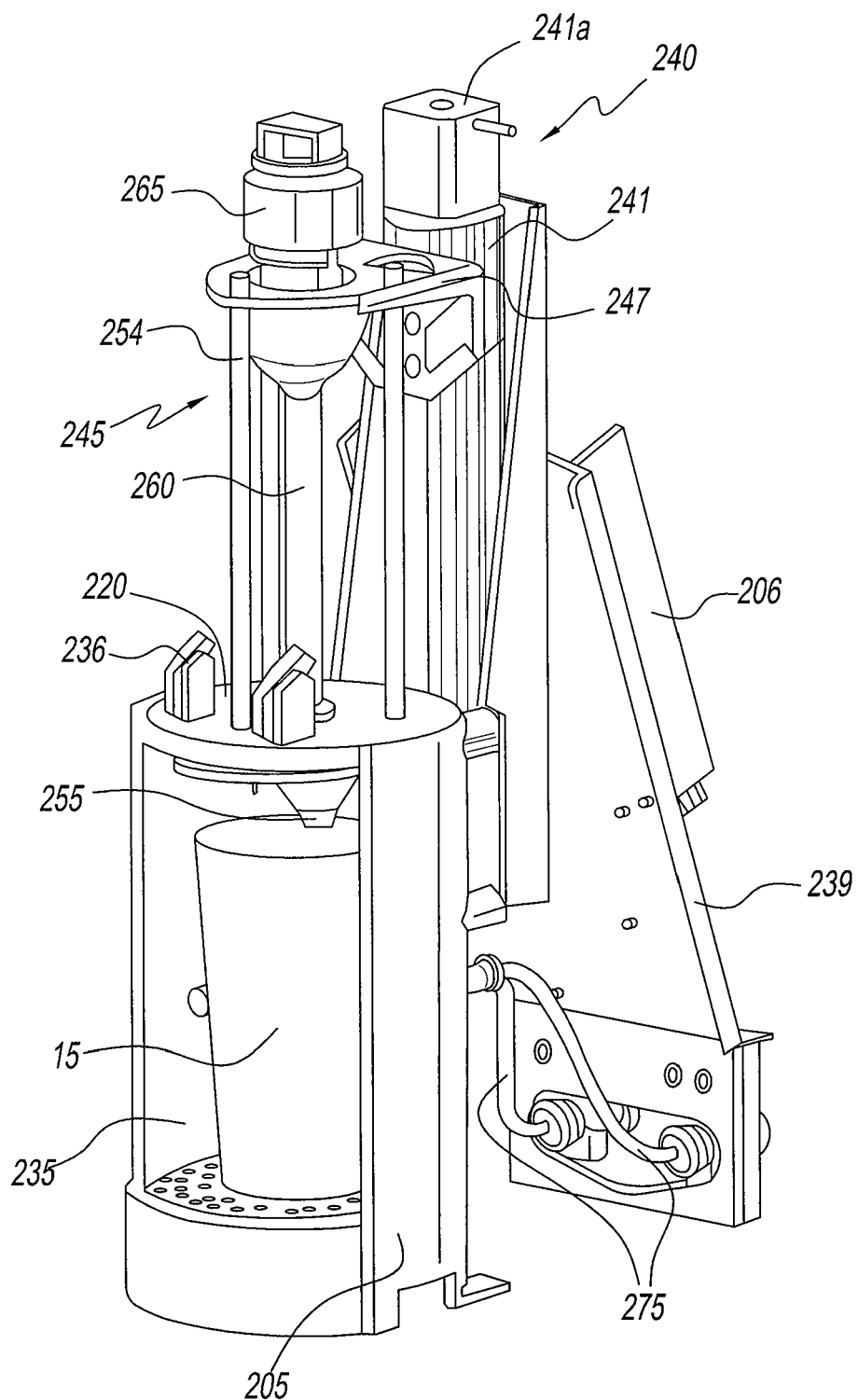
FIG. 28 is a front right side perspective view of the blender/mixer/cleaning module according to the present disclosure with a serving cup disposed therein, the blending blade in the retracted position and the door in the closed position.
Figure 29:
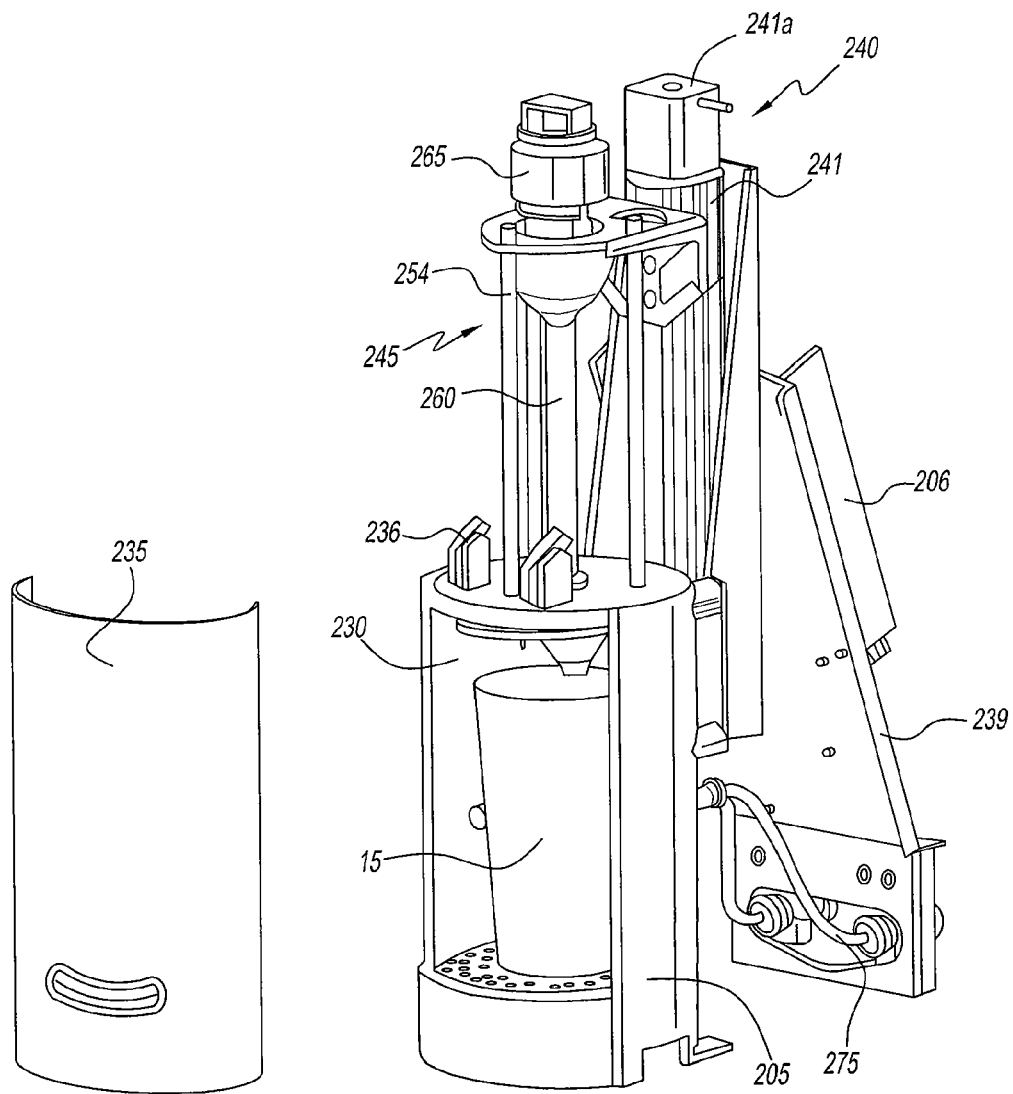
FIG. 29 is front right side perspective view of the blender/mixer/cleaning module of FIG. 28, wherein the door has been removed from the module.

As shown in FIG. 27, blender/mixer/cleaning module 303 has a mixer housing 205. Mixer housing 205 has a first side wall 210, a second side wall 215, a back wall 217, a top wall 220, and a bottom wall 225 forming an interior volume 230. Interior volume 230 may be enclosed by a door 235 that moves to a closed position when in blending, mixing or cleaning mode, shown in FIGS. 7 and 28, and an open position uncovering interior volume 230 when blender/mixer/cleaning module 303 is in a load or unload mode. Optionally, door 235 may be a material that is transparent or translucent so that interior volume 230 is visible when door 235 is in the closed position. Door 235 is removable for maintenance as shown in FIG. 29. Bottom wall 225 may have a drain aperture 227. Drain aperture 227 may be covered by a filter cover 229.

Mixer housing 205 is optionally supported on a support structure 237. Support structure 237 has a motor support 239 that extends therefrom. Motor support 239 is connected to a motor 240. Motor 240 may be a stepper motor 241a with a linear slide 241 that is connected to motor support 239. Motor 240 is connected to a mixer 245. Motor 240 may be connected to mixer 245 by a bracket 247 that is moved by motor 240. Motor 240 moves spindle shaft 260 of mixer 245 in a reciprocal vertical movement through top wall 220 into or out of interior volume 230.

Figure 34:
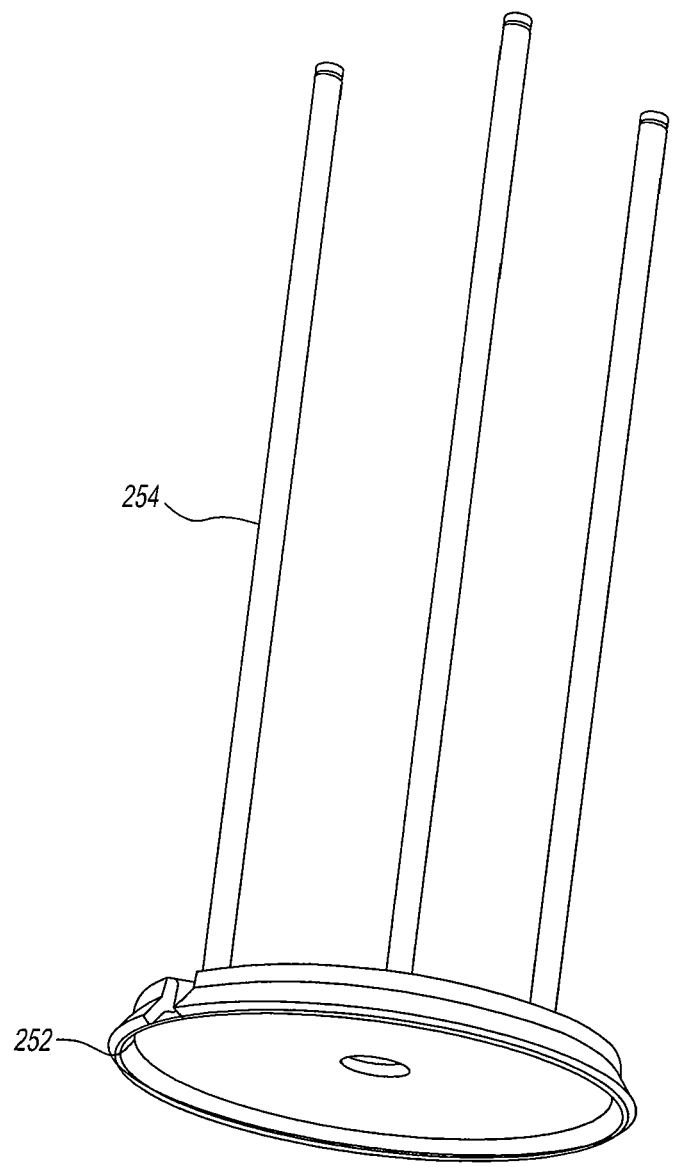
FIG. 34 is a bottom front perspective view of the serving cup lock and seal lid used in the blender/mixer/cleaning module of FIG. 28.

Mixer 245 may be connected to a lid assembly 250, as shown in FIG. 34. Lid assembly 250 has a lid 252 and a plurality of alignment rods 254. Lid 252 is complementary in shape to a container, for example, a cup 15 having liquid therein placed within interior volume 230. Lid assembly 250 may move with mixer 245 into interior volume 230 into contact with cup 15. Lid assembly 250 remains in contact with cup 15, once lid assembly 250 is in contact with cup 15 while mixer 245 may move further into interior volume 230 along a length of connection rods 254. Spindle shaft 260 does not engage or spin until lid assembly 250 is in contact with cup 15 to prevent and spray or splatter. When mixer 245 is retracted toward top wall 220, mixer 245 moves along the length of alignment rods 254 until an end of alignment rods 254 is reached and then lid assembly 250 moves with mixer 245.

Mixer 245 has a spindle assembly 242 having a blender blade 255 that is wider than a spindle shaft 260. Blender blade 255 has projections that facilitate mixing of liquid within the cup 15. Spindle shaft 260 connects to a mixer motor 265 that spins blender blade 255 and spindle shaft 260.

Figure 33:
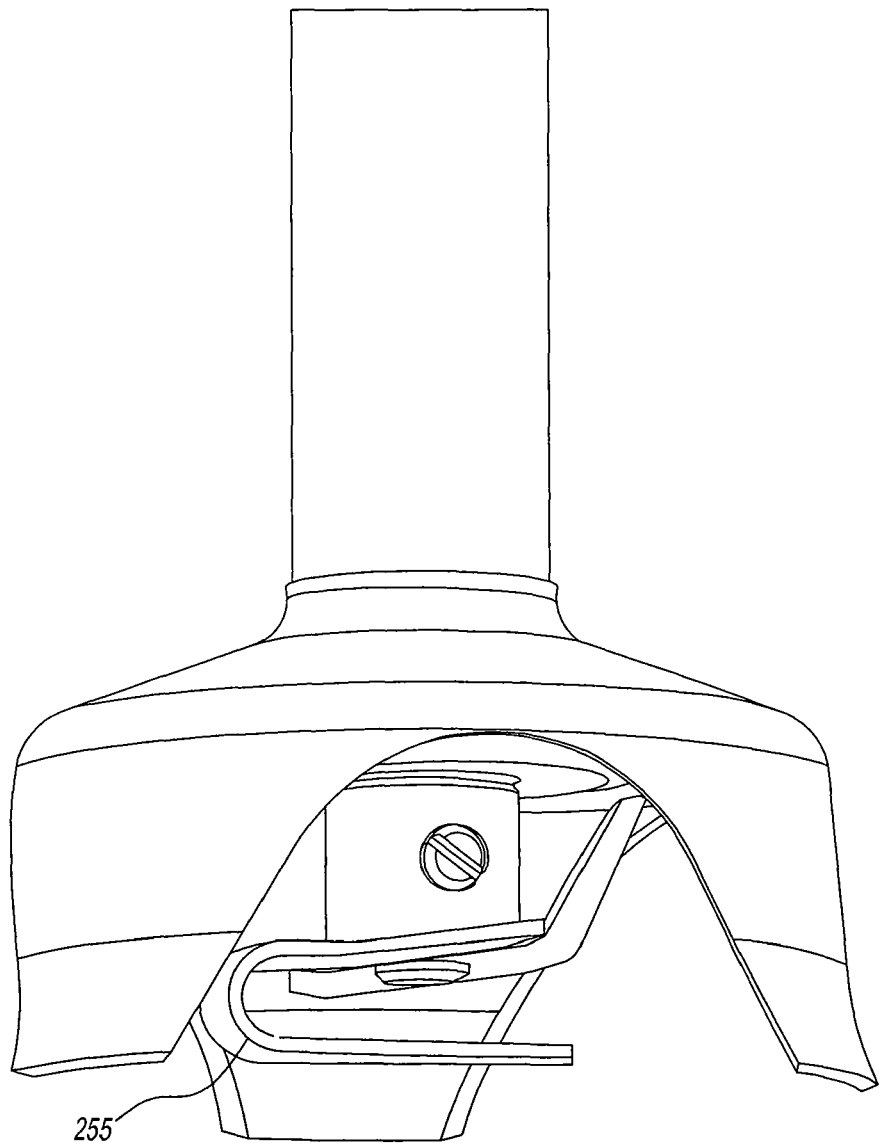
FIG. 33 is a bottom front perspective view of a blender blade according to the present disclosure.

Mixer 245 may be attached to linear slide 241 so that linear slide 241 moves mixer 245 vertically. A controller provides a mixing profile that insures proper mixing of the beverage. Linear slide 241 is driven by the stepper motor 241a that provides precise control of movement of linear slide 241. Controller may move lid assembly 250 (blender carriage) until lid 252 touches the rim of the cup 15 before mixer 245 is energized to spin blender blade 255. By moving blender blade 255 about 25% into the liquid within cup 15 before mixer 245 is energized to spin blender blade 255, splatter from mixer 245 energizing before entering into the beverage is reduced and/or eliminated. After blender blade 255 is energized a customizable program indexes blender blade 255 down into cup 15. Blender blade 255 may be energized with a customizable program that indexes blender blade 255 down into cup 15 to insure that the nugget ice has a particle size that is reduced to beverage specifications defined by the user. Blender blade 255 dwells at a bottom of cup 215 for a predetermined amount of time. Blender blade 255 is raised and lowered for a predetermined period of time to provide complete blending of components of the beverage. After mixing is complete spindle assembly 242 returns to a home position, as shown in FIGS. 7 and 28. Stepper motor 240a and linear slide 240 may have a controller that counts a number of steps that motor travels allowing precise location of blender blade 255 leading to uniform beverages each time a beverage is dispensed and mixed from assembly 100. Preferably, blender blade 255 is an emulsifying blade as shown in FIG. 33.

Door 235 may have a safety switch 236. Microswitches are located on mixer housing 205. When door 235 is raised a microswitch 211, as shown in FIG. 27, is switched and blender blade 255 is disengaged from cup 15 retracting to it off position. Additionally, there is a tab 267, as shown in FIG. 32, that is a door interlock on mixer 245 that prevents door 235 from being opened when blender blade 255 is lowered.

Figure 32:
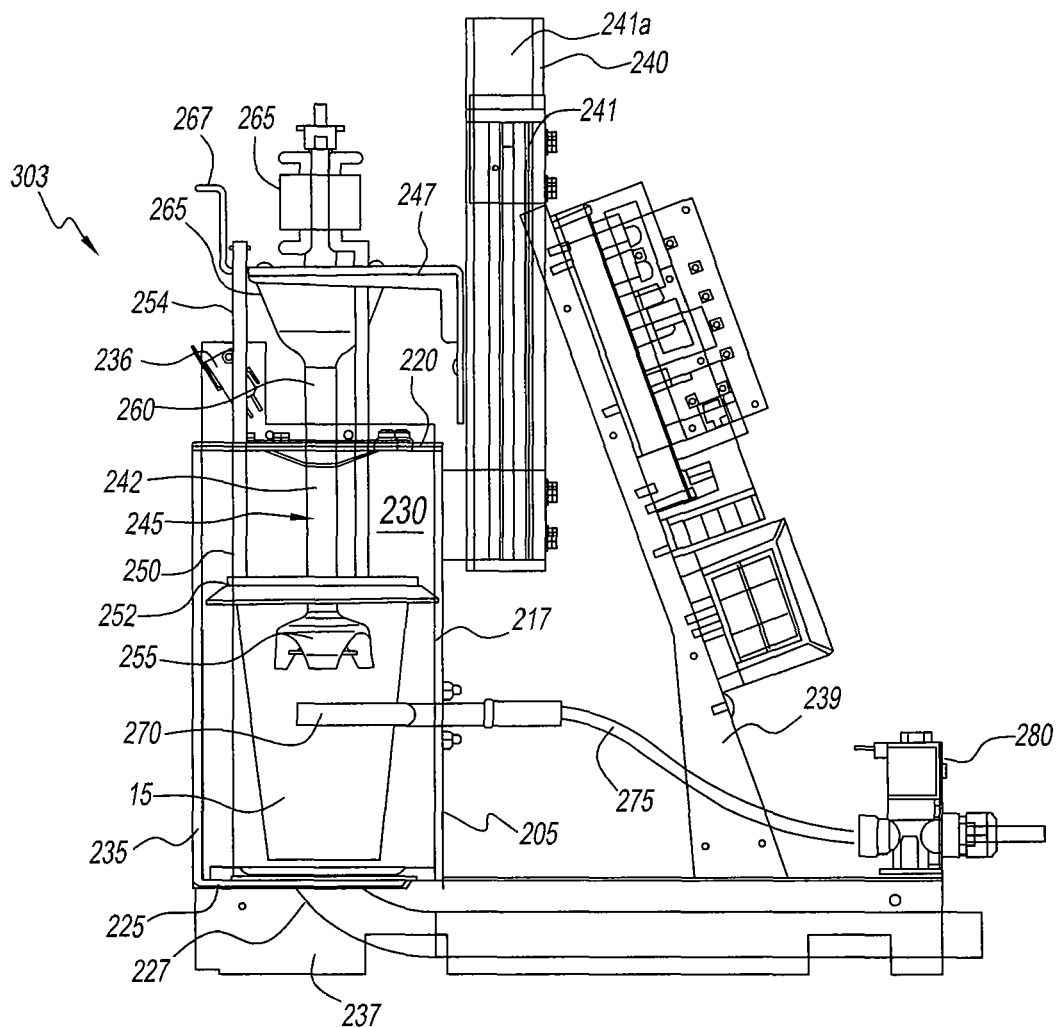
FIG. 32 is a right side view of the entire blender/mixer/cleaning module according to FIG. 28 without the cleaner snorkel dispensing member.

Referring to FIG. 32, back wall 217 may have a container or cup holder or guide 270 connected thereto. Holder 270 may hold cup 15 in position during mixing by mixer 245. Holder 270 may be shaped complimentary to the shape of cup 15, for example, a U-shape.

Figure 30:
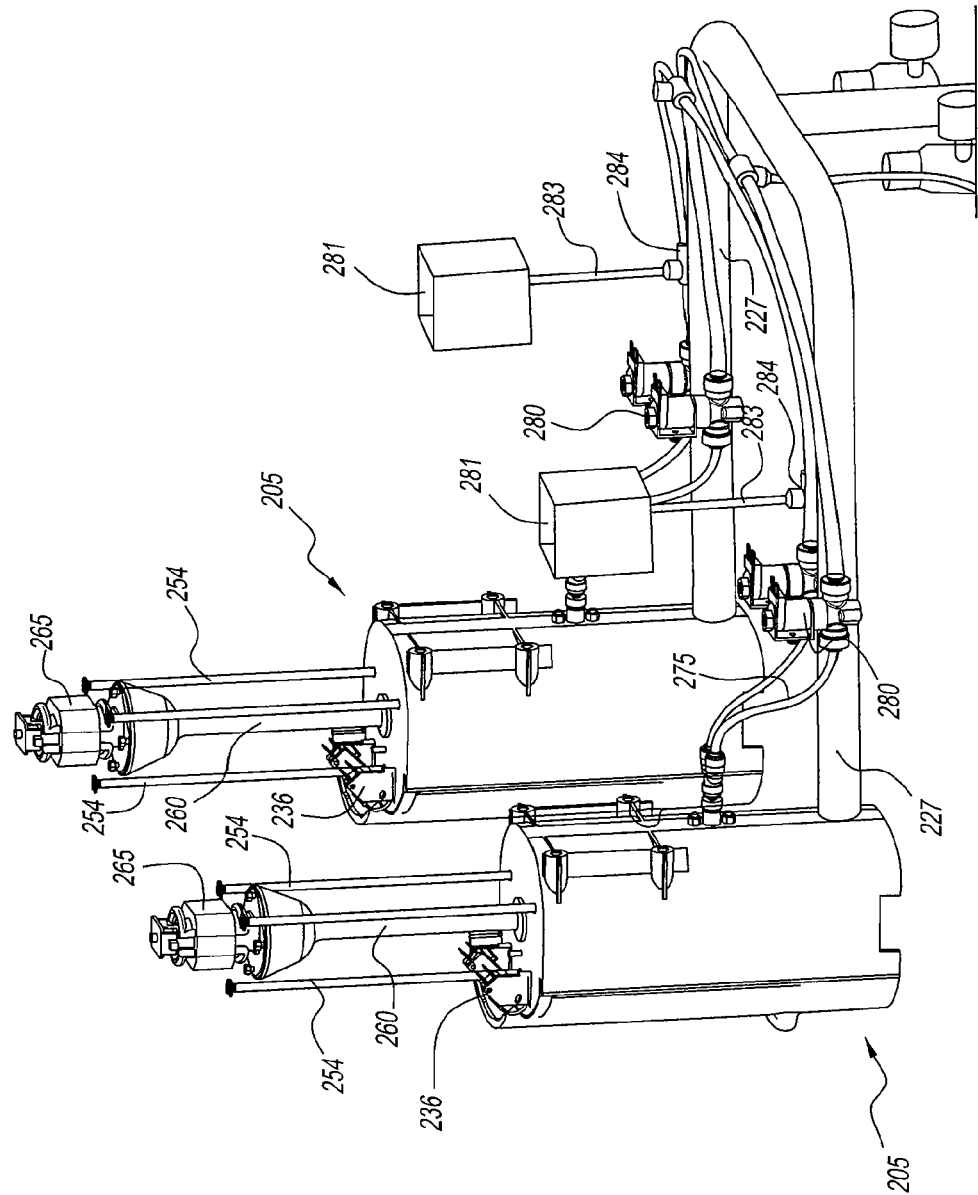
FIG. 30 is a back right side perspective view of a pair of blender/mixer/cleaning modules according to another embodiment of the present disclosure with associated cleaner storage receptacles.
Figure 31:
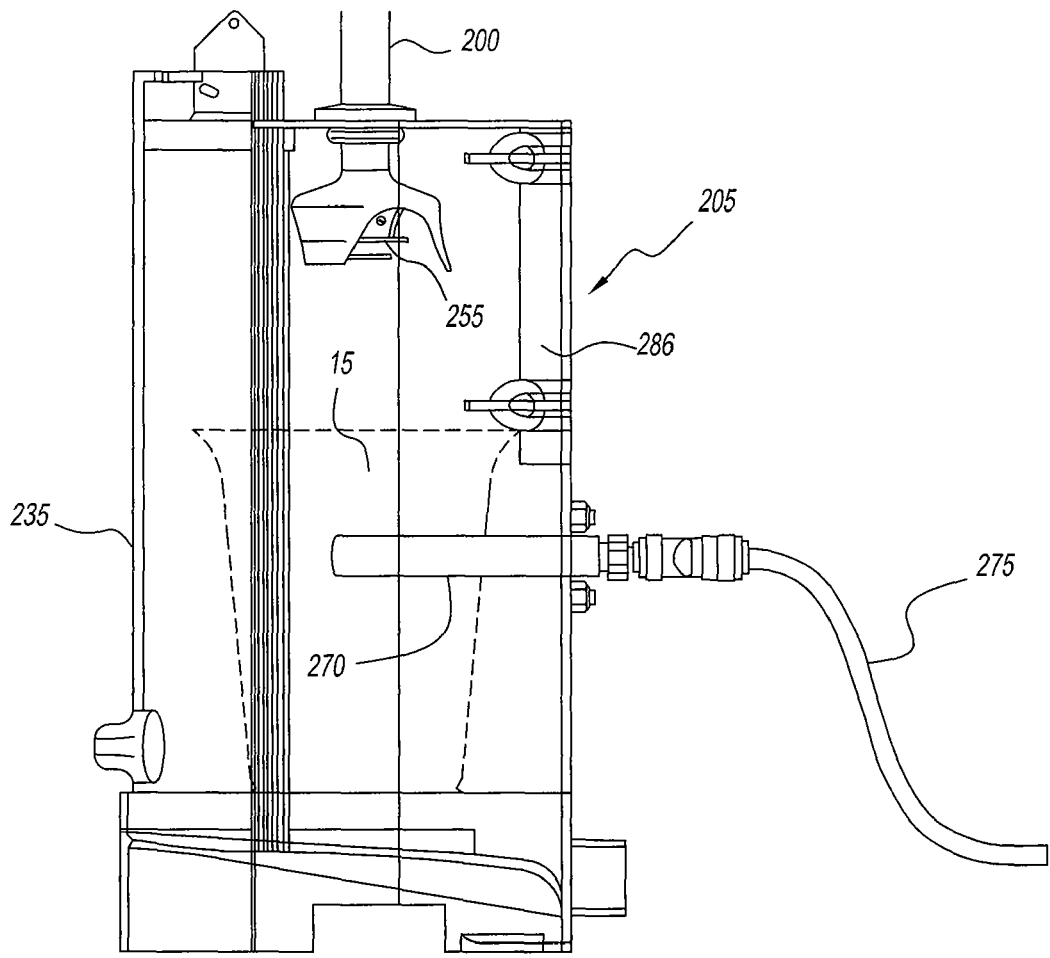
FIG. 31 is a right side view of the blender/mixer/cleaning housing unit according to FIG. 28 with a cleaner snorkel dispensing member.
Figure 35:
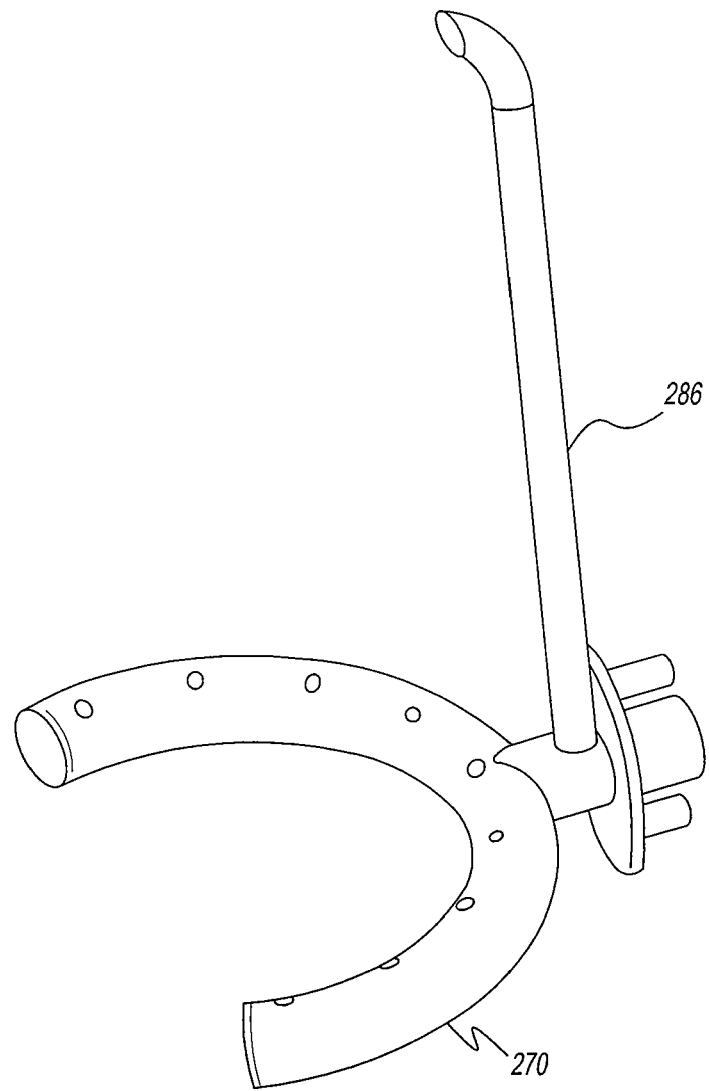
FIG. 35 is a top right side perspective view of the combination serving cup holder and cleaner dispensing unit with the cleaner snorkel dispensing member according to the present disclosure.

Holder 270 may also be connected to a liquid source (not shown) by tubing 275. Tubing 275 may be connected to the liquid source through a solenoid 280. The liquid is dispensed through one or more apertures 272 (shown in FIG. 27) in holder 270 into interior volume 230. The liquid may be water and/or a sanitizer. The water and/or sanitizer drains through drain aperture 227. FIG. 30 depicts a pair of sanitizer supply vessels 281 connected via tubes or conduits 283 to tubes 275, respectively. Preferably, a rinse or cleaning snorkel 286, as shown in FIGS. 31 and 35, is in fluid communication with holder 270 so that cleaning fluid may be dispensed substantially near the top of interior volume 230 of mixer housing 205.

After cup 15 is removed from interior volume 230, door 235 may be moved to a closed position so that interior volume 230 and/or mixer 245 may be rinsed/cleaned and/or sanitized. Water solenoid 280 and air solenoid 220a (FIG. 24) are energized. Mixer 245 is energized spinning blender blade 255 and lowered into interior volume 230 by stepper motor 241a and linear slide 241. Blender blade 255 is indexed up and down causing rinse liquid to spray entire interior volume 230 or mix compartment. Mixer 245 is de-energized stopping blender blade 255 from spinning and returns to the home location. Air continues and is used to help in removal of water residue. Another cup having another beverage therein may be mixed by mixer 245.

Mixer 245 and interior volume 230 may be rinsed with water only after mixing each beverage, mixer 245 and interior volume 230 may be rinsed with water and/or sanitized with a sanitizing liquid, such as, for example, soap or detergent, after mixing each beverage, or mixer 245 and interior volume 230 may be rinsed with water only after mixing each beverage and periodically mixer 245 and interior volume 230 are sanitized. A "Y" fitting 284 (see FIG. 30) may be placed into a water line 275 upstream of solenoid 280 to connect a source of sanitizing liquid 281. The sanitizing liquid may be metered into the water to sanitize mixer 245 and interior volume 230. The amount of sanitizing liquid may be controlled by a flow restriction (not shown) in tubing 283 of the source of sanitizing liquid 281 that connects to the "Y" fitting 284. A solenoid valve may be connected to tubing 283 of the source of sanitizing liquid 281 that connects to the "Y" fitting 284. The solenoid valve may be controlled so as to provide water only to rinse mixer 245 and interior volume 230 after mixing each beverage, and to periodically (e.g., daily) add the sanitizing liquid with the water to sanitize rinse mixer 245 and interior volume 230. Interior volume 230 and/or mixer 245 being rinsed and/or sanitized as described herein after each use prevents flavor transfer, eliminates germs, and eliminates the need for manual washing.

Referring to FIG. 7, in use, cup 15 is placed on container holder portion 20 of assembly 100. Ice maker, ice storage and portion control module 300 dispenses ice to cup 15 through nozzle 304 and ingredient dispenser assembly 1100 dispenses an ingredient, such as, for example, a fruit base to cup 15 through nozzle 304. Cup 15 is then transferred into interior volume 230 of blender/mixer/cleaning module 303. Door 235 is moved to the closed position and mixer 245 mixes the ice and fruit base. Upon completion of the mixing, door 235 is moved to the opened position and cup 15 is removed and delivered to the consumer. Door 235 is then closed and interior volume 230 is rinsed and/or sanitized.

Each beverage may be mixed in a single serving cup 15 that is served directly to a consumer, allowing the entire beverage to be delivered to the consumer raising product yield and reducing wasted beverage, e.g., when blending the beverage in a blender pot. Having each beverage blended in its own cup improves flavor control and reduces allergy issues caused through cross-contamination.

Referring to FIGS. 23, 24, 27 and 28, a controller 206, which, for example, may be disposed on a printed circuit board, controls blender/mixer/cleaning module 303. When the beverage is dispensed into the cup and placed in mixer housing 205, a microswitch, such as microswitch 211 in door 235, is switched indicating the presence of the cup. Controller 206 energizes stepper motor 241a on linear slide 241 or linear actuator and mixer 245 is lowered into the cup to a predetermined level (typically by counting a number of steps that stepper motor 241a is operated). When blender blade 255 reaches a pre-determined level controller 206 energizes stepper motor 241a to rotate blender blade 255. Blender blade 255 dwells at the pre-determined level for a time and then linear slide 241 is energized and is lowered further into the beverage to insure proper blending of the beverage. During the mixing blender blade 255 is raised and lowered in a sequence defined by the end user. Upon completion of the mixing process controller 206 disengages stepper motor 241a and energizes linear slide 241 to remove blender blade 255 from the beverage. The beverage is removed from the mix chamber or interior volume 230 and trips a door microswitch 236. Upon the switching of door microswitch 236 controller 206 begins the rinse process.

Figure 36:
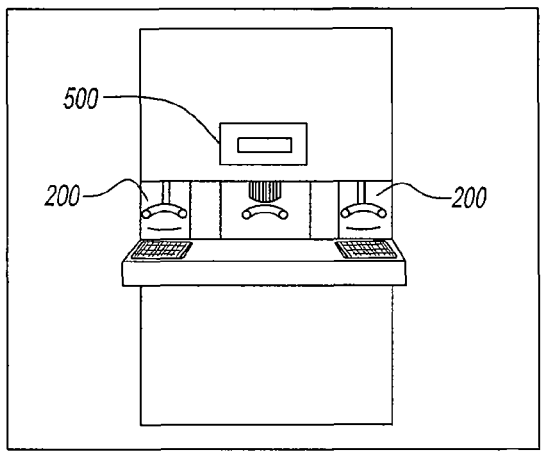
FIG. 36 is a front planar view of an exemplary embodiment of the system according to the present disclosure.
Figure 37:
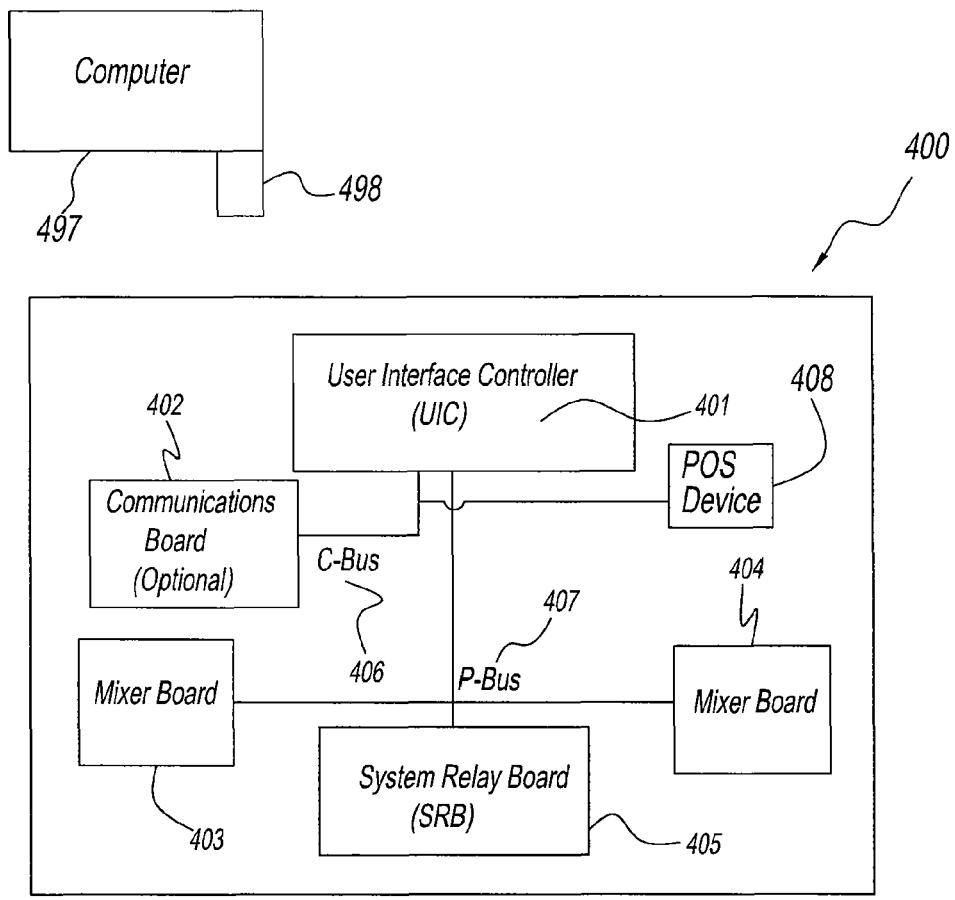
FIG. 37 is a block diagram of an exemplary embodiment of a system controller according to the present disclosure.

Referring to FIG. 37, a controller 400 comprises a structure of control or printed circuit boards 401, 402, 403, 404 and 405 identifying that they are separate but interconnected. This provides flexibility in the design allowing additional boards to be added without re-designing the entire controller of assembly 100. Printed circuit board 401 carries a user interface controller 412 (see FIG. 37) that incorporates a button panel, such as a control panel 500 shown in FIGS. 36 and 46, that an operator uses to select the drink as well as a computer that interconnects to other control boards. Printed circuit board 402 provides a gateway for communication to various methods (web, modem, USB, and the like). Printed circuit boards 403 and 404 carry blender controllers (for example, blender controller 206 in FIG. 38) for blending, mixing and cleaning activities of blending/mixing/cleaning module 303 and will house controllers for mixer spindle motor 240, linear slides 241, water solenoid 280, and air solenoid 220a. Printed circuit board 405 houses switching relays for ice maker, ice storage and portion control module 300, and flavor/ingredient dispensing module 1100. C-bus 406 is a communication interconnect between printed circuit boards 401 and 402. A P-bus 407 is a wiring interconnect between printed circuit boards 401, 403, 404 and 405.

Controller 34 may optionally include a Point Of Sale (POS) device 408. POS device 408 may be connected to C-bus 406 as shown and provide user input to user interface controller circuit board 401 or could act as a server providing input via communications board 402 to controller 400. Alternatively, POS device 408 can provide a selection of a beverage, container size, ingredients and additives, which point to a matching script of a matching beverage in a menu library. The matching script is then conveyed to circuit boards 403, 404 and 405. The menu library could be located in POS device 408 and/or in user interface board 401.

Figure 38:
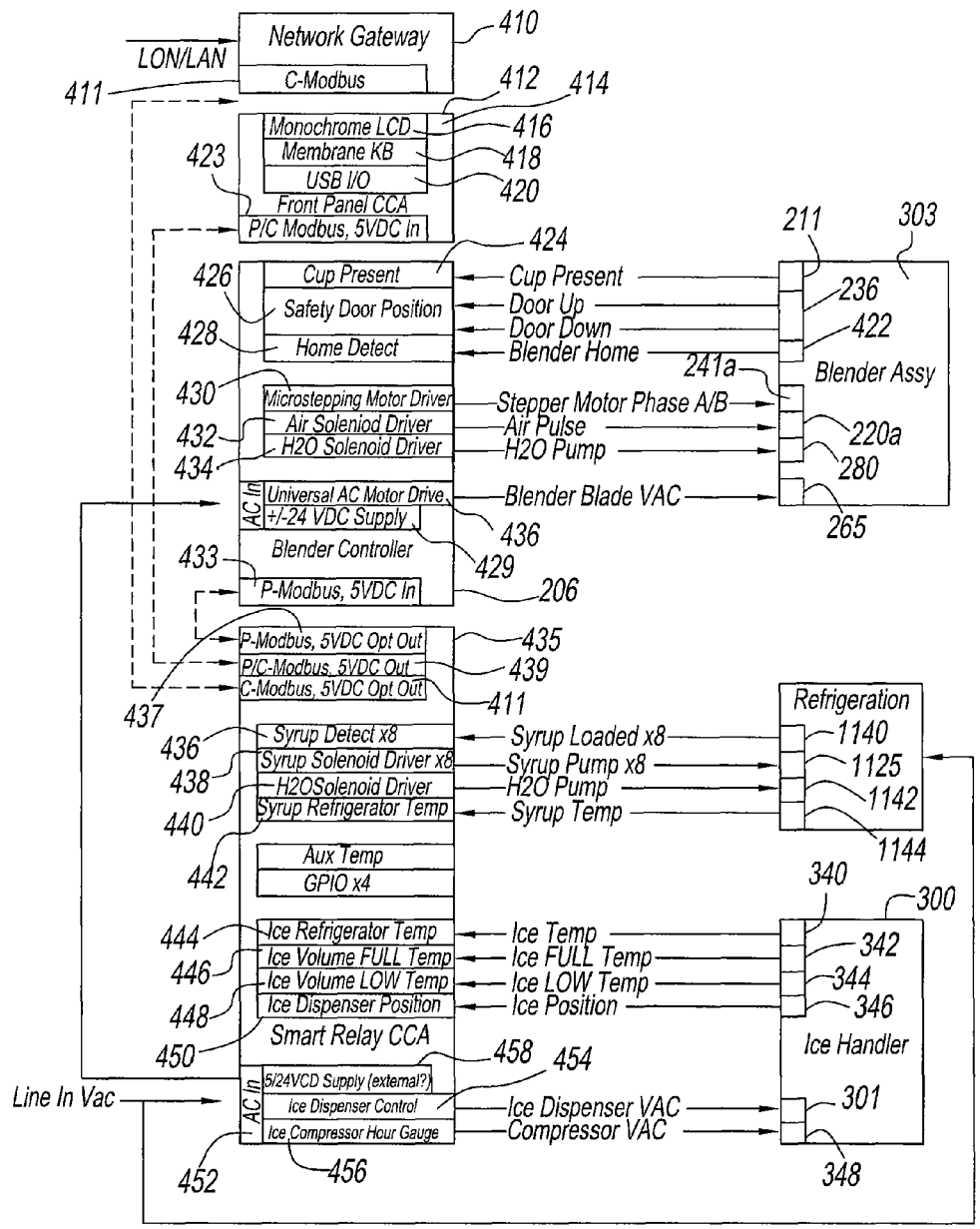
FIG. 38 is a block diagram of the network gateway, front panel display controller, blender/mixer and cleaner module controller and ice making and portion controller according to the present disclosure.
Figure 39:
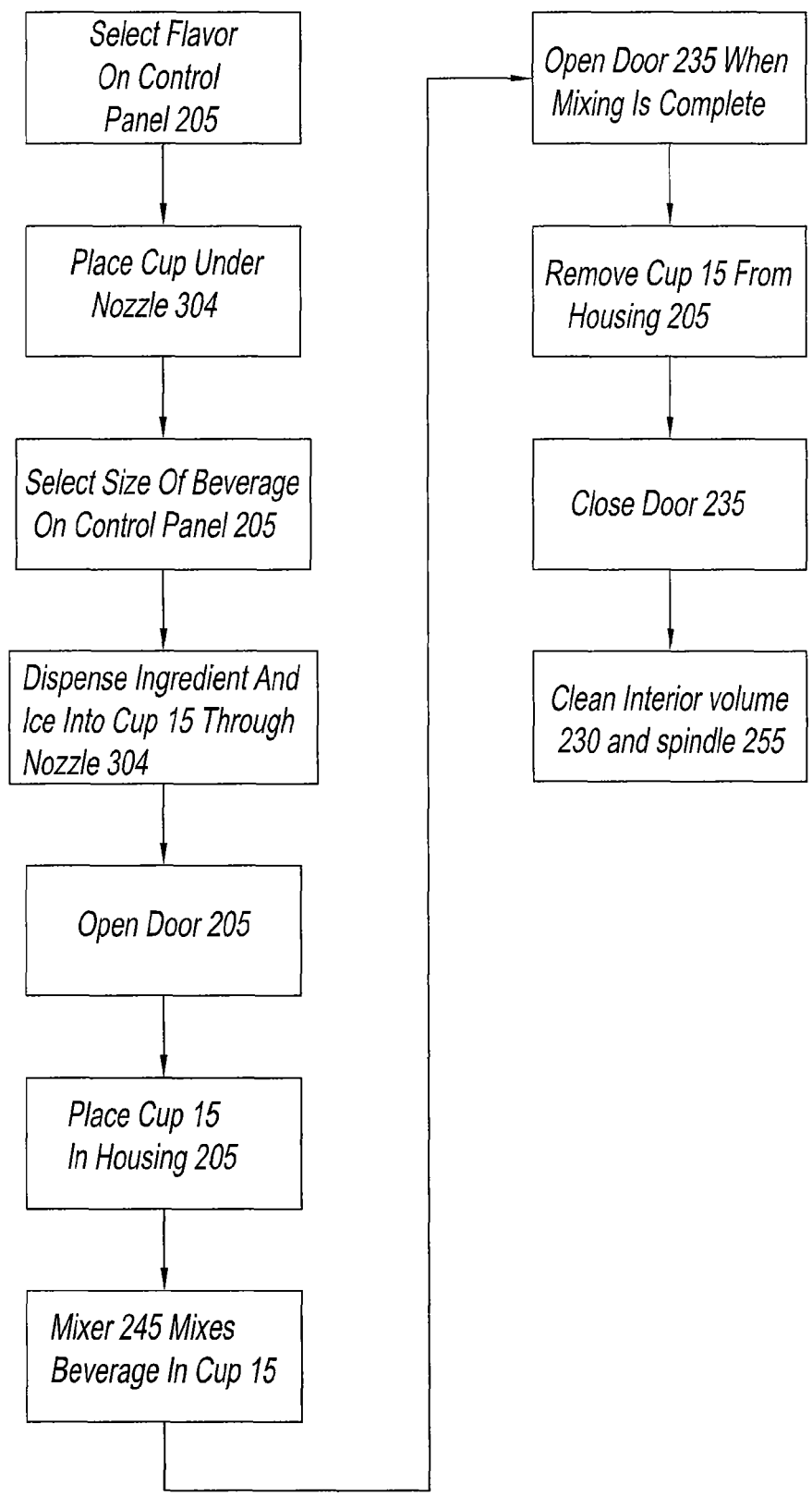
FIG. 39 is a process flow diagram of an exemplary embodiment of a method for dispensing, blending/mixing and cleaning according to the present disclosure.

Referring to FIG. 38, controller 400 has inputs and outputs connected to assembly 100. A Network Gateway C modbus Communication module 410 allows communication via modem, Internet, and the like. Network gateway 410 includes a C-modbus feature 411 for communicating via C-bus 406. User interface controller 412 includes a Front Panel CCA User interface 414 that includes interfaces 416 and 418 to a Monochrome LCD display and a Membrane keyboard (KB) or a color LCD display with a touch screen and further includes a USB port 420 and a P/C modbus protocol feature for communicating via C-bus 406 with communications board 402 (FIG. 37) and via P-bus 407 with mixer boards 403 and 404 and smart relay board 405.

Controller 400 comprises a blender controller 206 for each blending/mixing/cleaning module 303 in assembly 100. As these blending controllers are identical, only one blending controller is shown in FIG. 38. Blender controller 206 comprises a cup present feature 424 that receives from blending/mixing/cleaning module 303 an input from sensor 211 that indicates the presence of cup 15. Blender controller 206 also comprises a safety door position feature 426 that receives an input from a sensor 236 that indicates a door up or door down position. Blender controller 206 further comprises a home detect feature 428 that receives an input from a sensor 422 that indicates spindle assembly 242 is in the home position. Blender controller 206 further includes control logic for a micro stepping motor driver feature 430 that initiates or provides control signals to linear drive motor 241a of blender assembly 303. Blender controller 206 further includes control logic for an air solenoid driver feature 432 that provides an air pulse to pump 220a of blender assembly 303. Blender controller 206 further includes control logic for a water solenoid driver that provides a control signal to water solenoid 280 of blender assembly 303. Blender controller 206 further includes control logic for a motor drive feature 436 that provides drive voltage/current to mixer motor 265 of blender assembly 303. Blender controller 206 also includes a P-modbus feature 433 for communicating with user interface controller board 401, mixer board 404 and system relay board 405 via P-bus 407. Blender controller 206 further includes a 1/24 VDC supply 429 that may be either internally derived from incoming AC power from a smart relay controller 435 or supplied from an external DC power supply.

Smart relay controller 435 handles control of refrigeration system 1110 with a syrup detection feature 436 that receives an input from a syrup bag loaded sensor 1140 (not shown) of refrigeration system 1110. Smart relay controller 435 further includes control logic for a syrup solenoid driver feature 438 that provides a control signal to operate a selected flavor or syrup pump 1125 of refrigeration system 1110. Smart relay controller 435 further includes control logic for a water solenoid feature 440 that provides a control signal to operate water solenoid 1142 of refrigeration system 1110. Smart relay controller 435 further includes a syrup refrigeration temperature feature that receives an input from a temperature sensor 1144 of refrigeration system 1110.

Smart relay controller 435 further includes monitoring features of ice storage and portion control module 300 (hereafter sometimes referred to as ice handler module 300). Smart relay controller 435 includes an ice refrigerator temperature feature 444 that receives an input from an ice temperature sensor 340 (not shown) of ice handler module 300. Smart relay controller 435 includes an ice volume (or bin) full temperature feature 446 that receives an input from an ice volume (or bin full) temperature sensor 342 of ice handler module 300. Smart relay controller 435 includes an ice volume (or bin) low temperature alarm feature 448 that receives an input from an ice low temperature sensor 344 of ice handler module 300. Smart relay controller 435 includes an ice dispenser position feature 450 that receives an input from an ice position sensor 346 of ice handler module 300. Smart relay controller 435 further includes an ice dispenser control feature 454 that supplies AC power to drive assembly 301 of ice handler module 300. Smart relay controller 435 further includes an ice compressor hour gauge feature 456 that controls the application of AC power to a compressor 348 of ice handler module 300.

Smart relay controller 435 also includes an AC power interface 452 that receives an AC line voltage which is supplied to blender controller 206, refrigeration system 1110 and ice handler 300 as shown by the boldface lines in FIG. 38. Smart relay controller 435 further includes a $5/24$ VDC supply that may be either internally derived from incoming AC power (by an AC to DC converter) or supplied from an external DC power supply.

Smart relay controller 435 also includes a P-modbus feature 437 for communicating with the user interface board 401 and mixer boards 403, 404 via P-bus 407. Smart relay controller 435 also includes a P/C-modbus feature 439 for communicating with user interface controller board 401 via the P-bus.

Figure 43:
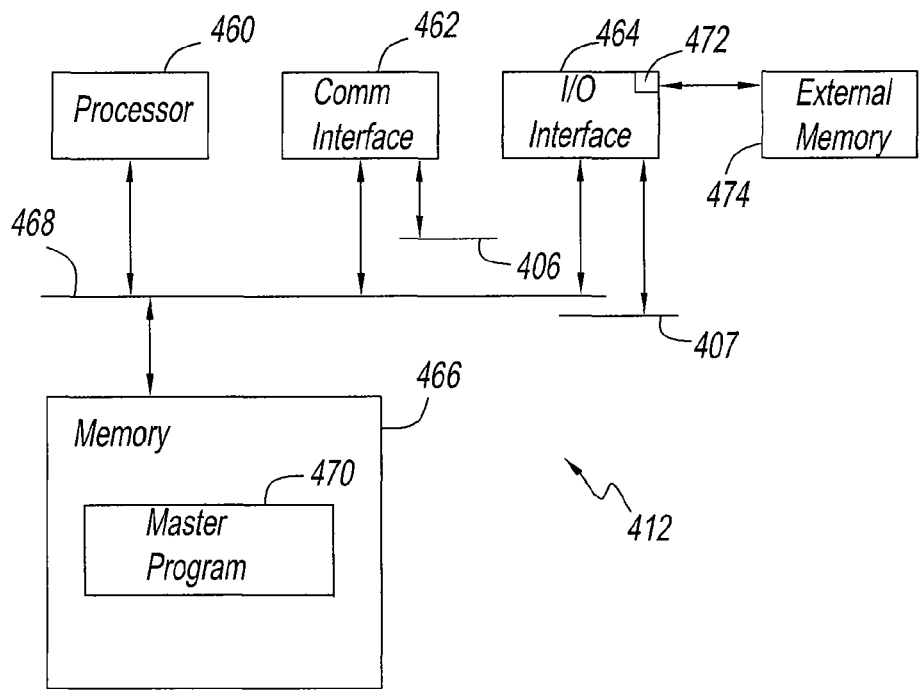
FIG. 43 is a block diagram of a user interface controller of the system controller of FIG. 38.

Referring to FIG. 43, user interface controller 412 comprises a processor 460, a communication interface 462, an input/output (I/O) interface 464 and a memory 466 interconnected via a bus 468. Communication interface 462 is connected to C-bus 406 for communicating with servers via a network such as the Internet. For example, interface controller 412 may receive from an external server downloads of program changes, new programs, and/or various other commands, programs or data and may send to an external server various status data concerning operational data, maintenance data, and the like.

I/O interface 472 comprises connections to control panel 500 (FIGS. 36 and 38) and at least one UBS port 472 for connection to an external memory 474, which, for example, may be a memory stick, an external memory drive or other external memory. I/O interface 464 also comprises a connection to P-bus 407 for communications with blender controllers 206 and relay controller 435.

Memory 466 comprises a master program 470 for control of assembly 100 and various other programs, such as, an operating system, utility programs and other programs. Processor 460 is operable to execute master program 470 and the other programs as well.

Figure 44:
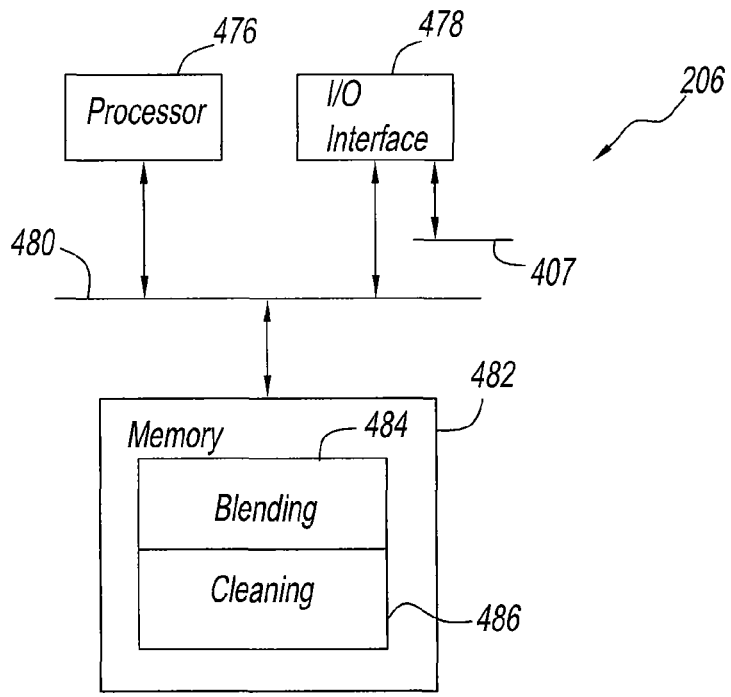
FIG. 44 is a block diagram of a blending controller of the system controller of FIG. 38.

Referring to FIG. 44, blender controller 206 comprises a processor 476, an input/output (I/O) interface 478 and a memory 482 interconnected via a bus 480. I/O interface 478 includes connections to blender module 303 as shown in FIG. 38. I/O interface 478 comprises a connection to P-bus 407 for communications with user interface controller 412 and relay controller 435. Memory 482 comprises a blending program 484 and a cleaning program 486 for control of blender module 303 and various other programs, such as, an operating system, utility programs and other programs. Processor 476 is operable to execute blending program 484, cleaning program 486 and the other programs as well. Other blender controllers 206 in assembly 100 include an architecture identical to blender controller 206 for control of associated blending/mixing/cleaning modules 303.

Figure 45:
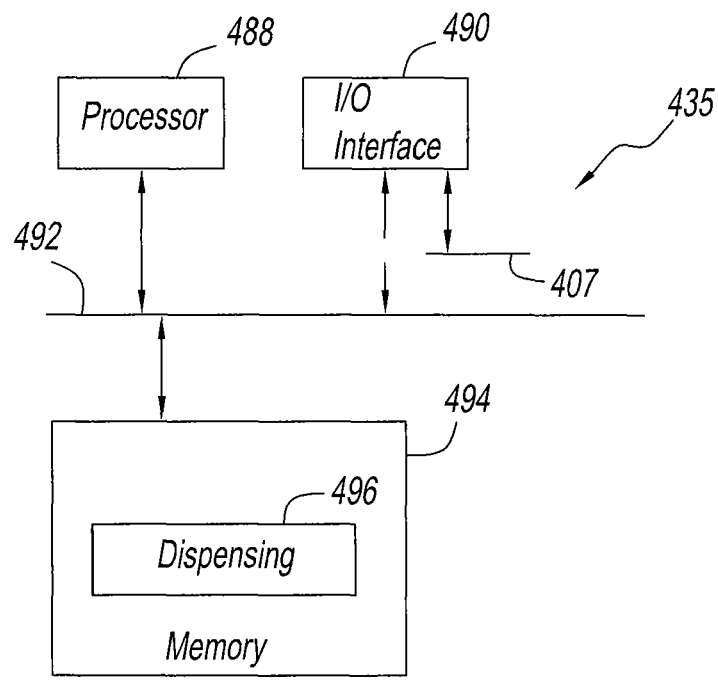
FIG. 45 is a block diagram of a relay controller of the system controller of FIG. 38.

Referring to FIG. 45, relay controller 422 comprises a processor 488, an input/output (I/O) interface 490 and a memory 494 interconnected via a bus 492. I/O interface 490 includes connections to refrigeration module 1110 and ice handler module 300 as shown in FIG. 38. I/O interface 490 also includes a connection to P-bus 407 for communicating with interface controller 412 and blender controllers 206 of assembly 100 (FIGS. 37 and 38). I/O interface 490 also includes a connection to P-bus 407 for communicating with user interface controller 412 and blender controller 206. Memory 494 comprises a dispensing program 496 for control of refrigeration module 1110 and various other programs, such as, an operating system, utility programs and other programs. Processor 488 is operable to execute dispensing program 496 and the other programs as well.

Figure 46:
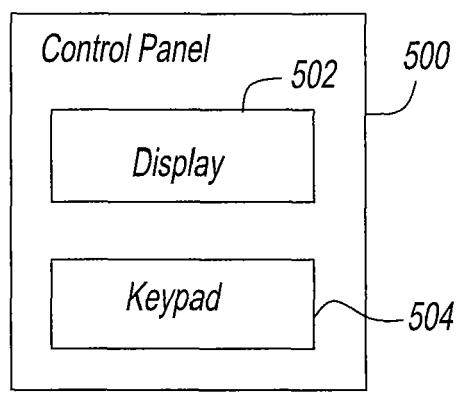
FIG. 46 is a block diagram of the control panel of system of FIG. 36.

Referring to FIG. 46, control panel 500 comprises a display 502 and a keypad 504. User interface controller 412 interacts with a user to present display screens on display 502 and responds to user entries made with keypad 504 or by touch, cursor voice or other input. Display 502 may be any suitable display and, preferably, is a Liquid Crystal Display (LCD). Keypad 504 may be any suitable keypad, keyboard or touch screen and, preferably is a touch screen.

Figure 48:
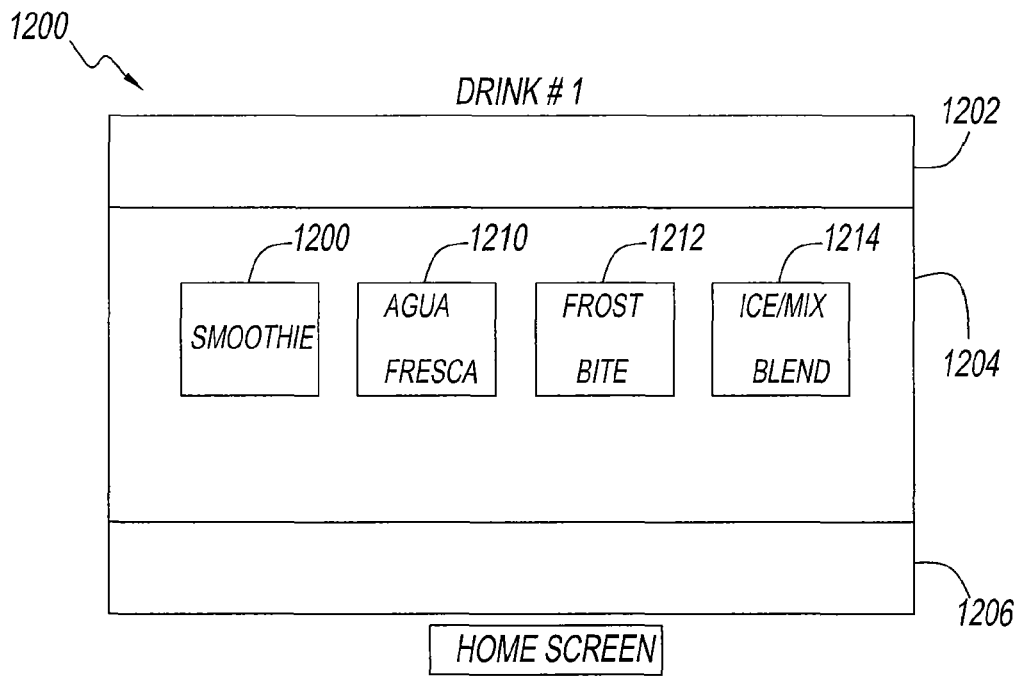
FIGS. 48-69 are user interactive display screens presented by the user interface controller of FIG. 38.

In a preferred embodiment the display screens comprise the screens shown in FIGS. 48-69. It will be appreciated by those of skill in the art that other display screens can be used. Referring to FIG. 48, a display screen 1200 comprises three sections 1202, 1204 and 1206 that are used in each of the display screens of FIGS. 48-69 to display information to the user.

Figure 47:
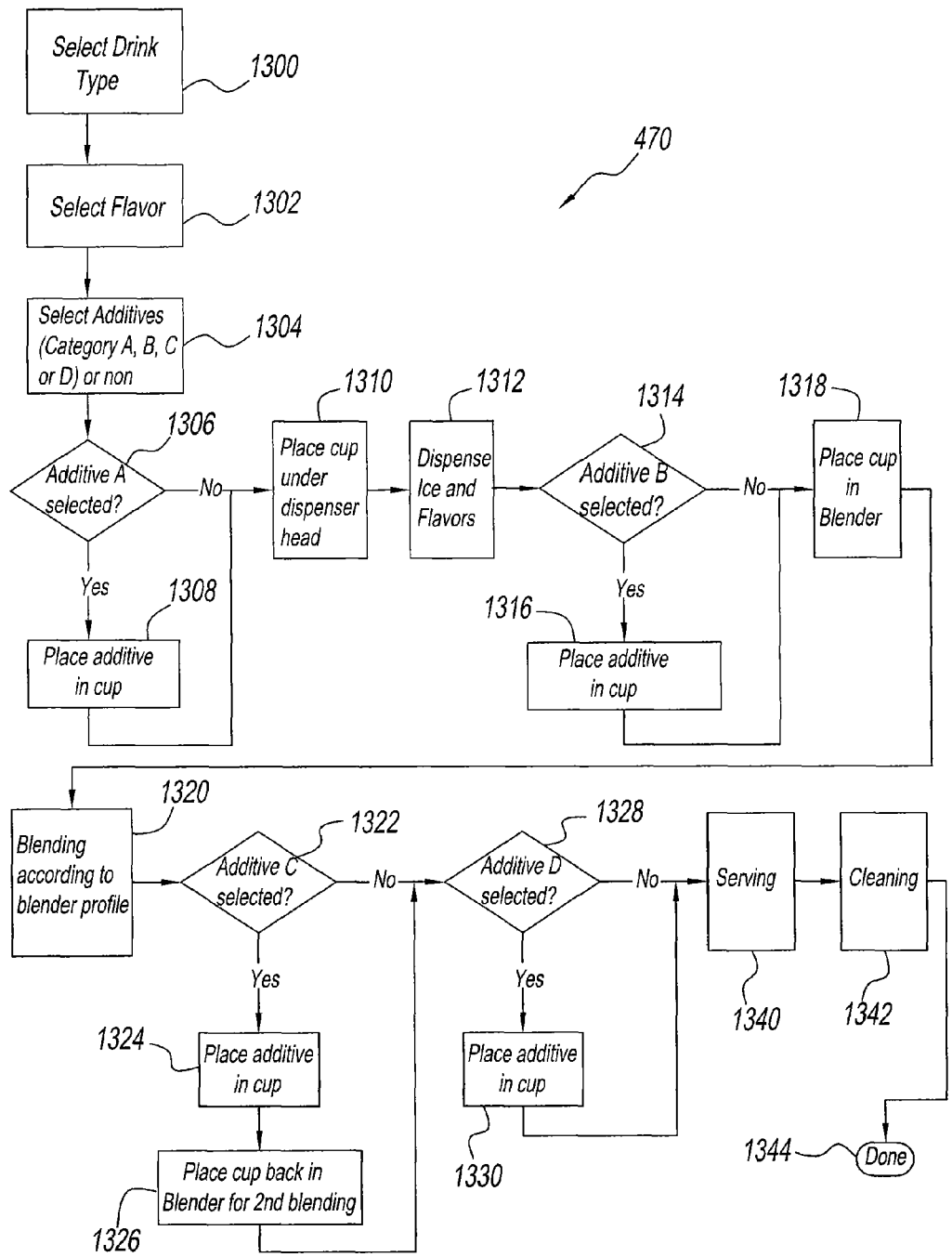
FIG. 47 is a flow diagram for the system controller of FIG. 37.

Controller 400 of the present disclosure will be described for a beverage assembly 100 as shown in FIG. 36, in which controller 400 comprises user interface controller 412, relay controller 435 and two blender controllers 206 for a right blending/mixing/cleaning module 303 and a left blending/mixing/cleaning module 303. Referring to FIG. 47, user interface controller 412 is executing master program 470. At step 1300, user interface controller 412 presents on display 502 a home screen 1200 that displays in section 1204 a plurality of beverage categories 1208, 1210, 1212 and 1214 labeled, for example, as smoothie, agua fresca, frost bite and ice/mix blend, respectively. The user selects one of the categories, for example, smoothie, for a Drink #1.

Figure 49:
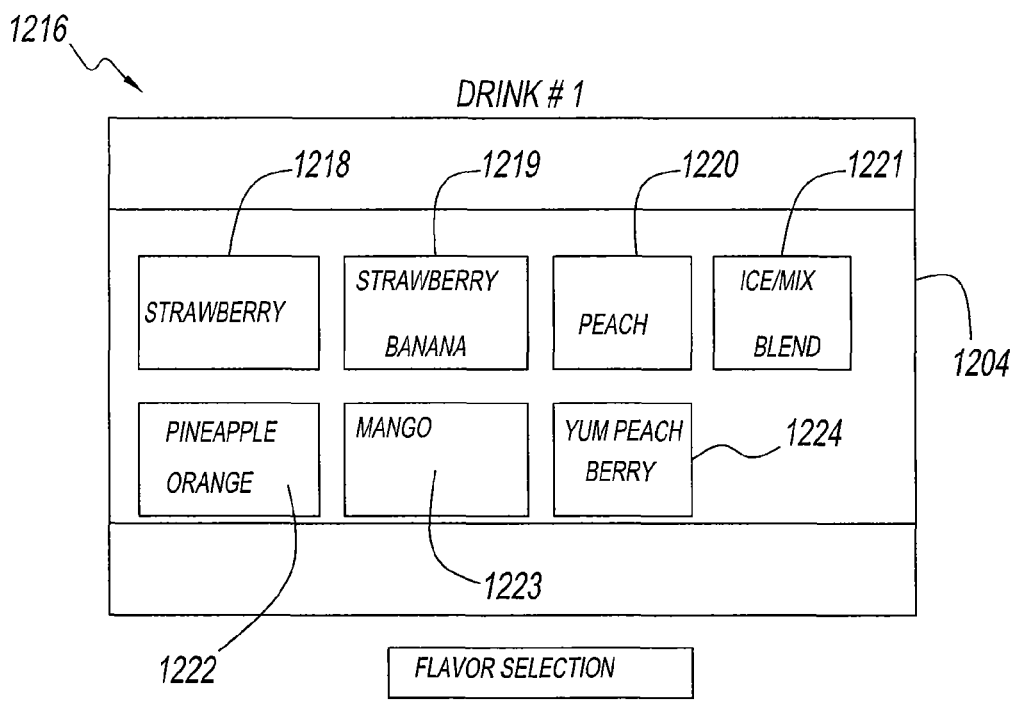
Figure 50:
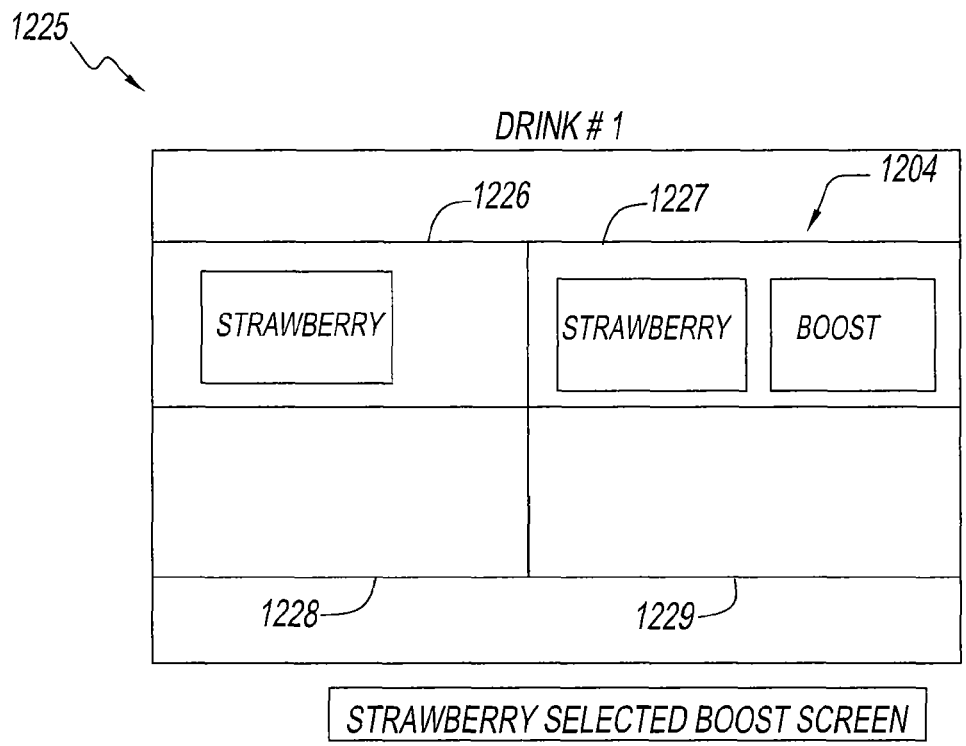
Figure 51:
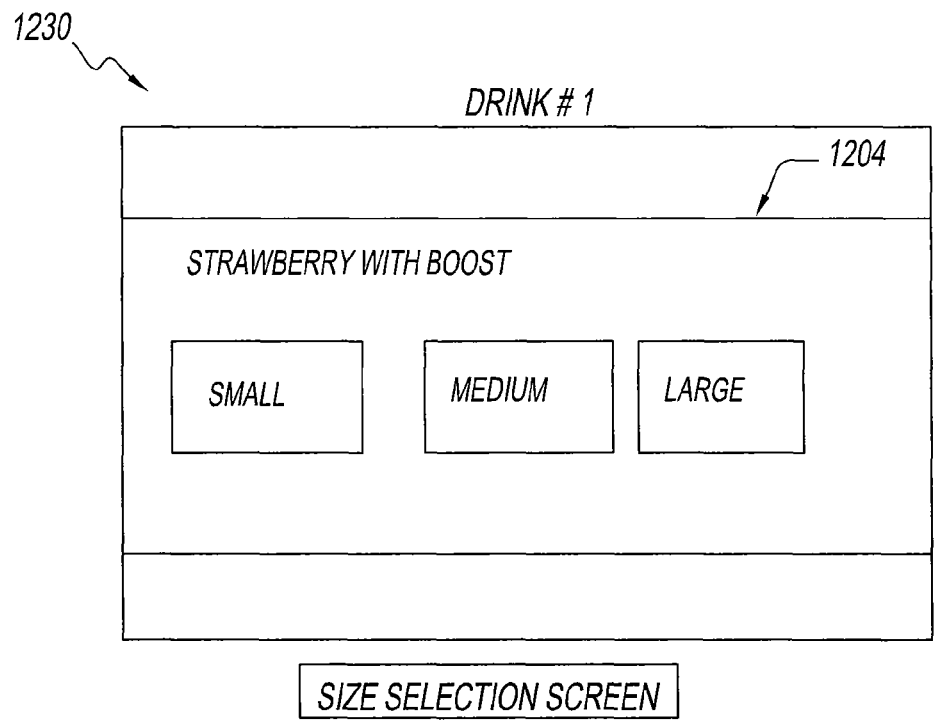

At step 1302, master program 470 responds to the user's selection of smoothie to present a flavor selection screen 1216 shown in FIG. 49. A plurality of flavors 1218-1224 is presented in section 1204 for selection by the user. In this example, the user selects flavor 1218, which is strawberry. Also at step 1302 (FIG. 47), program 470 presents a strawberry boost selection screen 1225 as shown in FIG. 50. Section 1204 is divided into four subsections 1226, 1227, 1228 and 1229. The choices for the user to select are strawberry in subsection 1226 and strawberry with boost in subsection 1227. In this example, the user selects strawberry with boost. Master program 407 responds by presenting a cup size selection screen 1230 shown in FIG. 51 with choices "small", "medium" and "large" set forth in section 1204. In this example, the user selects "medium".

Figure 52:
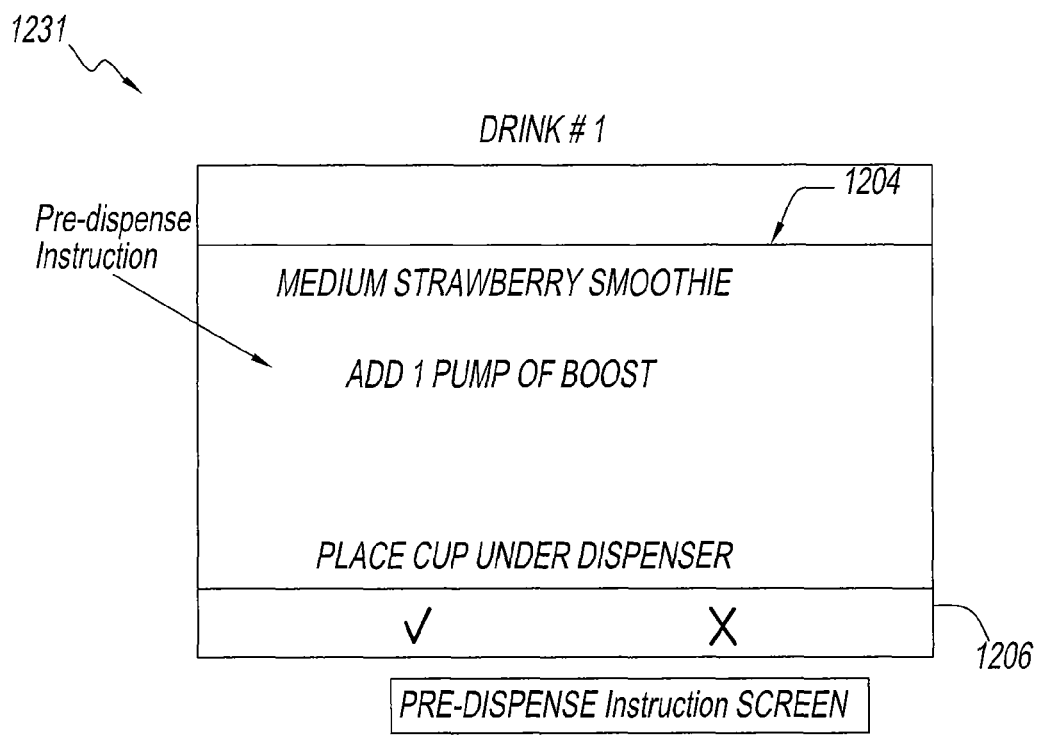
Figure 53:
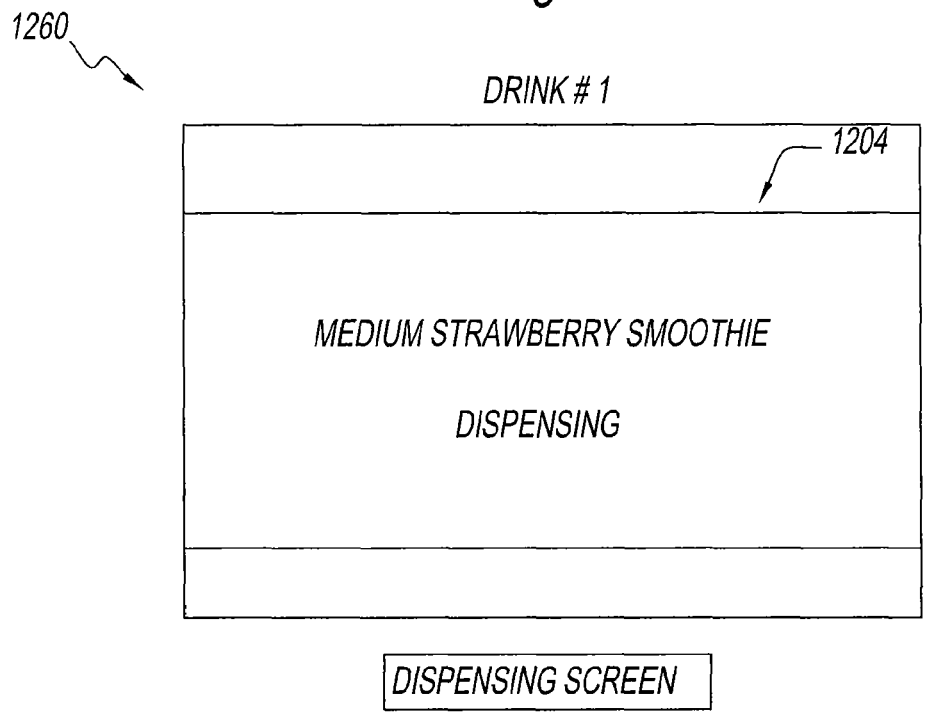

Master program 470 at step 1304 of FIG. 47 responds with a screen 1231 in FIG. 52 with a pre-dispense instruction (not shown) in which additive type choices A, B, C and D are presented in section 1204 for user selection. Dependent of the type of additives (A, B, C or D) it can be added in different stages of the drink making, which will give the drink different attributes dependent on where it is added. The user may select none of the additives or up to four of the additives. At step 1306, master program 470 determines if additive A has been selected. If not, the user is prompted to activate an advance button shown in section 1206 as check arrow. If so, the user at step 1308 is prompted to place one or multiple additive type A into a cup, place the cup under the dispenser head or nozzle 304 and then activate the advance button. At step 1310 master program 470 responds to the user activation of the advance button at step 1306 or step 1308 to prepare a script that contains dispensing instruction data that comprises the selected flavor, additive (if any), and cup size. At step 1312, user interface controller 412 communicates this script to relay controller 435 via P-bus 407 (FIGS. 37 and 38) and presents on display 502 a dispensing screen 1260 shown in FIG. 53, which displays in section 1204 the status message "Medium Strawberry Smoothie Dispensing".

Relay controller 435 at this time executes a dispensing program 496 (FIG. 70) based on the script received from user interface controller 412. When the dispensing program is finished, relay controller 435 sends a dispensing complete message via P-bus 407 to user interface controller 412. Master program 470 at step 1314 determines if additive B has been selected. If so, the user at step 1316 is prompted in a screen 1261 shown in FIG. 54 to place one or multiple additive type B into the cup with a pre-blend instruction in section 1204. If additive type B was not selected, no pre-blend instruction is displayed in section 1204 of screen 1260.

Figure 54:
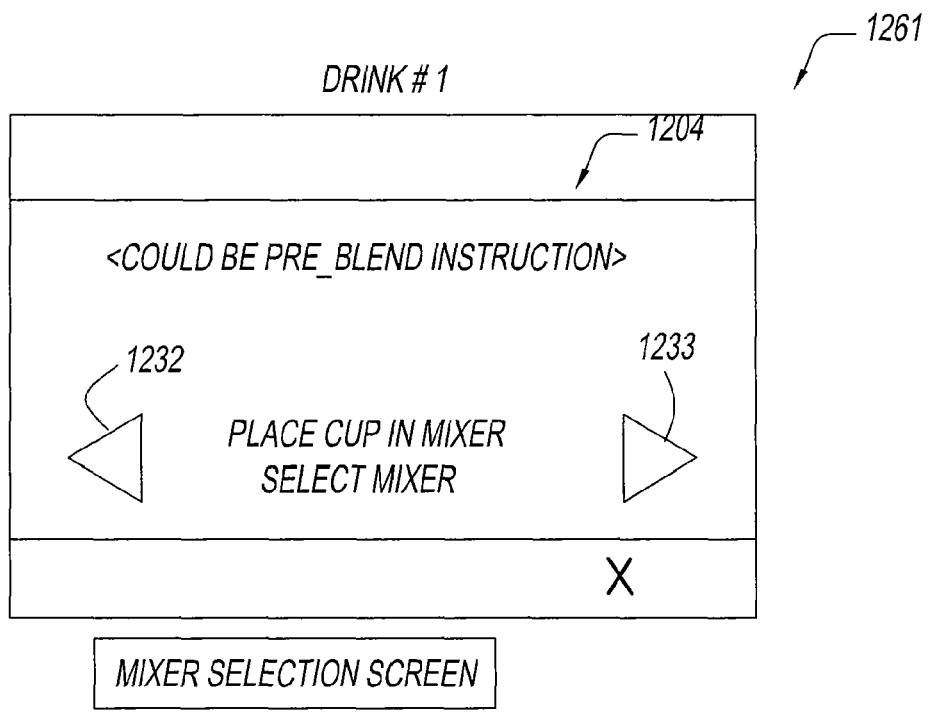
Figure 55:
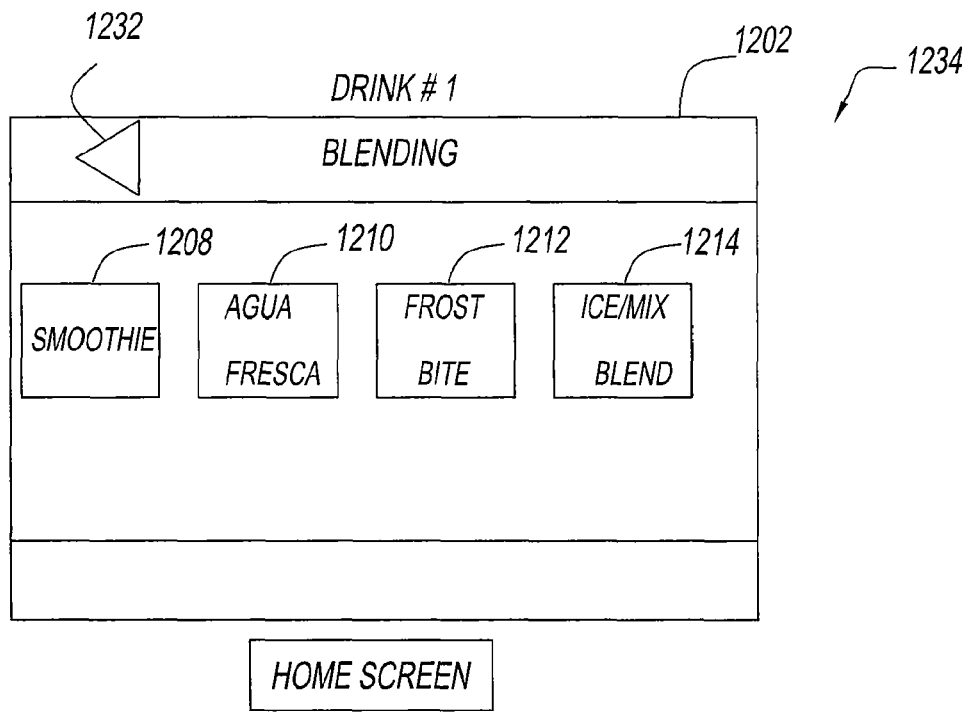
Figure 56:
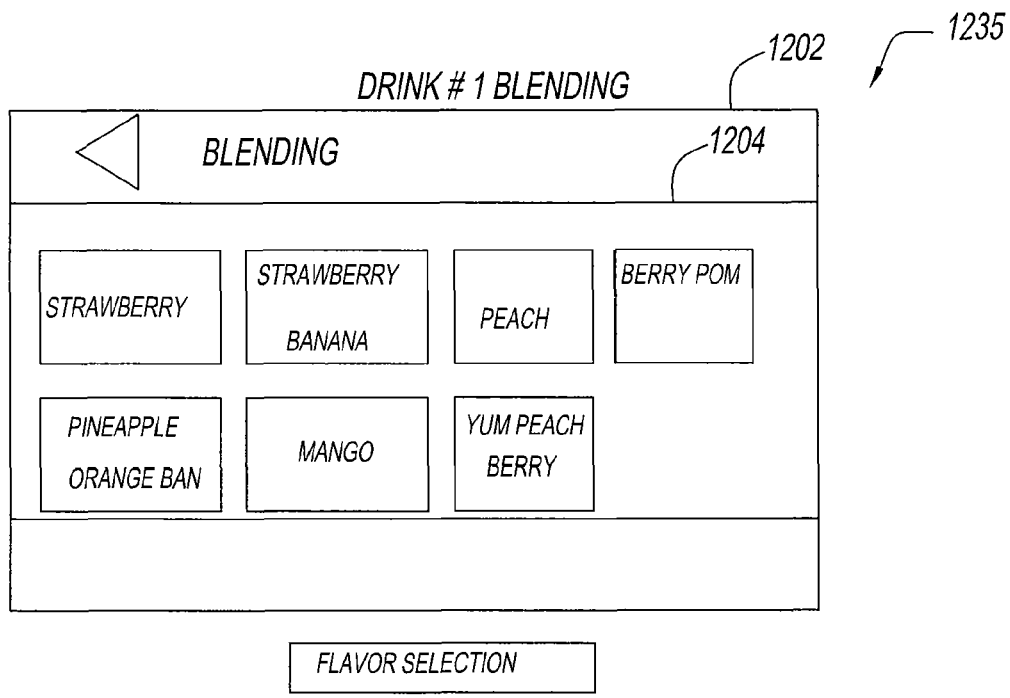
Figure 57:
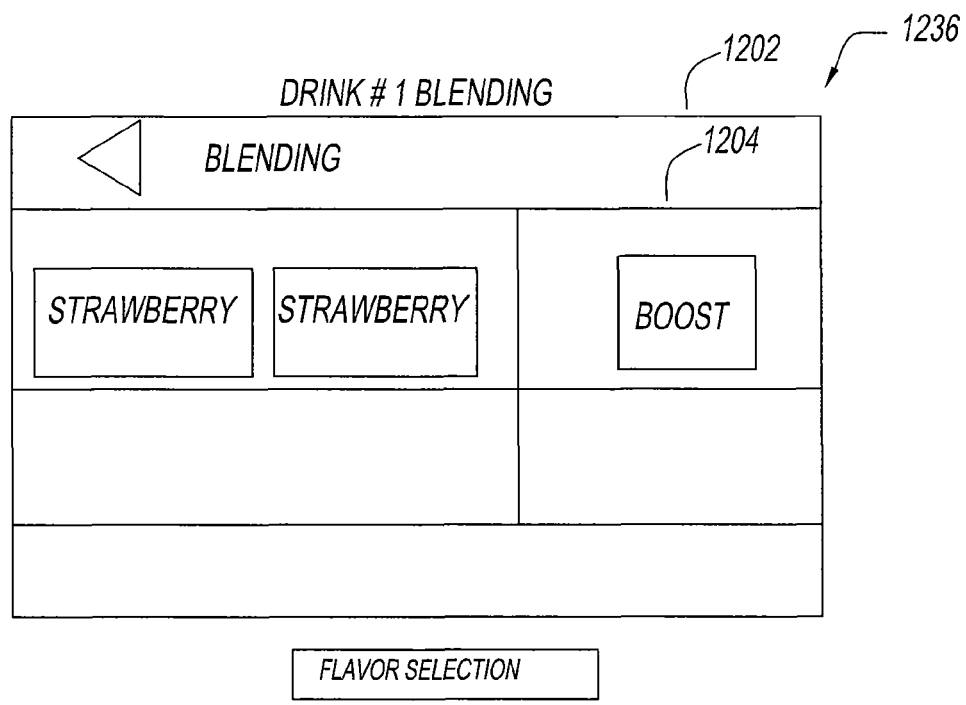
Figure 58:
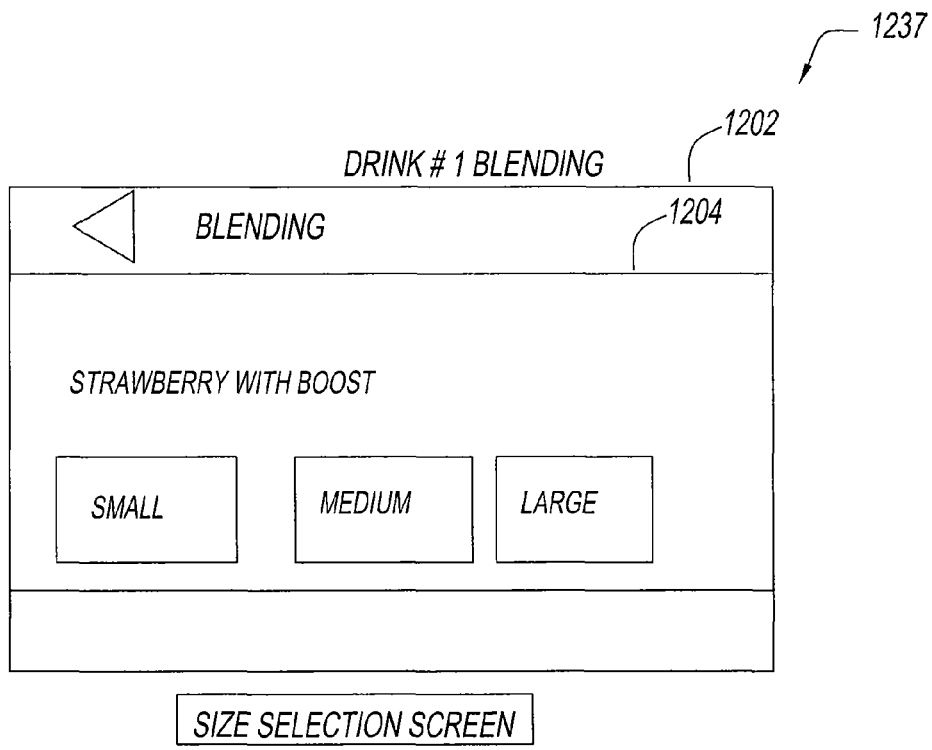
Figure 59:
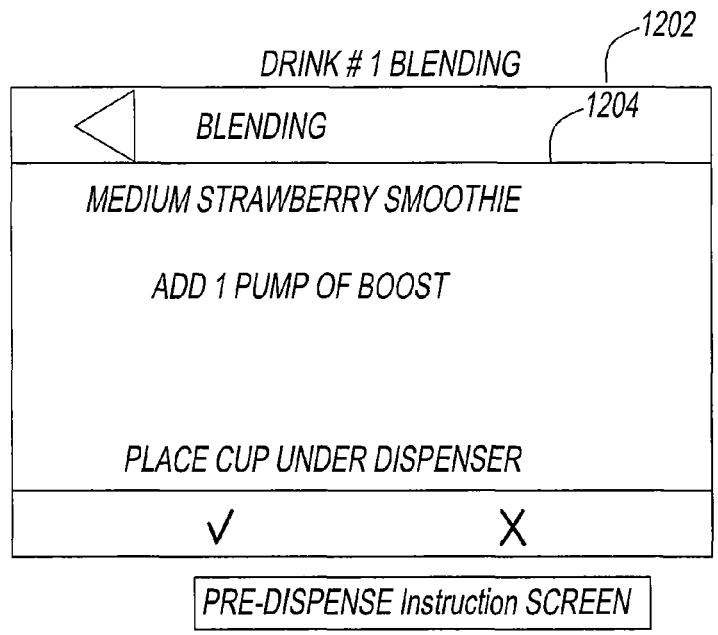
Figure 60:
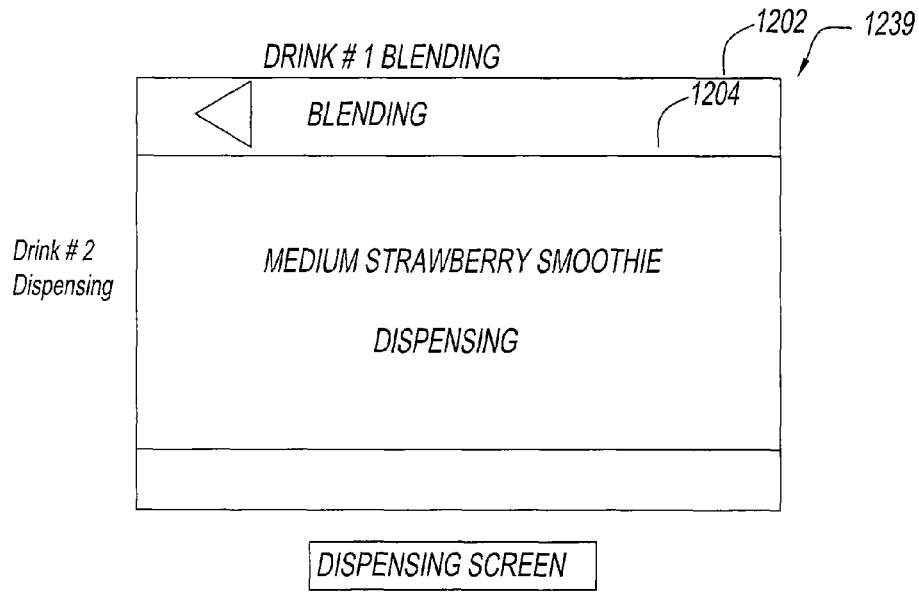

Also displayed in section 1204 of FIG. 54 is a prompt to the user to place the cup in one of the two blending/mixing/cleaning modules 303 by activating one of the left and right buttons 1232 and 1233. In this example, the user selects the left blending/mixing/cleaning module 303 for drink #1 by activating button 1232 and places the cup in the left mixer assembly 303. Master program 470 prepares a script for left controller 206 of left blender assembly 303. This script contains blending instruction data that comprises the cup size and the spindle speed and dwell time for each level of blending for the selected beverage and additives A and/or B (if any). User interface controller 412 communicates this script to left blender controller 206 via P-bus 407. At step 1320, left blender controller 206 for left blending/mixing/cleaning module 303 (FIGS. 36 and 37) executes a blending program 484 (FIG. 71) based on the drink #1 blending script for blending the contents of the cup for drink #1. At this point, user interface controller 412 presents on display 502 a home screen 1234 shown in FIG. 55.

Home screen 1234 displays in section 1204 the status message "Blending" together with left icon button 1232 for drink #1. In section 1204, categories 1208, 1210, 1212 and 1214 are displayed for selection for a drink #2. Program 470 then repeats steps 1300 through 1312 for drink #2 using screens 1234 through 1239 of FIGS. 55-60 in which the displayed content of display sections 1204 correspond to the displayed content of sections 1204 of screens 1200, 1216, 1225, 1230, 1261 and 1262 of FIGS. 48-53 for drink #2.

Figure 61:
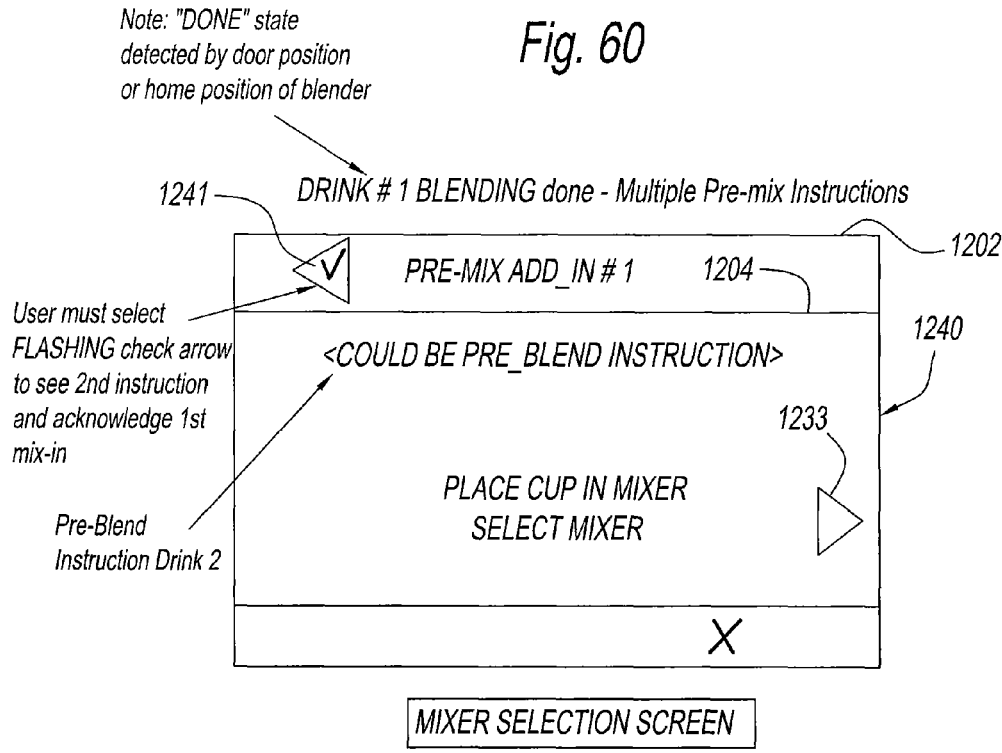

Referring to FIGS. 47 and 61, left blender controller 206 for left blending/mixing/cleaning module 303 senses the return of the spindle to the home position based on a signal from home sensor 422 (FIG. 38) or a door up or open position and sends a blending done message to user interface controller 412 via P-bus 407.

Figure 62:
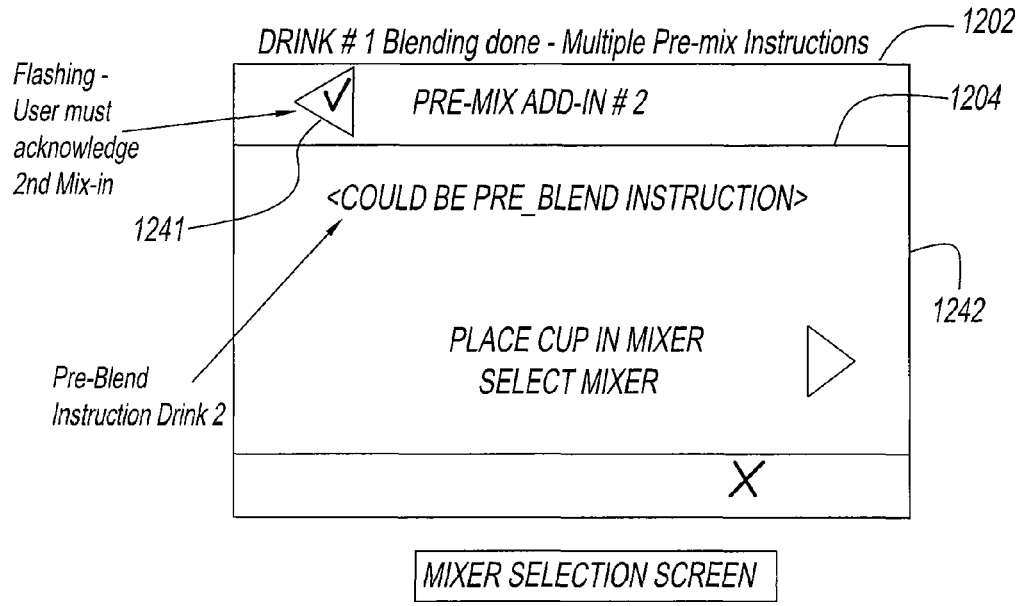
Figure 63:
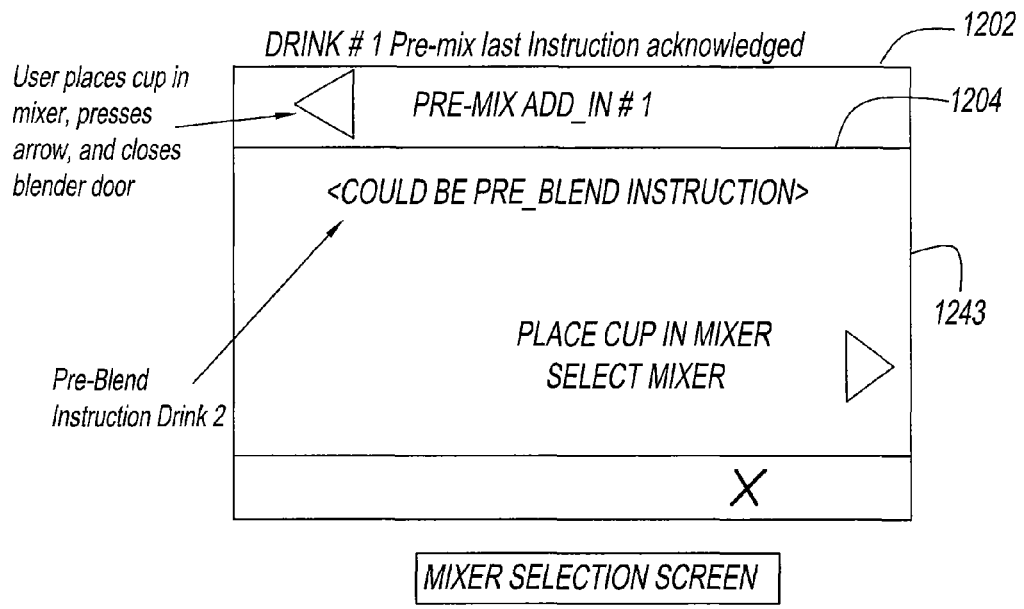
Figure 64:
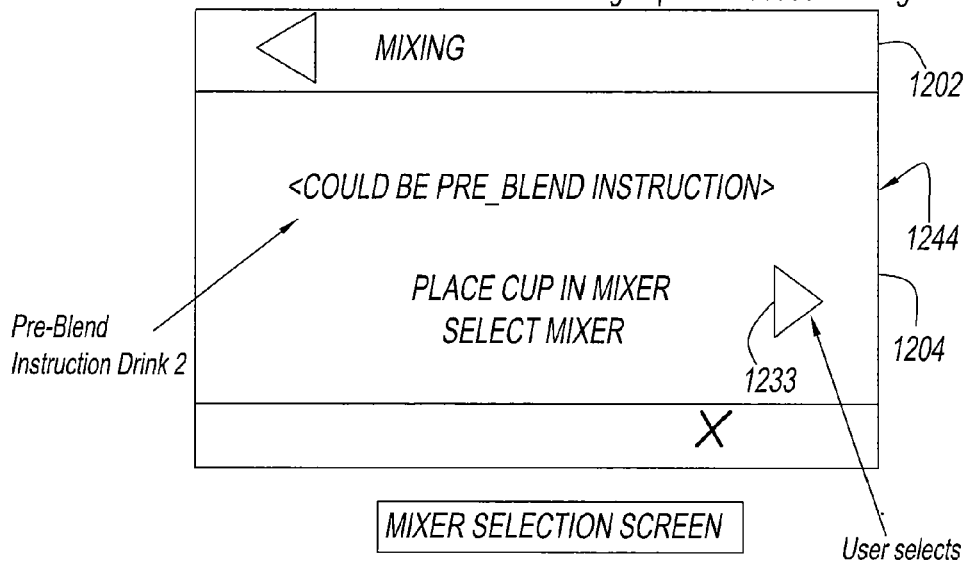
Figure 65:
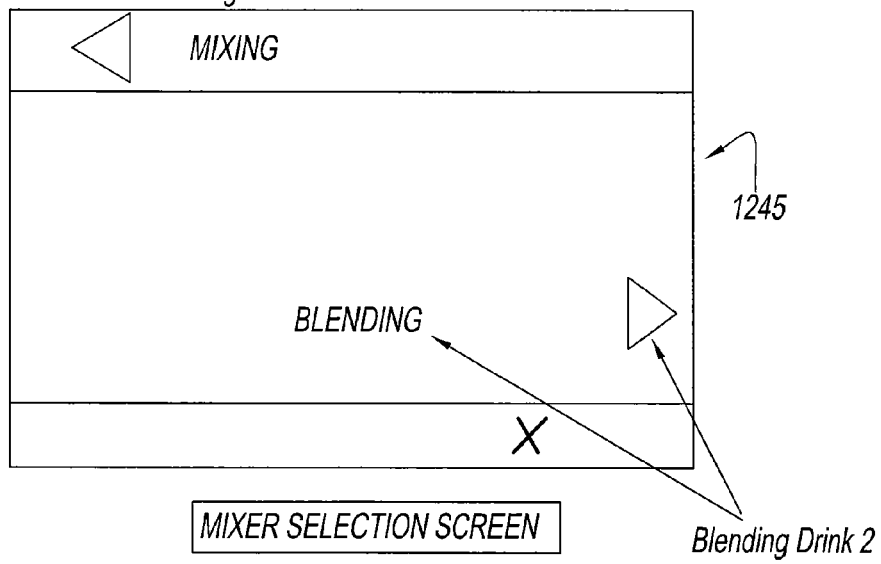
Figure 66:
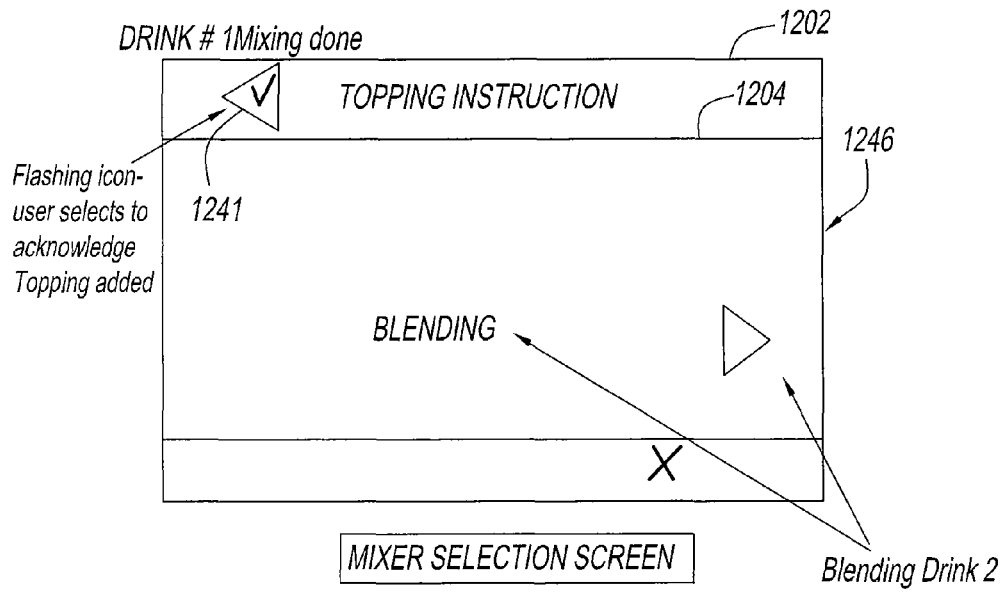
Figure 67:
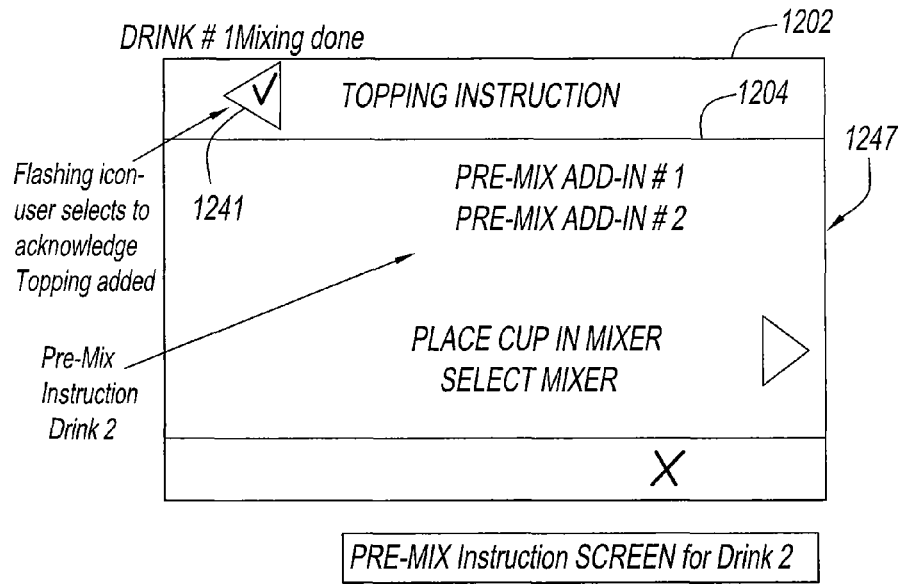

User interface controller 412 responds at step 1322 by presenting a mixer selection screen 1240 on display 502 as shown in FIG. 61. In section 1204, instructions for drink #2 can be a pre-blend instruction for an additive or merely to move drink #2 cup from the dispenser module to the right blending/mixing/cleaning module 303 as indicated by right mixer symbol 1233. In section 1202, instructions for drink #1 include a flashing check arrow 1241. The user must select flashing check arrow 1241 to acknowledge a first mix-in of additive type A and/or type B and to see the next mix-in instruction for additive type C. Master program 470 responds by presenting another mixing selection screen 1242 as shown in FIG. 62. In step 1324, if additive type C has been selected in step 1304, the user is prompted by flashing arrow 1241 to acknowledge additive type C and remove the cup from left blending/mixing/cleaning module 303 and add one or multiple additive type C to the cup. In step 1326, the user is prompted by screen 1243 to place the drink #1 cup in the left blending/mixing/cleaning module 303, select the check arrow and close the blender door. Master program 470 prepares the script for blending drink #1 with additive type C and sends it via P-bus 407 to left blender controller 206. Left blender controller 206 uses this script to execute step 1326 to blend the contents of drink #1 cup for a second blending.

With respect to drink #2, master program 470 is concurrently (with step 1326 for drink #1) executing steps 1314 and 1315 (FIG. 47) for additive type B in section 1204 of screens 1240, 1242 and 1243. In section 1204 of a screen 1244 in FIG. 64, the user is prompted to place the drink #2 cup in the right blending/mixing/cleaning module 303. Master program 470 packages the script for blending drink #2 and sends it via P-bus 407 to the right blender controller 206. Right blender controller 206 uses this script to blend drink #2 at step 1318 of master program 470. At this time, master program 470 also presents on display 502 a screen 1245 that shows in section 1202 a status of "mixing" for drink #1 and in section 2 a status of "blending" for drink #2. For this case, the script for drink #1 includes a mixing instruction. Mixing chops up coarse ice particles into fine particles. On the other hand, blending blends the coarse particles without substantially changing the granularity. This can be accomplished in two manners. The first manner is by changing the blade speed. In the second manner, mixing and/or blending blade 255 has a sharp side and a dull side. For a mixing operation, the spindle assembly is rotated in a direction win which the sharp side chops the coarse ice particles. For a blending operation, the spindle assembly is rotated in the opposite direction so the dull face of blade 255 stirs the ingredients without substantially changing the granularity of the ice particles.

When the mixing procedure is finished, left blending controller 206 sends a complete message via P-bus 407 to user interface controller 412. Master program 470 executes step 1328 by presenting a screen 1246 on display 502 shown in FIG. 66. In section 1202, the user is prompted by flashing check arrow 1241 to acknowledge a selected additive D (topping). Selecting the flashing check arrow 1241 causes topping instructions to be presented in section 1202. For example, the user is prompted to remove the drink #1 cup from the left blending/mixing/cleaning module 303 and place the topping on drink #1. When drink cup #1 is removed from left blending/mixing/cleaning module 303, a cup presence sensor 211 provides a signal to left blender controller 206, which signifies the cup has been removed. Left blender controller 206 sends a message of the cup removal via P-bus 407 to user interface controller 412. Master program 470 then executes step 1340 by presenting a screen 1247 on display 502. In section 1202 of screen 1247, a topping instruction requests the user to acknowledge that the topping has been added by selecting flashing check arrow 1241 and to serve drink #1.

Figure 68:
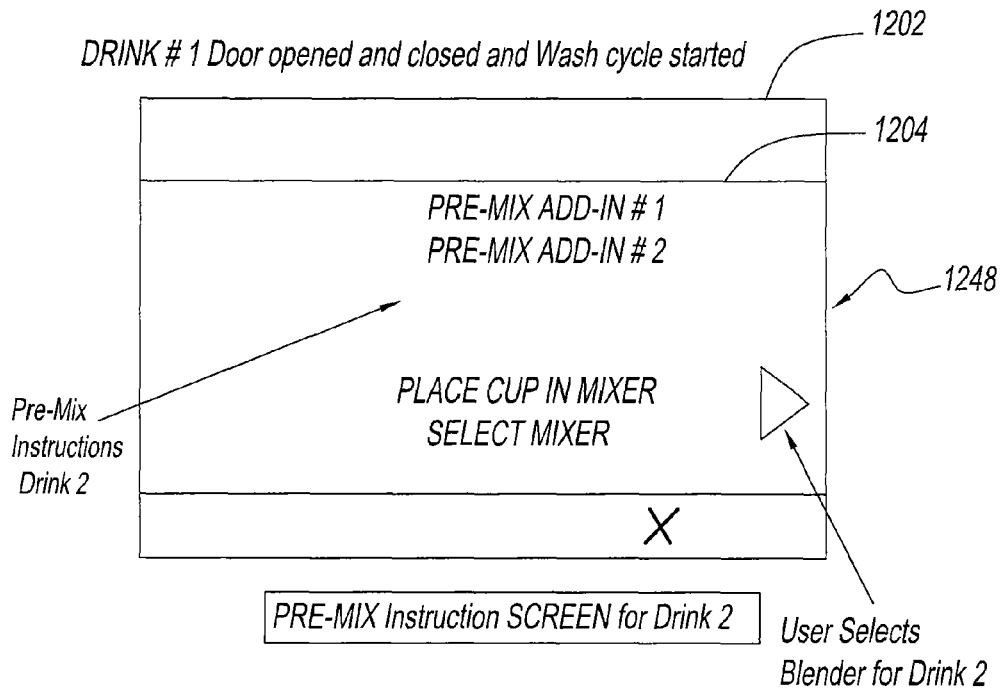
Figure 69:
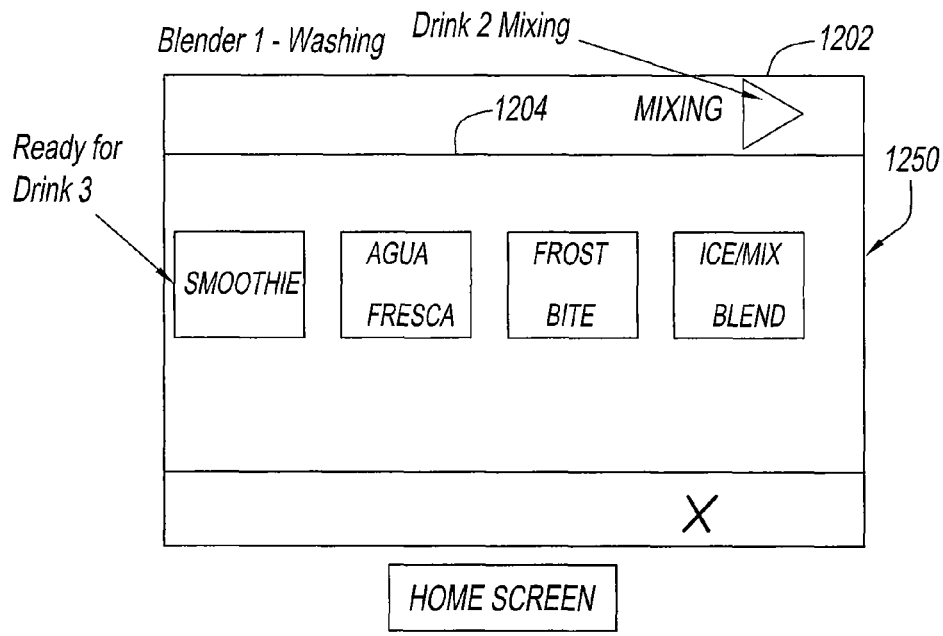

Concurrently with execution of step 1340 for drink #1, master program 470 executes step 1324 for drink #2 as shown in section 1204 of screen 1247 and presents a screen 1248 shown in FIG. 68. Screens 1247 and 1248 prompt the user to add a selected additive C to the drink #2 cup, select the right blending/mixing/cleaning module 303 and place the drink #2 cup in the selected right blending/mixing/cleaning module 303. Master program 470 then presents on display 502 a home screen 1250 (FIG. 69) that shows in section 1202 a mixing status of drink #2 and in section 1204 the beverage categories for user selection for a drink #3.

Master program 470 then waits for execution of a cleaning procedure 1342 (FIG. 47) by left blender controller 206, which will be described hereinafter. When the cleaning procedure is finished, master program 470 completes its execution for drink #1 at box 1344.

Figure 70:
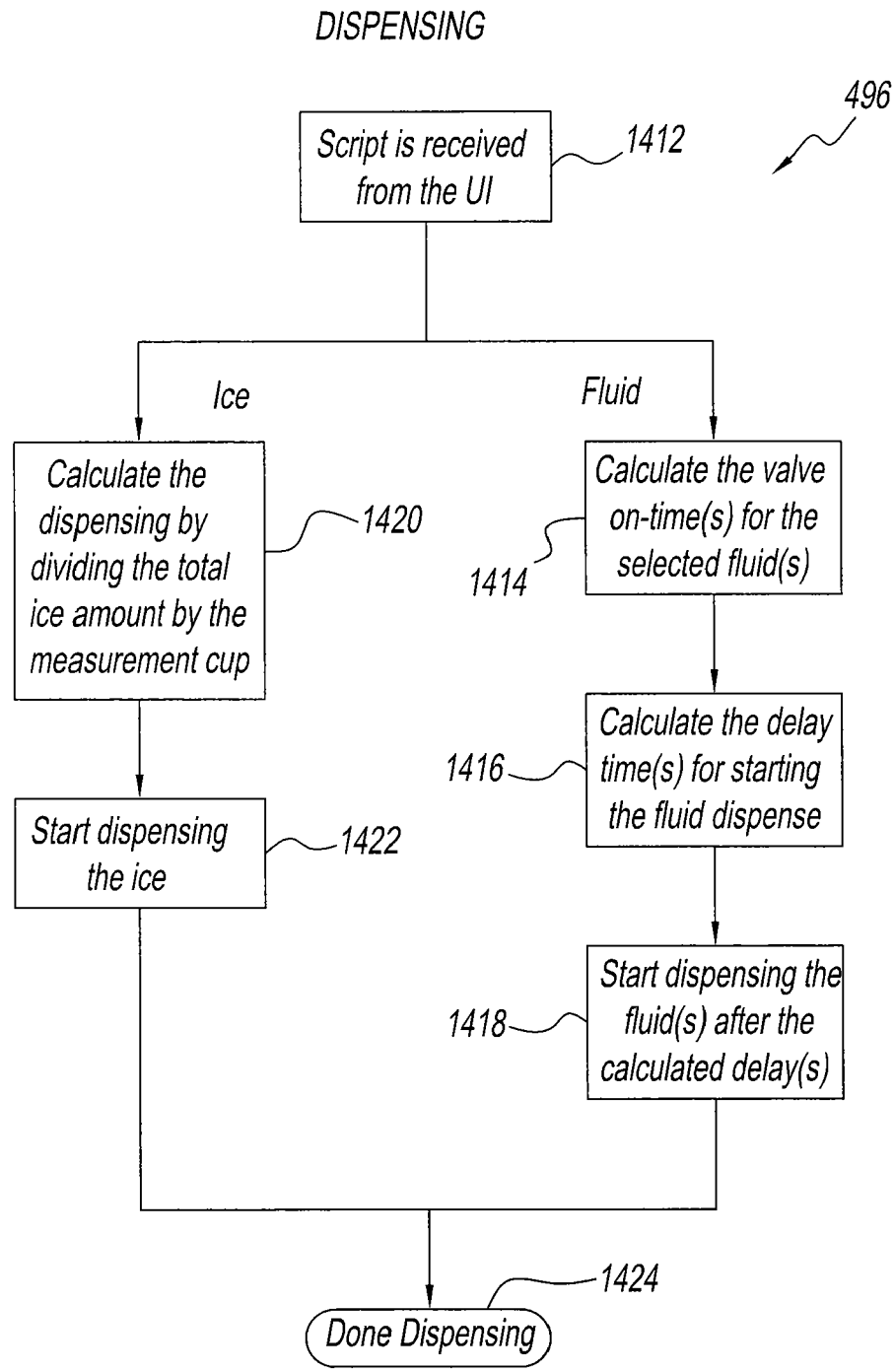
FIG. 70 is a flow diagram of the dispensing program of the relay controller of FIG. 45.

Referring to FIG. 70, a dispensing program 496 is stored in memory 494 and executed by processor 488 of relay controller 435 (FIG. 45) at step 1412 of master program 470 of FIG. 47. At step 1412, script is received from user interface controller 412 via P-bus 407. This script comprises a cup size, selected flavor(s), selected additive(s) and an ice amount. At step 1420 dispensing program 496 calculates dispensing by dividing the total amount of ice (from the received script) by the size of the portion cups 302 of FIGS. 18-20. For example, these amounts can be measured by volume or weight. In a preferred embodiment, the amounts are measured by weight. This calculation yields the number of portion cups 302 that need to be filled. At step 1422 relay controller 435 dispenses the ice to dispenser nozzle 304 via portion cups 302 with appropriate drive voltage to drive assembly 301.

At step 1414, the valve on-times are calculated based on the selected flavors contained in the received script. The valves are the valves that control air flow from a pressurized air source to air powered pumps 1125 of the selected flavor fluids. The on-time of the valve is calculated by multiplying the desired amount by the calibration dispense rate constant for that fluid and add the calibration lag time to achieve the total on-time. At step 1416 dispensing program 496 calculates delay times for starting the dispensing of the flavor fluids. The delay times for the fluid dispense is there to avoid that we end up with a lot of ice on top of the drink (since the ice dispense time is much longer than the fluid dispense). With a lot of ice on top of the drink, it makes it difficult to blend properly. The delay times is normally set as a portion of the ice dispense time with a typical value of 50%. At step 1418, the fluids are dispensed by operating the selected pumps after the calculated time delays and for the calculated times. At step 1424 the dispensing is completed and relay controller 435 sends a dispensing complete message to user interface controller 412 via P-bus 407.

Figure 71:
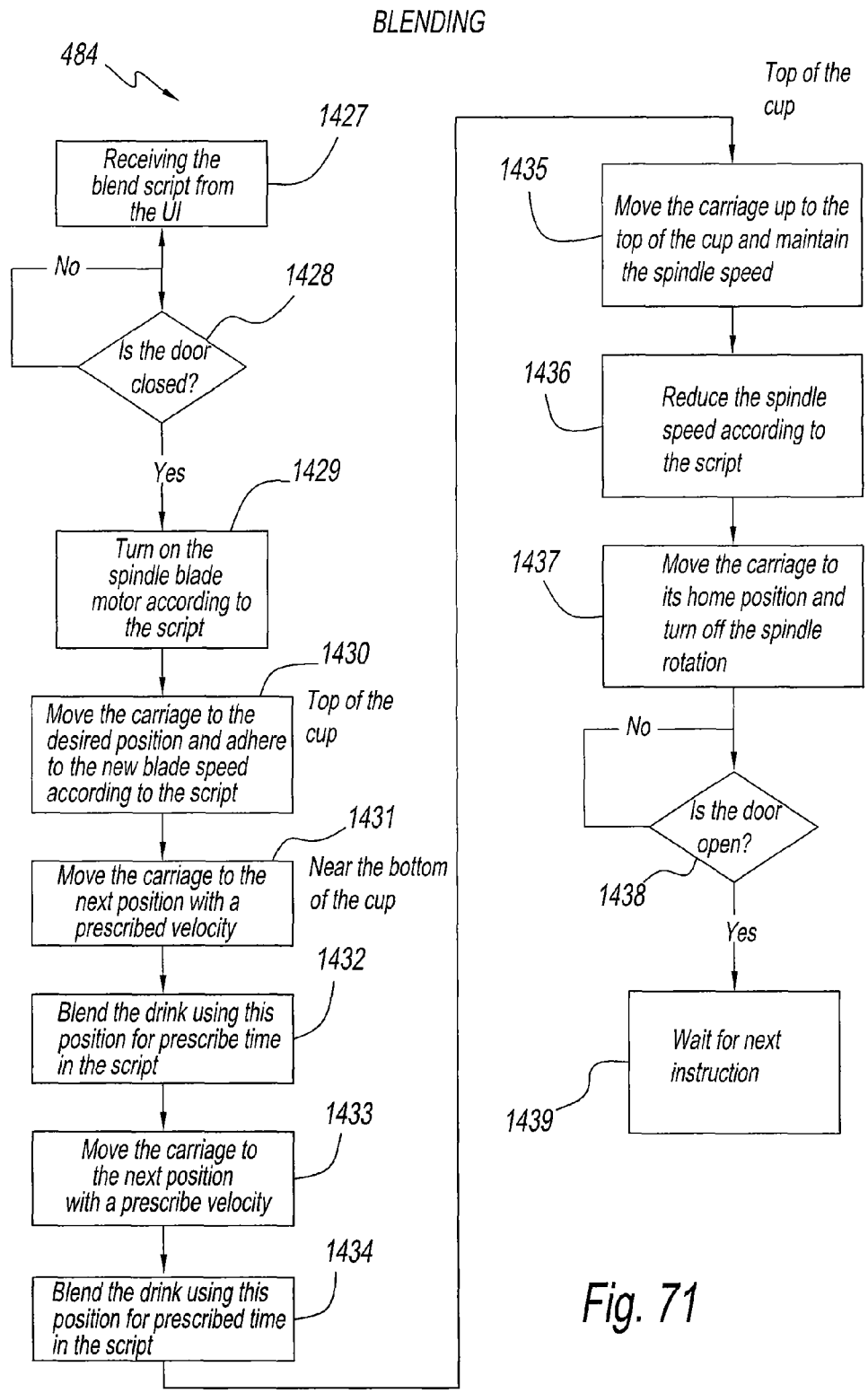
FIG. 71 is a flow diagram of the blending program of the blending controller of FIG. 44.

Referring to FIG. 71, a blending program 484 is stored in memory 482 and executed by processor 476 of blending controller 206 (FIG. 44) at steps 1320 and 1326 of master program 470 of FIG. 47. At step 1427, script is received from user interface controller 412 via P-bus 407. This script comprises cup size, blending positions, initial blade speed, blade speed for each blending position, blend time for each blend position and reduced blade speed. At step 1428, blending program 484 determines if door 235 is closed. This is accomplished by checking the status of the door sensor 409 of the associated blending/mixing/cleaning module 303. If the status is open or up, blending program 484 awaits detection of door 235 in a closed or down position. When the door 235 is closed, blending program 484 turns on spindle motor 265 to rotate spindle shaft 260 and blade 255 at the initial speed prescribed in the script.

At step 1430, blending program 484 uses micro stepping motor driver feature 430 to provide drive signals to operate micro stepping motor 241a and linear slide 241 to lower spindle shaft 260 and blade to a top blending position in the cup. At this point the rotational speed is changed from the initial speed to the top blend speed for the top blending position and maintained for the prescribed time according to the script. When blending for the prescribed time at the top blending position has expired, blending program 484 uses micro stepping motor driver feature 430 to provide drive signals to operate micro stepping motor 241a and linear slide 241 to lower spindle shaft 260 and blade 255 to a next blending position in the cup (e.g., near the bottom of the cup). At this point in step 1431 the rotational speed is changed from the top position blending speed to a bottom blend speed for the bottom blending position. Step 1432 maintains the bottom blend speed for the prescribed time according to the script.

When blending for the prescribed time at the bottom blending position has expired, blending program 484 at step 1433 uses micro stepping motor driver feature 430 to provide drive signals to operate micro stepping motor 241a and linear slide 241 to raise spindle shaft 260 and blade 255 to a next blending position in the cup (e.g., near the middle of the cup). At this point the rotational speed is changed from the bottom position blending speed to a middle blend speed for the middle blending position. Step 1432 maintains the blend speed for the prescribed time according to the script.

When blending for the prescribed time at the middle blending position has expired, blending program 484 at step 1435 uses micro stepping motor driver feature 430 to provide drive signals to operate micro stepping motor 241a and linear slide 241 to raise spindle shaft 260 and blade 255 to the top of the cup and maintain the spindle speed. At step 1436 the spindle speed is reduced according to the script. At step 1437 blending program 484 uses micro stepping motor driver feature 430 to provide drive signals to operate micro stepping motor 241a and linear slide 241 to raise spindle shaft 260 and blade to the home position and turn of motor 265 to stop rotation of spindle shaft 260 and blade 255. At step 1438, blending program 484 determines if door 235 is open by checking the status of the door sensor 409 of the associated blending/mixing/cleaning module 303. If the status is closed or down, blending program 484 awaits detection of door 235 up or open position. When this occurs, blending program 484 at step 1439 awaits the next instruction or script from user interface controller 412.

Figure 72:
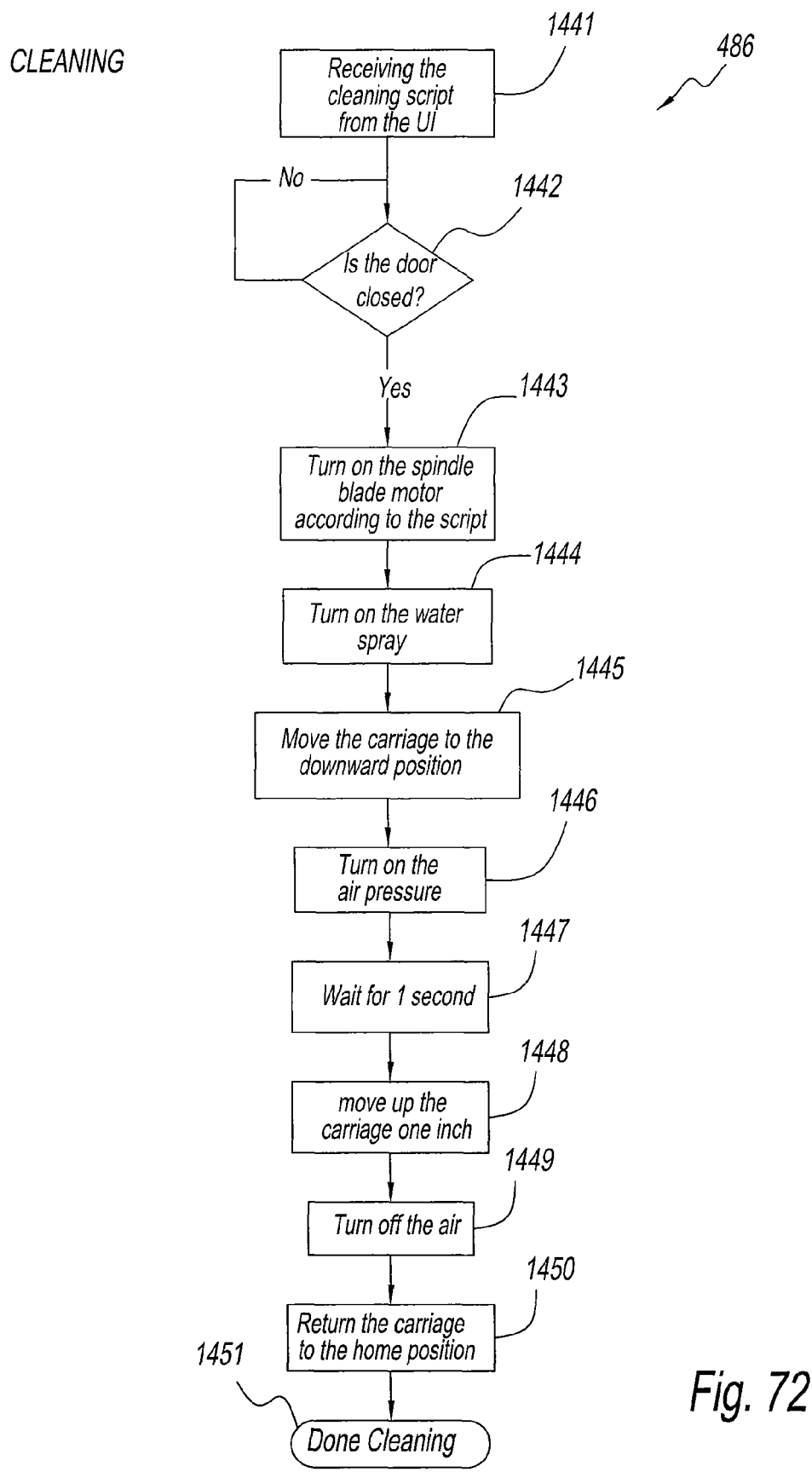
FIG. 72 is a flow diagram of the cleaning program of the blending controller of FIG. 45.

Referring to FIG. 72, a cleaning program 486 is stored in memory 482 and executed by processor 476 of blending controller 206 (FIG. 44) at step 1342 of master program 470 of FIG. 47. At step 1441, script for cleaning is received from user interface controller 412 via P-bus 407. This script comprises spindle speed and predetermined vertical position. At step 1442, by cleaning program 486 determines if door 235 is closed. This is accomplished by checking the status of the door sensor 409 of the associated blending/mixing/cleaning module 303. If the status is open or up, blending program 484 awaits detection of door 235 closed or down position. When the door 235 is closed, blending program 486 turns on spindle motor 265 to rotate spindle shaft 260 and blade 255 at the spindle speed prescribed in the script. At step 1444, blending program 486 turns on the water spray by operating water solenoid 280 to provide water to holder 270 which emits a water spray via apertures 272 or snorkel 286 (FIGS. 31 and 35) into interior volume 230 of blending/mixing/cleaning module 303. At step 1445, blending program 486 moves the rotating spindle shaft 260 and blade 255 downward in interior volume 230, thereby dispersing the water spray to rinse a wide area of the wall and door of the interior volume 230. When spindle shaft 260 and blade 255 reach the predetermined vertical position in interior volume 230, cleaning program 486 at step 1446 turns on air solenoid 220a to provide a blast of air pressure in interior volume 230. The air will also boost the water spray as well as blowing off excessive water from the interior of the chamber in the spindle parts. An added benefit is that the air will enhance the evacuation of the drain and reduce the risk of clogging.

Cleaning program 486 at step 1447 waits one second and then moves spindle shaft 260 and blade 255 up a distance (e.g., about one inch) at step 1448. At step 1449, sir solenoid 220a is operated to turn off the air flow. At step 1450, spindle shaft 260 and blade 255 is returned to the home position. At step 1451, cleaning program 486 is finished and sends a cleaning complete message to user interface controller 412 via P-bus 407.

It has been found by the present disclosure that assembly 100 allows operators to produce and dispense consistently prepared smoothie drinks in less than 40 seconds. Advantageously, assembly 100 generates ice through a fully integrated on-board ice system, ice maker, ice storage and portion control module 300. Ice maker, ice storage and portion control module 300 may, for example, have a 20-pound ice storage system that has the capability to create an additional 10 pounds of ice each hour, with a peak total of 270 pounds per day. Having ice generation on board removes the risk of injury through slips and falls, and it decreases the chance of bacterial contamination through mishandling. Additionally, the ice used in this machine is nugget-style ice, which is easier to fracture and blend down into the smoothie consistency. All of this allows for a perfectly blended beverage, for example, smoothie that fits within a normal QSR delivery time.

Each beverage, for example, smoothie is blended in its own cup, allowing the entire beverage or drink to be delivered to the customer and, in turn, raising product yield. Having each drink blended in its own cup improves flavor control and reduces allergy issues caused through cross-contamination. Assembly 100 may, for example, consistently provide twenty 16-ounce drinks per hour and, at peak capabilities, forty-five 16-ounce drinks for one-hour bursts. Money is also saved through the elimination of small wares or blender pots that were purchased and stored by restaurant owners in the past.

Advantageously, spindle assembly 242 goes through a rinse and/or sanitation process after each use to prevent flavor transfer and eliminate the need for manual dishwashing. Additionally, for example, two blending/mixing/cleaning module 303 included in assembly 100 to allow for the creation of a second drink while mixing the first, contributing to higher drink output and, consequently, to the bottom line of the operation. To overcome this challenge, nugget-style ice may be used with assembly 100. Nugget ice is softer than the more commonly known cube ice, and it is formed in a freeze barrel with an internal auger that continually scrapes the freeze surface. This flake-style ice is moved to the top of the freeze barrel by the ice auger, where it is extruded into the ice nugget. The resulting smaller ice greatly reduces the amount of blending required to create the drink. Additionally, the noise generated from the blending process is reduced by using this smaller nugget ice. This becomes especially important when the equipment is placed in the proximity of the front counter or near a drive-through window.

The blender pots in current smoothie machines are designed to fully mix the drink and grind the ice to a grain size that meets customer taste profiles. When mixing in a cup, there is no geometry to assist the mixing and grinding of the ice. To achieve the proper drink consistency, linear slide 241 moves blender blade 255 up and down in cup 15. This process simulates how a drink is made using a handheld stick mixer. Blender blade 255 lowers into the drink (about 25%), at which point blender blade 255 is energized. Once engaged, the spindle is lowered fully into the cup and allowed to dwell. This process grinds the majority of the ice, but at that point, the drink is not fully developed. The spindle is then raised and lowered following a profile created for the specific drink, taking into account the viscosity of the fluids, ice-to-fluid ratio, and the drink cup size.

It has been found by the present inventors that size limitations (footprint) may be achieved by a configuration of the components of assembly 100. While a traditional machine creates drinks in a blender pot to mix more than one flavor, assembly 100 dispenses and mixes each drink in a serving cup, and may have dual spindles to maintain throughput and delivery times. Assembly 100 may address size requirements by vertical placement of the components.

Assembly 100 may maintain the accuracy of mixer 245—used to create drink consistency—by stepper drive motors 241a control the linear slides 241. Stepper motors 241a provide the ability to create different blending profiles for the various types of drinks (coffee-based, fruit-based, fruit-plus-yoghurt drinks). Counting the number of steps that stepper motor 241a travels allows precisely locating blender blade 255 every time a drink is blended.

Ice maker, ice storage and portion control module 300 maintains ice dispense accuracy. The ice dispense was then divided into portion cups. As the drink size changes, the number of individual dispense cups dropping ice into the beverage increases or decreases to match. To measure the number of ice dispenses, micro switches (located outside of the ice bin) were incorporated to count the number of cups. This method provides consistent ice delivery regardless of the level of ice in the bin.

Blender pots that are currently used are made of hard plastic, with the ability to withstand the forces used to crush ice into an acceptable consistency for a smoothie drink. Grinding the cube-style ice, most commonly found in QSRs, would put too much stress on the machine's blender and the customer's cup.

Definitions, acronyms, and abbreviations may include:

| Abbreviation | Definition |
| --- | --- |
| UIC | User Interface Controller |
| SRB | System Relay Board |
| P-BUS | Peripheral bus |
| C-Bus | Communication Bus |
| CCA | Circuit Card Assembly |
| SFR | System Functional Requirements |

In an example of a preferred embodiment, assembly 100 may be a "Smoothie maker system" that comprises an integrated ingredient dispensing unit, up to 4 mixing units (expandable from 2 in normal configuration), and a control panel for user operation. As depicted in FIG. 38, the system is designed using a Smart Relay CCA, two mixer CCAs (normal configuration), an optional communications board for external communications, and a user interface controller board. All of the subsystem boards communicate with each other using a MODBUS protocol and RS-485 physical link. Smart Relay CCA is responsible for dispensing control, monitoring and safety of the system ice-maker, and flavoring assembly/subsystem. Also the Smart Relay CCA provides the power and Modbus hub for the Smoothie System control electronics.

The Blender Controller CCA is responsible for position, speed, cleaning and safety control of the system blender assembly/subsystem, such as blender/mixer/cleaning module 303. It controls the blender blade, water and air pumps and senses cup present and door switch. The user interface controller board consists of a monochrome LCD display, membrane keypad for control and configuration.

The functional requirements of the exemplary embodiment are configured for mixing profiles and particular fluid selections (x out of 254 displayed). The system automatically goes into a configuration download menu if in idle when an SD card is inserted. The User Interface shall have a degrees F/C selection for temperature display in the setup mode. The User Interface shall have a degrees F/C selection for temperature display in the setup mode. The maximum number of flavors per serving shall be three and the minimum number of flavors per serving shall be one, unless dispensing ice only. A flavor selection status shall be toggled by pressing the button corresponding to the flavor in question. Upon reaching the maximum Number of Flavors per Serving, the system shall not allow selection of any additional flavors; unselected flavors become locked-out. The user shall be able to change the flavor selection(s) by pressing the CANCEL button and selecting desired flavor(s).

The user shall be able to change the flavor selection(s) by first de-selecting a (the) flavor(s), then selecting the desired flavor(s). The unit shall monitor use cycles of flavors and provide a user indication on the display of low level for each flavor for early warning of flavor out.

The additives comprise a selection of two types of fresh fruit and yoghurt. Only the yoghurt is dispensed automatically; instead of dispensed, the fresh fruit has to be manually added. The fresh-fruit selections are used to compute the amounts that are dispensed. Fruit is placed in cup prior to receiving the ice and fruit. The Maximum Number Of Selectable Additives shall be 3 and the Minimum Number Of Selected Additives shall be 0.

The Fruit flavors and yoghurt shall be stored in a refrigerated base designed to maintain a product temperature between 34° F.-38° F. Base will be designed to accommodate up to 9 flavors. The base design will be such that flavors can be stored in "bag-in-box" packaging.SFR:018 The base will house flavor pumps (up to 9) and all associated delivery tubing, and air solenoid switches. The base will be designed to intake and discharge condenser air from the front of the unit. The base can be mounted on castors to allow access to rear of unit for cleaning. The base will be designed to meet NSF and UL requirements. The base will have openings in top to allow tubing to pass into dispense area. The base will provide a method air delivery and return to dispenser section to maintain product temperature to the dispense nozzle (per NSF). The base refrigeration system will require 120 v AC with the option for 220 v/50 hz (Europe requirement).

The Smoothie machine will have on-board ice making capabilities to store ice in addition to ice making capabilities. The ice machine will be designed to operate on 120V 60 hz+/−10%. The ice machine shall have provisions for 220 50 Hz operation for Europe+/−10%.

Ice is normally dispensed during the smoothie making process but could also be dispensed exclusively. The system shall allow dispensing of ice in an exclusive manner (i.e. without flavors or water). Ice shall be dispensed in a portion amount that allows scaling for various drink cup sizes. Upon selection of the ice-only button, the system shall proceed to cup size selection. The ice-only button shall only be available when no flavors are selected. Conversely, upon selection of a flavor the ice-only button shall be disabled.

There shall be a Service maintenance mode to allow cleaning on the dispenser fluid lines.

The system shall allow cup size selections of small, medium large and extra large, with a provision for additional cup sizes determined by customer. Provisions will be made for cup storage on the unit. Cup size selection shall trigger the dispensing process. There shall be up to five configurable cup sizes with configurable volumes. The cup shall be placed under the dispense nozzle prior to drink selection (no UI to tell you).

The dispensing process shall use the cup size as a scaling factor to compute ingredient amounts; water, ice and selected flavors/additives. The ingredients and quantities dispensed shall be used to determine the mixing profile. Fruit flavor ingredients shall be delivered using air driven condiment pumps. Condiment pumps shall be located in the refrigerated space and shall be removable for easy access for service. Condiment pumps shall be energized using solenoid valves mounted in the air flow to the pumps. Condiment Pumps shall deliver a portioned amount of flavor. The amounts of ingredients used for each smoothie including a total of 9 flavored fluids, water, ice and up to 4 manually added types of additives shall be determined by the Dispense Algorithm.

The mixing includes the actual mixing of the ingredients in a cup and a subsequent cleaning cycle to ensure that the blender's blades are clean for the next mixing cycle. The mixing operation shall be asynchronous to the dispensing operation. The mixing operation shall be determined by the current mixing profile and shall take no longer than 20 seconds. The mixing operation shall comprise at least 2 steps, blending & washing. The mixer shall be designed as a module that attaches to the ice machine and refrigerated base. The mixer module shall consist of a mixer spindle, blade, a linear slide, cup holder with water nozzles. To access the mixer module a protective door must be raised. The mixer module door shall contain micro-switches/sensors to locate the door position.

The drink is placed into the cup holder and the door is closed. When the closure of the door has been identified the mixer shall begin the mixing process. The mixer spindle shall index (via linear slide) down into the drink cup a predetermined distance from home position. The mixer blade should preferably be engaged before contacting the ingredients in the drink. The spindle shall then index into the drink to a depth of cup of approximately 75%. The spindle shall dwell in this location for a period of 15 seconds. The spindle shall then return to the initial location and continue to mix for a period. Upon completion the mixer blade shall be de-energized and the spindle returned to its home location. The door is then opened and the drink is then removed and served.

After the last mixer sequence the module shall begin the cleaning process when the mixer door is closed. The cleaning process shall start with the spindle being lowered into the mixing cavity and the spindle blade energized. A water solenoid shall be energized for 3 seconds and begin to spray rinse the spindle and cavity after the spindle blade is energized during a mixer cleaning cycle. An air solenoid connected to the water line shall be energized to provide a high pressure blast of water during the mixer cleaning cycle. The module can be designed to operate with sanitizing agents in addition to water. The unit shall be able to detect run out of sanitizer fluid. When the mixer cleaning cycle has ended, the solenoids are de-energized and rinse water is drained. The mixer cleaning cycle shall take no longer than 5 seconds.

A mixing profile determines the steps to be performed during the mixing operation. Each step in the mixing profile specifies spindle's speed and time (how fast for how long) as well as position (with dwell time). A normal and Additive included mixing profile shall be available for each cup size. The mixing profiles shall be customer configurable.

The UIC shall support handling of USB storage devices. The UIC shall be capable of connecting to the C-Bus. The UIC shall provide 1-press on-the-fly language switch. The UIC shall be the P-Bus master.

The peripheral bus or P-Bus shall connect the User Interface Controller to the system's peripherals (the System Relay Board and the Mixer Control Boards) via RS-485. The P-Bus shall use ModBus RTU.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A controller for an integrated beverage system that comprises a dispensing module that dispenses ice and one or more other ingredients according to a recipe script executed by the controller into a container and a blending/mixing module that blends and/or mixes said ice and said one or more other ingredients in said container using at least a blender blade, said controller comprising:
    a controller apparatus that controls said dispensing module and said blending/mixing module to prepare a first beverage in a first container and a second beverage in a second container concurrently and sequentially.

2. The controller of claim 1, wherein said controller apparatus controls said dispensing module to dispense a first set of said one or more other ingredients for said first beverage into said first container and then controls said blending/mixing module to blend and/or mix said first set in said first container and simultaneously or sequentially controls said dispensing module to start dispensing a second set of said one or more other ingredients for said second beverage into said second container.

3. The controller of claim 1, wherein said each of said first and second containers are beverage cups used for combined blending and serving.

4. The controller of claim 1, wherein said controller apparatus controls said dispensing module and said blending/mixing module based on beverage requests received from a user operated entry device.

5. The controller of claim 1, wherein said one or more other ingredients are selected from the group consisting of: water, flavor and additive.

6. The controller of claim 1, wherein said controller apparatus monitors conditions of said integrated beverage system via connections to one or more sensors of said integrated beverage system.

7. The controller of claim 1, wherein said integrated beverage system further comprises an ice maker, and wherein said controller apparatus controls said dispensing module to deliver said ice to at least one of said first container and said second containers.

8. The controller of claim 1, wherein said dispensing module comprises a plurality of storage containers, wherein said plurality of said other ingredients are stored in separate ones of said plurality of storage containers, and wherein said controller apparatus controls said dispensing module to deliver at least one of said plurality of said other ingredients from a corresponding storage container to said first container or said second container.

9. The controller of claim 8, wherein said plurality of storage containers are flexible bags.

10. The controller of claim 8, wherein said dispensing module further comprises a single dispensing nozzle for said plurality of storage containers, wherein said controller apparatus controls said dispensing module to deliver a selection of said other ingredients from said separate ones of said plurality of storage containers via separate delivery paths to said nozzle for dispensing to said first container or said second container.

11. The controller of claim 1, wherein said recipe script comprises a first recipe script and a second recipe script, and wherein said controller apparatus comprises a plurality of micro-controllers that control said dispensing module and said blending/mixing module to prepare said first beverage and said second beverage based on said first recipe script and said second recipe script, respectively.

12. The controller of claim 11, wherein said first recipe script comprises such selectable elements as a beverage container size, a user selected beverage, optional fluid types and quantities, optional additive types and quantities, blender profiles, optional mixer profiles, operator instructions for the different additives and a first ingredient, and wherein at least one of said micro-controllers, based on said beverage container size, said first ingredient and said user selected beverage, controls said dispenser module to portion said first ingredient.

13. The controller of claim 11, wherein said micro-controllers comprise:
    a first micro-controller that responds to user data entered via a user entry device to provide said first and second recipe scripts; and
    a second micro-controller that uses said first and second recipe scripts to control said dispensing module in the dispensing of a first set of said other ingredients into said first container and a second set of said other ingredients into said second container, respectively; and
    a third micro-controller that uses said first and second recipe scripts to blend and/or mix said first and second sets of other ingredients in said first and second containers to produce said first and second beverages, respectively.

14. The controller of claim 13, wherein said blending/mixing module further comprises a door and at least one position sensor, wherein said position sensor is selected from the group consisting of: spindle assembly home, door open, and spindle assembly home and door open.

15. The controller of claim 13, wherein said blending/mixing module further comprises a cleaning assembly, and wherein said third micro-controller using said first or second script operates said cleaning assembly to inject a cleaning and/or sanitizing fluid into a blending/mixing module after said first or second beverage has been removed therefrom.

16. The controller of claim 1, wherein said blending/mixing module is a first blending/mixing module, wherein said integrated beverage system further comprises a second blending/mixing module, and wherein said controller apparatus executes a program to concurrently prepare said first and second beverages by controlling said first and second blending/mixing modules to time share said dispensing module.

17. The controller of claim 16, wherein said recipe script comprises a first recipe script and a second recipe script, and wherein said integrated beverage system further comprises an interactive display, and wherein said program causes said controller apparatus to present a series of interactive screens on said display, to respond to user entries via said interactive screens to define first and second sets of ingredients for said first and second beverages, to provide said first recipe script and said second recipe script for said first and second beverages, respectively, and to use said first and second recipe scripts to control said dispensing module to dispense said first and second sets of ingredients into said first container and said second container, respectively, on a time shared basis.

18. A controller for an integrated beverage system that comprises a dispensing module that dispenses one or more ingredients into a container and a blending/mixing module that blends and/or mixes said ingredients in said container using at least a blender blade, said controller comprising:
a controller apparatus that controls said dispensing module and said blending/mixing module to prepare a first beverage in a first container and a second beverage in a second container concurrently and sequentially, wherein said controller apparatus controls said dispensing module to dispense ice and fluid simultaneously or in a layered manner with a layer of ice first and then a layer of fluid and optionally by another layer of ice and/or fluid.

19. A controller for an integrated beverage system that comprises a dispensing module that dispenses one or more ingredients into a container and a blending/mixing module that blends and/or mixes said ingredients in said container using at least a blender blade, said controller comprising:
a controller apparatus that controls said dispensing module and said blending/mixing module to prepare a first beverage in a first container and a second beverage in a second container concurrently and sequentially, wherein said controller apparatus controls said dispensing module to dispense ice and fluid simultaneously or in a layered manner with a layer of fluid first and then a layer of ice and optionally by another layer of fluid and/or ice.

20. A controller for an integrated beverage system that comprises a dispensing module that dispenses one or more ingredients into a container and a blending/mixing module that blends and/or mixes said ingredients in said container, said controller comprising:
a controller apparatus that controls said dispensing module and said blending/mixing module to prepare a first beverage in a first container and a second beverage in a second container concurrently or sequentially,
wherein said controller apparatus comprises a plurality of micro-controllers that control said dispensing module and said blending/mixing module to prepare said first beverage and said second beverage based on a first recipe script and a second recipe script, respectively,
wherein said micro-controllers comprise:
a first micro-controller that responds to user data entered via a user ent device to provide said first and second recipe scripts; and
a second micro-controller that uses said first and second recipe scripts to control said dispensing module in the dispensing of a first set of said ingredients into said first container and a second set of said ingredients into said second container, respectively; and
a third micro-controller that uses said first and second recipe scripts to blend and/or mix said first and second sets of ingredients in said first and second containers to produce said first and second beverages, respectively, wherein said blending/mixing module comprises a spindle assembly that is rotatable and that is movable substantially vertically into and out of said first container or said second container, and wherein said third micro-controller uses said first recipe script or said second recipe script to drive a first motor that rotates said spindle assembly and a second motor that moves said spindle assembly vertically.

21. The controller of claim 20, wherein one of said ingredients is ice, wherein said third micro-controller uses said first recipe script or said second recipe script to rotate said spindle assembly in a first manner to chop an ice particle size from coarse to fine and/or in a second manner leaves the ice in a coarse particle size.

22. The controller of claim 20, wherein said first recipe script or said second recipe script includes a size of said first container or said second container, a speed and dwell time for each of a plurality of blending levels in said beverage container, and wherein said third micro-controller uses said first recipe script or said second recipe script to control the movement of said spindle assembly substantially vertically to each of said levels and to rotate a blade at each level with the speed and for the dwell time for that level according to said first recipe script or said second recipe script.

23. A controller for an integrated beverage system that comprises a dispensing module that dispenses one or more ingredients into a container and a blending/mixing module that blends and/or mixes said ingredients in said container, said controller comprising:
a controller apparatus that controls said dispensing module and said blending/mixing module to prepare a first beverage in a first container and a second beverage in a second container concurrently or sequentially,
wherein said controller apparatus comprises a plurality of micro-controllers that control said dispensing module and said blending/mixing module to prepare said first beverage and said second beverage based on a first script and a second recipe script, respectively,
wherein said micro-controllers comprise:
a first micro-controller that responds to user data entered via a user ent device provide said first and second recipe scripts; and
a second micro-controller that uses said first and second recipe scripts to control said dispensing module in the dispensing of a first set of said ingredients into said first container and a second set of said ingredients into said second container, respectively; and
a third micro-controller that uses said first and second recipe scripts to blend and/or mix said first and second sets of ingredients in said first and second containers to produce said first and second beverages, respectively,
wherein said blending/mixing module further comprises a cleaning assembly, and wherein said third micro-controller using said first or second script operates said cleaning assembly to inject a cleaning and/or sanitizing fluid into a blending/mixing module after said first or second beverage has been removed therefrom, wherein said cleaning assembly comprises a spray device located to inject said cleaning and/or sanitizing fluid, a cleaning and/or sanitizing fluid valve and an air valve in communication with a delivery conduit to said spray device, and wherein said third micro-controller uses said first recipe script or said second recipe script to operate said cleaning and/or sanitizing fluid valve to provide said cleaning and/or sanitizing fluid to said spray device via a conduit and said air valve to inject air into said conduit to increase a velocity of flow of said cleaning and/or sanitizing fluid in said blending/mixing module.

24. The controller of claim 23, wherein said cleaning assembly comprises a spindle assembly, and wherein said third micro-controller responds to said first or second script to lower said spindle assembly into interior of said blender/mixer module to enhance a coverage of said cleaning and/or sanitizing fluid within said blending/mixing module.

25. The controller of claim 24, wherein said cleaning and/or sanitizing fluid is selected from the group consisting of: water, detergent and/or sanitizing fluid.

26. A non-transitory computer readable medium storing a program for controlling an integrated beverage system that comprises a dispensing module that dispenses ice and one or more other ingredients according to a recipe script into a container and a blending/mixing module that blends and/or mixes said ingredients in said container using at least a blender blade, said non-transitory computer readable medium comprising:

executable with a computer apparatus instructions of said program to control said dispensing module and said blending/mixing module to prepare a first beverage in a first container and a second beverage in a second container concurrently and sequentially.

27. The non-transitory computer readable medium of claim 26, further comprising:

an executable with said computer apparatus instructions of said program for controlling said dispensing module to dispense a first set of said one or more other ingredients for said first beverage into said first container;

an executable with said computer apparatus instructions of said program for controlling said blending/mixing module to blend and/or mix said first set of said other ingredients in said first container; and an executable with said computer apparatus instructions of said program for simultaneously controlling said dispensing module to start dispensing a second set of said one or more other ingredients for said second beverage into said second container while said first set of said other ingredients is blending in said blending/mixing module.

28. The non-transitory computer readable medium of claim 26, wherein said first container and said second containers are beverage cups.

29. The non-transitory computer readable medium of claim 26, wherein said dispensing module and said blending/mixing module are controlled based on beverage requests received from a user operated entry device.

30. The non-transitory computer readable medium of claim 26, wherein said one or more other ingredients are selected from the group consisting of: water, at least one flavor, and at least one additive.

31. The non-transitory computer readable medium of claim 26, further comprising wherein said controller apparatus monitors conditions of said integrated beverage system via connections to one or more sensors of said integrated beverage system.

32. The non-transitory computer readable medium of claim 26, wherein said integrated beverage system further comprises an ice maker, and wherein said dispensing module is controlled to deliver said ice to at least of said first container and said second container.

33. The non-transitory computer readable medium of claim 26, wherein said dispensing module comprises a plurality of storage containers, wherein a plurality of said other ingredients is stored in separate ones of said plurality of storage containers, and further comprising an executable with said computer apparatus instructions of said program for controlling said dispensing module to deliver at least one of said plurality of other ingredients from a corresponding storage container to said first container or said second container.

34. The non-transitory computer readable medium of claim 33, wherein said plurality of storage containers are flexible bags.

35. The non-transitory computer readable medium of claim 33, wherein said dispensing module further comprises at least one dispensing nozzle for said plurality of storage containers, and further comprising an executable with said computer apparatus instructions of said program for controlling said dispensing module to deliver a selection of said other ingredients from said separate ones of said plurality of storage containers via separate delivery paths to said nozzle for dispensing to said first container or said second container.

36. The non-transitory computer readable medium of claim 26, wherein said recipe script comprises a first recipe script and a second recipe script, and wherein said controller apparatus comprises a plurality of micro-controllers, further comprising controlling said dispensing module and said blending/mixing module to prepare said first beverage and second beverage based on said first recipe script and said second recipe script, respectively.

37. The non-transitory computer readable medium of claim 36, wherein said first recipe script comprises a beverage container size, a user selected beverage, and a first ingredient, and wherein at least one of said micro-controllers, based on said beverage container size, said first ingredient and said user selected beverage, controls said dispenser module to portion said first ingredient.

38. The non-transitory computer readable medium of claim 26, wherein said blending/mixing module is a first blending/mixing module, wherein said integrated beverage system further comprises a second blending/mixing module, and further comprising an executable with said computer apparatus instructions of said program for concurrently preparing said first and second beverages by controlling said first and second blending/mixing modules to time share said dispensing module.

39. The non-transitory computer readable medium of claim 38, wherein said recipe script comprises a first recipe script and a second recipe script, and wherein said integrated beverage system further comprises an interactive display, and further comprising an executable with said computer apparatus instructions of said program to present a series of interactive screens on said display, to respond to user entries via said interactive screens to define first and second sets of ingredients for said first and second beverages, to provide a first script and a second script for said first and second beverages, respectively, and to use said first and second scripts to control said dispensing module to dispense said first and second sets of ingredients into a first container and a second container, respectively, on a time shared basis.

40. A non-transitory computer readable medium storing a program for controlling an integrated beverage system that comprises a dispensing module that dispenses one or more ingredients into a container and a blending/mixing module that blends and/or mixes said ingredients in said container using at least a blender blade, said non-transitory computer readable medium comprising:
- executable with a computer apparatus instructions of said program to control said dispensing module and said blending/mixing module to prepare a first beverage in a first container and a second beverage in a second container concurrently and sequentially; and executable with said computer apparatus instructions of said program for controlling said dispensing module to dispense ice and fluid simultaneously or in a layered manner with a layer of ice first and then a layer of fluid and optionally by another layer of ice and/or fluid.

41. A non-transitory computer readable medium storing a program for controlling an integrated beverage system that comprises a dispensing module that dispenses one or more ingredients into a container and a blending/mixing module that blends and/or mixes said ingredients in said container using at least a blender blade, said non-transitory computer readable medium comprising:
- executable with a computer apparatus instructions of said program to control said dispensing module and said blending/mixing module to prepare a first beverage in a first container and a second beverage in a second container concurrently and sequentially; and executable with said computer apparatus instructions of said program for controlling said dispensing module to dispense ice and fluid simultaneously or in a layered manner with a layer of fluid first and then a layer of ice and optionally by another layer of fluid and/or ice.

42. A non-transitory computer readable medium storing a program for controlling an integrated beverage system that comprises a dispensing module that dispenses one or more selected ingredients into a container and a blending/mixing module that blends and/or mixes said ingredients in said container, said non-transitory computer readable medium comprising:
- executable with a computer apparatus instructions of said program to control said dispensing module and said blending/mixing module to prepare a first beverage in a first container and a second beverage in a second container concurrently or sequentially, wherein said controller apparatus comprises a plurality of micro-controllers, controlling said dispensing module and said blending/mixing module to prepare said first beverage and second beverage based on a first recipe script and a second recipe script, respectively, wherein said micro-controllers comprise a first micro-controller, a second micro-controller and a third micro-controller, and further comprising:
- an executable with said computer apparatus instructions of said program for using said first micro-controller that responds to user data entered via a user entry device to provide said first and second recipe scripts; and
- an executable with said computer apparatus instructions of said program for using said second micro-controller that uses said first and second recipe scripts to control said dispensing module in the dispensing of a first set of said ingredients into said first container and a second set of said ingredients into said second container, respectively; and
- an executable with said computer apparatus instructions of said program for using said third micro-controller that uses said first and second recipe scripts to blend and/or mix said first and second sets of ingredients in said first and second containers to produce said first and second beverages, respectively.

43. The non-transitory computer readable medium of claim 42, wherein said blending/mixing module comprises a spindle assembly that is rotatable and that is movable vertically into and out of said first container or said second container, and further comprising an executable with said computer apparatus instructions of said program for using said third micro-controller with said first recipe script or second recipe script to drive a first motor that rotates said spindle assembly and a second motor that moves said spindle assembly vertically.

44. The non-transitory computer readable medium of claim 43, wherein one of said ingredients is ice, and further comprising an executable with said computer apparatus instructions of said program for using said third micro-controller with said first or second script to rotate said spindle assembly in a first manner chop an ice particle size from coarse to fine and/or in a second manner leaves the ice in a coarse particle size.

45. The non-transitory computer readable medium of claim 43, wherein said first or second script includes a size of said beverage container, a speed and dwell time for each of a plurality of blending levels in said beverage container, and further comprising with said third micro-controller using said first recipe script or said second recipe script to move said spindle assembly vertically to each of said levels and to rotate said spindle assembly at each level with the speed and for the dwell time for that level according to said first recipe script or said second recipe script.

46. The non-transitory computer readable medium of claim 42, wherein said blending/mixing module further comprises a door and a position sensor, wherein said position sensor is selected from the group consisting of: spindle assembly home, door open, and spindle assembly home and door open.

47. The non-transitory computer readable medium of claim 42, wherein said blending/mixing module further comprises a cleaning assembly, and further comprising an executable with said computer apparatus instructions of said program for using said third micro-controller with said first recipe script or said second recipe script to operate said cleaning assembly to inject a cleaning and/or sanitizing fluid into a blender/mixer module after said first beverage or said second beverage has been removed therefrom.

48. The non-transitory computer readable medium of claim 47, wherein said cleaning assembly comprises a spray device located to inject a cleaning and/or sanitizing fluid, a cleaning and/or sanitizing fluid valve and an air valve in communication with a delivery conduit to said spray device, and further comprising an executable with said computer apparatus instructions of said program for using said third micro-controller with said first recipe script or said second recipe script to operate said cleaning and/or sanitizing fluid valve to provide said cleaning and/or sanitizing fluid to said spray device via a conduit and said air valve to inject air into said conduit to increase a velocity of flow of said cleaning and/or sanitizing fluid in said blending/mixing module.

49. The non-transitory computer readable medium of claim 48, further comprising executing with said computer apparatus instructions of said program for using said third micro-controller in response to said first recipe script or said second recipe script to lower said spindle assembly into said blending/mixing module to enhance a coverage of said cleaning and/or sanitizing fluid within a volume of one of said first and second containers after a corresponding beverage has been removed.

50. The non-transitory computer readable medium of claim 49, wherein said cleaning and/or sanitizing fluid is selected from the group consisting of: water, detergent, and sanitizing fluid.

* * * * *